United States Patent
Yoshizaki et al.

(10) Patent No.: US 11,905,180 B2
(45) Date of Patent: Feb. 20, 2024

(54) METHOD FOR RECOVERING RARE METAL SALT

(71) Applicant: TORAY INDUSTRIES, INC., Tokyo (JP)

(72) Inventors: Tomoya Yoshizaki, Shiga (JP); Takanori Soya, Shiga (JP); Masakazu Koiwa, Shiga (JP); Shigehisa Hanada, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/920,148

(22) PCT Filed: Apr. 21, 2021

(86) PCT No.: PCT/JP2021/016220
§ 371 (c)(1),
(2) Date: Oct. 20, 2022

(87) PCT Pub. No.: WO2021/215484
PCT Pub. Date: Oct. 28, 2021

(65) Prior Publication Data
US 2023/0202854 A1    Jun. 29, 2023

(30) Foreign Application Priority Data

Apr. 21, 2020 (JP) .................. 2020-075283
Apr. 21, 2020 (JP) .................. 2020-075284

(Continued)

(51) Int. Cl.
*C01D 15/04* (2006.01)
*B01D 61/02* (2006.01)
(Continued)

(52) U.S. Cl.
CPC .......... *C01D 15/04* (2013.01); *B01D 61/025* (2013.01); *B01D 61/027* (2013.01);
(Continued)

(58) Field of Classification Search
CPC .... C01D 15/04; B01D 69/106; B01D 61/025; B01D 61/027; B01D 61/145; B01D 61/147; B01D 2325/02834
(Continued)

(56) References Cited

U.S. PATENT DOCUMENTS

| 2013/0292333 A1 | 11/2013 | Sasaki et al. |
| 2017/0136422 A1 | 5/2017 | Ogawa et al. |
| 2019/0024212 A1 | 1/2019 | Lien |

FOREIGN PATENT DOCUMENTS

| JP | 2001-508925 A | 7/2001 |
| JP | WO2012/093724 A1 | 7/2012 |

(Continued)

OTHER PUBLICATIONS

"Exploration Project for Promoting the Development of Mineral Resources in FY2017, Report on a study on mineral resource infrastructure development (basic study for the formulation of a strategy to secure mineral resources)", Mitsubishi Research Institute, Inc., Environment and Energy Division, Mar. 2018, total 169 pages.

(Continued)

*Primary Examiner* — Anita Nassiri-Motlagh
(74) *Attorney, Agent, or Firm* — Birch, Stewart, Kolasch & Birch, LLP

(57) ABSTRACT

The present invention relates to a method for recovering a rare metal salt, the method including: an acid treatment step of obtaining a rare metal-containing acidic aqueous solution by bringing a material including a monovalent rare metal and a polyvalent rare metal into contact with an acidic (Continued)

aqueous solution; a separation step of obtaining permeated water including the monovalent rare metal and non-permeated water including the polyvalent rare metal from the rare metal-containing acidic aqueous solution by using a nanofiltration membrane satisfying the condition (1); and a concentration step of obtaining non-permeated water having a higher concentration of the monovalent rare metal and permeated water having a lower concentration of the monovalent rare metal than that of the permeated water in the separation step, by using a reverse osmosis membrane.

28 Claims, 2 Drawing Sheets

(30) Foreign Application Priority Data

| May 29, 2020 | (JP) | 2020-094341 |
| Mar. 30, 2021 | (JP) | 2021-056860 |
| Mar. 30, 2021 | (JP) | 2021-056865 |

(51) Int. Cl.
*B01D 69/10* (2006.01)
*B01D 61/14* (2006.01)
*B01D 71/60* (2006.01)

(52) U.S. Cl.
CPC ......... *B01D 61/145* (2013.01); *B01D 61/147* (2013.01); *B01D 69/106* (2022.08); *B01D 71/60* (2013.01); *B01D 2311/14* (2013.01); *B01D 2325/02832* (2022.08); *B01D 2325/02833* (2022.08); *B01D 2325/02834* (2022.08)

(58) Field of Classification Search
USPC .................................................. 423/179.5
See application file for complete search history.

(56) References Cited

FOREIGN PATENT DOCUMENTS

| JP | WO2013/146391 A1 | 10/2013 |
| KR | 10-2017-0027731 A | 3/2017 |
| WO | WO 98/59385 A1 | 12/1998 |
| WO | WO 2012/077610 A1 | 6/2012 |
| WO | WO 2013/005694 A1 | 1/2013 |
| WO | WO 2019/018333 A1 | 1/2019 |

OTHER PUBLICATIONS

International Search Report, issued in PCT/JP2021/016220, PCT/ISA/210, dated Jul. 6, 2021.
Written Opinion of the International Searching Authority, issued in PCT/JP2021/016220, PCT/ISA/237, dated Jul. 6, 2021.
Korean Office Action for Korean Application No. 10-2022-7036727, dated Nov. 10, 2022, with English translation.
Supplementary European Search Report filed in Application No. 21792873.8, dated Oct. 25, 2023.

METHOD FOR RECOVERING RARE METAL SALT

TECHNICAL FIELD

The present invention relates to a method for recovering a rare metal such as lithium, cesium, nickel, and cobalt from a lithium ion battery or a waste material, a waste liquid, an ore, a slag, or the like generated in a manufacturing process of the lithium ion battery, and more particularly to a method and an apparatus for efficiently recovering a rare metal using a microfiltration membrane, an ultrafiltration membrane, a nanofiltration membrane, and a reverse osmosis membrane.

BACKGROUND ART

In recent years, with the economic development in the world, the demand for mineral resources has been significantly increased. For example, the demand for lithium as a material for a lithium ion battery is increasing, and lithium carbonate is also used for a heat-resistant glass additive and a surface acoustic wave filter. In particular, high purity ones are used as filters and transmitters for cellular phones, car navigation systems, and the like.

In addition, cobalt is widely used in various industries as an alloy element of special steel and a magnetic material. For example, special steel is used in the fields of aerospace, power generators, and special tools, and the magnetic material is used in small headphones, small motors, and the like. Cobalt is also used as a raw material of a positive electrode material of a lithium ion battery. As a mobile information processing terminal such as a smartphone and a battery for automobile and power storage become widespread, a demand for cobalt is increasing.

Nickel is used as stainless steel by taking advantage of high gloss and corrosion resistance. In recent years, as with cobalt, the demand for nickel as a material for a lithium ion battery is increasing.

As described above, as the demand for various rare metals increases, efforts to recover rare metals such as lithium, cobalt, and nickel from a lithium ion battery that has been used and a waste material generated from a manufacturing process thereof have been promoted from the viewpoint of recycling valuable resources.

For example, the recovery of resources from a waste lithium ion battery has been put into practical use mainly on rare metals such as cobalt and nickel, but since a solvent extraction method using a chelating agent is mainly used, the load on the environment is large and the cost is disadvantageous (Non-Patent Literature 1).

In order to solve this problem, a separation and recovery method using a separation membrane such as an ultrafiltration membrane, a nanofiltration membrane, or a reverse osmosis membrane from an aqueous solution obtained by acid-leaching a waste lithium ion battery (Patent Literature 1) has been proposed.

CITATION LIST

Patent Literature

Patent Literature 1: WO 2019/018333

Non-Patent Literature

Non-Patent Literature 1: "Report of exploration project for promotion of mineral resource development in 2017, research project of mineral resource industrial infrastructure (basic survey on mineral resource securing strategy development)", Mitsubishi Research Institute, Inc., Environment and Energy Business Headquarters, March 2018

SUMMARY OF INVENTION

Technical Problem

However, the method of related art has a problem in long-term stability of the separation performance of a nanofiltration membrane used as a separation membrane in an acidic aqueous solution, and has a problem in the recovery efficiency of rare metals due to low selective separability of monovalent rare metals and polyvalent rare metals. An object of the present invention is to provide a method for efficiently and stably recovering a rare metal from a lithium ion battery or a waste material, a waste liquid, an ore, or the like generated in a manufacturing process thereof.

Solution to Problem

In order to solve the above problems, the present invention has the following configuration.

[1] A method for recovering a rare metal salt, the method including:

an acid treatment step of obtaining a rare metal-containing acidic aqueous solution by bringing a material including a monovalent rare metal and a polyvalent rare metal into contact with an acidic aqueous solution;

a separation step of obtaining permeated water including the monovalent rare metal and non-permeated water including the polyvalent rare metal from the rare metal-containing acidic aqueous solution by using a nanofiltration membrane satisfying the condition (1) below; and a concentration step of obtaining non-permeated water having a higher concentration of the monovalent rare metal and permeated water having a lower concentration of the monovalent rare metal than that of the permeated water in the separation step, by using a reverse osmosis membrane, condition (1):

a difference between a removal ratio of magnesium sulfate and a removal ratio of magnesium chloride is 20% or less when a 2000 mg/L magnesium sulfate aqueous solution and a 2000 mg/L magnesium chloride aqueous solution, each having a pH of 6.5 and a temperature of 25° C., are respectively allowed to pass through the nanofiltration membrane under an operating pressure of 0.5 MPa; and a difference between a removal ratio of glucose and a removal ratio of isopropyl alcohol is 40% or more and the removal ratio of glucose is 70% or more when a 1000 mg/L glucose aqueous solution and a 1000 mg/L isopropyl alcohol aqueous solution, each having a pH of 6.5 and a temperature of 25° C. are respectively allowed to pass through the nanofiltration membrane under an operating pressure of 0.5 MPa.

[2] The method for recovering a rare metal salt according to [1], in which raw water in the separation step includes lithium as the monovalent rare metal, and a lithium ion concentration in the raw water is in a range of 0.5 mg/L or more and 50000 mg/L or less.

[3] The method for recovering a rare metal salt according to [1] or [2], in which a total ion concentration of the polyvalent rare metal in the raw water in the separation step is in a range of 0.5 mg/L or more and 100000 mg/L or less.

[4] The method for recovering a rare metal salt according to any one of [1] to [3], in which the raw water in the separation step includes at least one metal of cobalt, nickel, and manganese as the polyvalent rare metal.

[5] The method for recovering a rare metal salt according to any one of [1] to [4], in which the separation step includes at least a first separation step and a 2a-th separation step which use a nanofiltration membrane, and permeated water obtained in the first separation step is treated in the 2a-th separation step.

[6] The method for recovering a rare metal salt according to any one of [1] to [5], in which the separation step includes at least the first separation step and a 2b-th separation step which use a nanofiltration membrane, and the non-permeated water obtained in the first separation step is treated in the 2b-th separation step.

[7] The method for recovering a rare metal salt according to any one of [1] to [6], in which permeated water having a lithium ion concentration (mg-L) of 1000 times or more as high as a polyvalent metal ion concentration (mg/L) is obtained in the separation step.

[8] The method for recovering a rare metal salt according to any one of [1] to [7], in which an operating pressure in the separation step is equal to or lower than an osmotic pressure of the raw water supplied to the nanofiltration membrane.

[9] The method for recovering a rare metal salt according to any one of [1] to [8], further including, between the acid treatment step and the separation step, a pretreatment step of treating the rare metal-containing acidic aqueous solution with a microfiltration membrane having an average surface pore diameter of 0.05 µm to 10 µm.

[10] The method for recovering a rare metal salt according to any one of [1] to [9], further including, between the acid treatment step and the separation step, a pretreatment step of treating the rare metal-containing acidic aqueous solution with an ultrafiltration membrane having an average surface pore diameter of 3 nm to 16 nm.

[11] The method for recovering a rare metal salt according to [9] or [10], in which in the pretreatment step, a temperature of the rare metal-containing acidic aqueous solution to be treated is 0° C. to 100° C.

[12] The method for recovering a rare metal salt according to any one of [1] to [11], in which
the concentration step includes a concentration step of obtaining non-permeated water having a higher concentration of the monovalent rare metal than that of the permeated water in the separation step and permeated water having a lower concentration of the monovalent rare metal than that of the permeated water in the separation step, by using a reverse osmosis membrane satisfying the following condition (2),
condition (2):
a removal ratio of isopropyl alcohol is 95% or more and a removal ratio of boron ions is 75% or more when the reverse osmosis membrane is immersed in a sulfuric acid aqueous solution having a pH of 1 and a temperature of 25° C. for 24 hours, and then an aqueous solution having a pH of 6.5 and a temperature of 25° C. and including 30 mg/L boric acid, 100 mg/L isopropyl alcohol, and 30000 mg/L lithium chloride is allowed to pass through the reverse osmosis membrane under an operating pressure of 5.5 MPa.

[13] The method for recovering a rare metal salt according to any one of [1] to [12], in which the concentration step includes at least first and second concentration steps which use the reverse osmosis membrane, and non-permeated water obtained in the first concentration step is treated in the second concentration step.

[14] The method for recovering a rare metal salt according to any one of [1] to [13], further including a mixing step of mixing the permeated water produced in the concentration step with the rare metal-containing acidic aqueous solution obtained in the acid treatment step,
in which, in the separation step, the permeated water and the non-permeated water are obtained from a mixed water obtained in the mixing step.

[15] The method for recovering a rare metal salt according to any one of [1] to [14], in which a nanofiltration membrane having a positive value of surface zeta potential at pH 3 is used as the nanofiltration membrane.

[16] The method for recovering a rare metal salt according to any one of [1] to [15], in which
the nanofiltration membrane includes a base material, a porous support layer on the base material, and a separation function layer on the porous support layer,
the separation function layer includes a crosslinked polyamide, and
a total proportion of halogen in elements measured in X-ray photoelectron spectroscopy measurement of a surface on a separation function layer side is less than 0.1%.

[17] The method for recovering a rare metal salt according to any one of [1] to [16], in which
the nanofiltration membrane includes a base material, a porous support layer on the base material, and a separation function layer on the porous support layer, and
there is only one peak having a maximum in a range of 1600 cm$^{-1}$ to 1700 cm$^{-1}$ when a surface on the separation function layer side is measured by a total reflection infrared absorption spectrum method, and when the peak is defined as a peak A, a peak intensity ratio ($I_A/I_{1242}$) measured after immersing the nanofiltration membrane in a 1 M sulfuric acid aqueous solution at 40° C. for 21 days is 0.40 or more and 1.0 or less as compared with a peak intensity ratio ($I_A/I_{1242}$) measured before the immersion,
provided that $I_A$ and $I_{1242}$ are the following absorption peak values, respectively,
$I_A$: absorption peak value corresponding to the separation function layer present in the range of 1600 cm$^{-1}$ to 1700 cm$^{-1}$
$I_{1242}$: absorption peak value corresponding to the porous support layer at 1242 cm$^{-1}$.

[18] The method for recovering a rare metal salt according to any one of [1] to [17], in which
the nanofiltration membrane includes a base material, a porous support layer on the base material, and a separation function layer on the porous support layer, and
the separation functional layer includes a crosslinked polyamide having a structure derived from a polyfunctional aliphatic amine represented by the following general formula (1),

[Chem. 1]

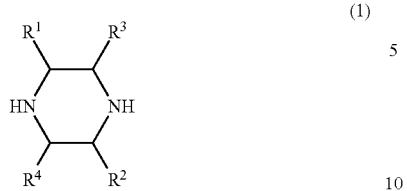

provided that $R^1$ and $R^2$ each independently means an alkyl group having 1 to 6 carbon atoms, a phenyl group, a benzyl group, $COOR^5$, $CONHR^5$, $CON(R^5)_2$, or $OR^5$, and $R^5$ means a hydrogen atom, an alkyl group having 1 to 6 carbon atoms, a phenyl group, or a benzyl group; and $R^3$ and $R^4$ each independently means hydrogen, an alkyl group having 1 to 6 carbon atoms, a phenyl group, a benzyl group, $COOR^6$, $CONHR^6$, $CON(R^6)_2$ or $OR^6$, and $R^6$ means a hydrogen atom, an alkyl group having 1 to 6 carbon atoms, a phenyl group or a benzyl group.

[19] The method for recovering a rare metal salt according to any one of [1] to [18], in which the nanofiltration membrane includes a base material, a porous support layer on the base material, and a separation function layer on the porous support layer, and the separation function layer includes a crosslinked aromatic polyamide, and the crosslinked aromatic polyamide has a structure represented by the following general formula (2),

[Chem. 2]

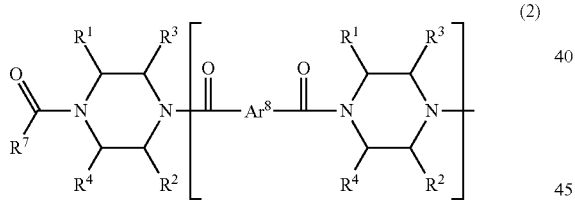

provided that $R^1$ to $R^4$ have the same meanings as $R^1$ to $R^4$ in the general formula (1), and $R^7$ is an aliphatic chain or an aliphatic ring including only a carbon atom and a hydrogen atom as a constituent element, and $Ar^8$ is an aromatic ring having 6 to 14 carbon atoms which may have a substituent.

[20] The method for recovering a rare metal salt according to any one of [12] to [19], in which a reverse osmosis membrane having a negative value of surface zeta potential at pH 3 is used as the reverse osmosis membrane used in the concentration step.

[21] The method for recovering a rare metal salt according to any one of [12] to [20], in which the reverse osmosis membrane used in the concentration step includes a base material, a porous support layer on the base material, and a separation function layer on the porous support layer, and the separation function layer includes a crosslinked aromatic polyamide.

[22] The method for recovering a rare metal salt according to any one of [12] to [21], in which the reverse osmosis membrane used in the concentration step includes a base material, a porous support layer on the base material, and a separation function layer on the porous support layer, the separation function layer includes a crosslinked aromatic polyamide, and a total proportion of halogen in elements measured in X-ray photoelectron spectroscopy measurement of a surface on a separation function layer side is less than 0.1%.

[23] The method for recovering a rare metal salt according to any one of [12] to [22], in which the reverse osmosis membrane used in the concentration step includes a base material, a porous support layer on the base material, and a separation function layer on the porous support layer, the separation function layer has a fold structure in which convex portions and concave portions are repeated, the convex portion and the concave portion being formed of a thin membrane of a crosslinked aromatic polyamide, and a convex portion having a deformation amount of 2.5 nm or less when the convex portion is pressed in pure water with a force of 5 nN occupies 40% or more.

[24] The method for recovering a rare metal salt according to any one of [12] to [23], in which the reverse osmosis membrane used in the concentration step includes a base material, a porous support layer on the base material, and a separation function layer on the porous support layer, the separation function layer has a fold structure in which convex portions and concave portions are repeated, the convex portion and the concave portion being formed of a thin membrane of a crosslinked aromatic polyamide, and a reverse osmosis membrane in which, among the convex portions, a proportion of a convex portion having a deformation amount of 2.5 nm or less when the convex portion is pressed in a sulfuric acid aqueous solution having a pH of 1 with a force of 5 nN is 0.50 times or more as large as a proportion of a convex portion having a deformation amount of 2.5 nm or less when the convex portion is pressed in pure water with a force of 5 nN is used.

[25] The method for recovering a rare metal salt according to any one of [12] to [24], in which the reverse osmosis membrane used in the concentration step includes a base material, a porous support layer on the base material, and a separation function layer on the porous support layer, and the separation function layer includes a crosslinked aromatic polyamide, and the crosslinked aromatic polyamide has at least one of structures represented by the following general formula (3) or (4),

[Chem. 3]

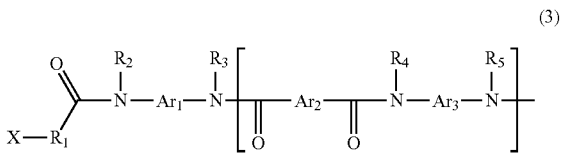

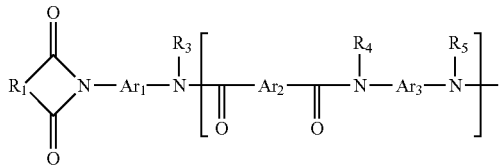

(4)

provided that $Ar_1$ to $Ar_3$ are each independently an aromatic ring having 5 to 14 carbon atoms which may have a substituent. $R^1$ is an atomic group having neither an aromatic ring nor a heteroatom. X is a hydrogen atom or a carboxy group, and $R^2$ to $R^5$ are each independently a hydrogen atom or an aliphatic chain having 1 to 10 carbon atoms.

[26] The method for recovering a rare metal salt according to any one of [1] to [25], in which, in the acid treatment step, the rare metal-containing acidic aqueous solution includes a monovalent anion, and the acid treatment step includes a step of adjusting a molar concentration of the monovalent anion to 0.1 equivalent or more with respect to a molar concentration of a whole anion.

[26] The method for recovering a rare metal salt according to any one of [1] to [26], in which the acid treatment step includes a step of adjusting a pH of the rare metal-containing acidic aqueous solution to 0.5 or more and 7.0 or less.

[28] The method for recovering a rare metal salt according to any one of [1] to [27], in which the monovalent anion is a fluoride ion, a chloride ion, a bromide ion, an iodide ion, a nitrate ion, or an acetate ion.

Advantageous Effects of Invention

According to the present invention, by treating a rare metal-containing acidic aqueous solution with a nanofiltration membrane satisfying a specific condition, a monovalent rare metal and a polyvalent rare metal can be separated from each other in a highly selective manner and stably for a long period of time.

DESCRIPTION OF EMBODIMENTS

Figure 1:
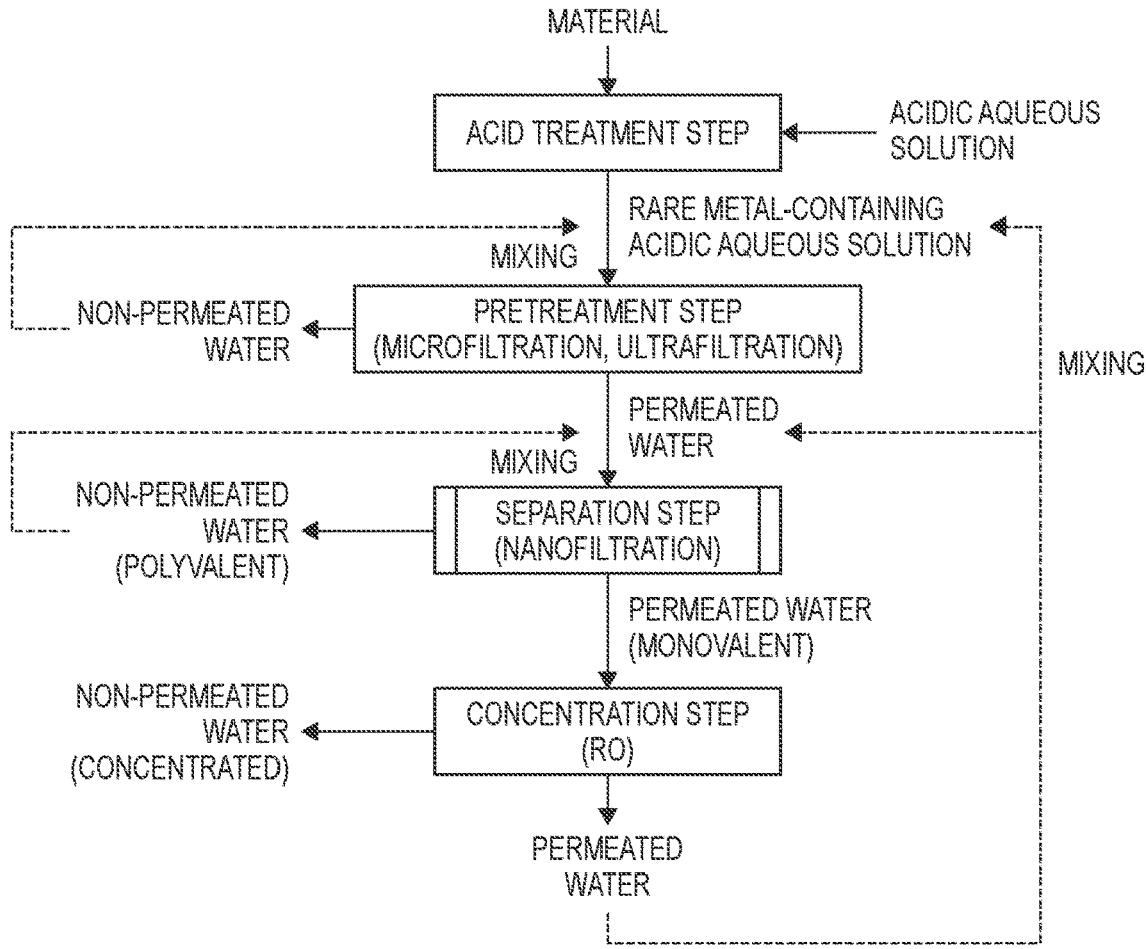
FIG. 1 is a flowchart showing an embodiment of a method for recovering a rare metal salt.

A method for recovering a rare metal salt according to the present embodiment includes: an acid treatment step of obtaining a rare metal-containing acidic aqueous solution by bringing a material containing monovalent and polyvalent rare metals into contact with an acidic aqueous solution, a separation step of obtaining permeated water containing the monovalent rare metal and non-permeated water containing the polyvalent rare metal from the rare metal-containing acidic aqueous solution by using a nanofiltration membrane satisfying the above condition (1); and a concentration step of obtaining non-permeated water having a higher concentration of the monovalent rare metal than that of the permeated water in the separation step and permeated water having a lower concentration of the monovalent rare metal than that of the permeated water in the separation step, by using a reverse osmosis membrane. Each step will be described below. FIG. 1 is a flowchart showing an embodiment of the method for recovering a rare metal salt of the present invention.

[1] Acid Treatment Step

The method for recovering a rare metal salt described in the present embodiment includes a step of obtaining a rare metal-containing acidic aqueous solution by bringing a material containing monovalent and polyvalent rare metals into contact with an acidic aqueous solution.

(1) Monovalent Rare Metal

Specific examples of the monovalent rare metal include lithium and cerium.

(2) Polyvalent Rare Metal

Specific examples of the polyvalent rare metal include beryllium, titanium, chromium, manganese, cobalt, nickel, gallium, germanium, selenium, strontium, zirconium, vanadium, and rare earth elements.

(3) Rare Metal-Containing Material

The rare metal-containing material contains at least one of the above-described monovalent and polyvalent rare metals respectively. Specific examples thereof include a lithium ion battery, and a waste material, a waste liquid, an ore, and a slag generated in a manufacturing process thereof. A lithium ion battery is preferable as the material because of a high demand for reuse and a high purity of rare metals contained therein.

A lithium ion battery is composed of members such as a positive electrode material, a negative electrode material, a separator, and an electrolyte. Among these members, a material containing a monovalent rare metal such as lithium can be used as the material. In particular, since the positive electrode material contains a monovalent rare metal such as lithium and a polyvalent rare metal such as cobalt or nickel, the positive electrode material serves as a recovery source of a plurality of rare metals.

The material may further contain at least one element selected from alkali metals such as sodium and potassium, alkaline earth metals such as magnesium and calcium, typical elements such as aluminum, tin, and lead, and transition elements such as iron and copper.

(4) Acidic Aqueous Solution

The acidic aqueous solution to be in contact with the above material preferably contains at least one acid of hydrochloric acid, sulfuric acid, nitric acid, formic acid, acetic acid, and oxalic acid.

The contact between the acidic aqueous solution and the material may be performed by, for example, immersing the material in the acidic aqueous solution. Other methods may be used as long as the target rare metal can be eluted. The temperature of the acidic aqueous solution to be in contact with the material is preferably 10° C. or more and 100° C. or less from the viewpoint of the elution efficiency of the rare metal salt, and more preferably 20° C. or more and 80° C. or less from the viewpoint of cost and safety.

(5) Rare Metal-Containing Acidic Aqueous Solution

The obtained rare metal-containing acidic aqueous solution contains salts of rare metals and other metal elements contained in the above material and one or more conjugated bases (for example, anions such as a chloride ion, a nitrate ion, a sulfate ion, a carbonate ion, and an acetate ion) contained in the above acidic aqueous solution.

The anions preferably contain a monovalent anion (for example, a fluoride ion, a chloride ion, a bromide ion, an iodide ion, a nitrate ion, an acetate ion) from the viewpoint of separation and recovery efficiency of the monovalent rare metal salt, and is more preferably a chloride ion or a nitrate ion from the viewpoint of ease of handling. In the separation step described below, monovalent rare metal ions pass through the nanofiltration membrane together with anions. At this time, when the permeability of anions is low, the permeability of the monovalent rare metal ions is also reduced in order to maintain electrical neutrality. Therefore, when monovalent anions having a small hydrated ion radius coexist, the permeation of the monovalent rare metal ions together with anions is promoted, and the monovalent rare metal salt can be efficiently recovered.

In addition, the content of the monovalent anions is preferably 0.1 equivalents or more with respect to the molar concentration of the whole anion, in order to obtain a suitable separation and recovery efficiency of the monovalent rare metal salt in terms of cost. It is more preferable to use an aqueous solution having the content of the monovalent anions of 0.5 equivalent or more as raw water. Furthermore, the anions that pass through the nanofiltration membrane together with the monovalent rare metal ions in order to maintain the balance of charges are considered to be mainly monovalent anions. Therefore, the molar concentration of the monovalent anion is preferably 1 or more times the molar concentration of the monovalent rare metal ion.

A step of eluting monovalent rare metal ions and a step of adjusting the molar concentration may be performed as one step or may be performed as separate steps.

When elution is performed with a mixed solution of sulfuric acid and an acid (hydrochloric acid, etc.) composed of monovalent anions, and the obtained aqueous solution satisfies the condition of the molar concentration, a step of further adjusting the molar concentration may not be performed.

According to the method for recovering a rare metal salt of the embodiment of the present invention, in the acid treatment step, the rare metal-containing acidic aqueous solution contains monovalent anions, and a step of adjusting the molar concentration of the monovalent anion to 0.1 equivalent or more with respect to the molar concentration of the whole anion may be included.

The concentration is confirmed after elution, and when the concentration is less than 0.1 equivalent, monovalent anions may be added using hydrochloric acid or a chloride salt (for example, LiCl) to adjust the molar concentration to 0.1 equivalent or more.

In addition, acid leaching is performed with sulfuric acid. After the concentration is confirmed, monovalent anions may be added using hydrochloric acid, a chloride salt (for example, LiCl), or the like to adjust the molar concentration to 0.1 equivalent or more.

This step may further include a step of adjusting a pH of the rare metal-containing acidic aqueous solution to 0.5 or more and 7.0 or less. Each step may be performed independently of the step of eluting monovalent rare metal ions described above and other steps, or two or more steps may be performed simultaneously in one operation.

The rare metal-containing acidic aqueous solution may further contain an organic compound. When the rare metal-containing material is a battery, examples of an organic compound derived from a binder, a separator, an electrolytic solution, or the like for connecting an active material to a current collector include polyvinylidene fluoride (PVDF), cross-linked polyacrylic acid, polyolefin, and carbonate ester. When the permeated water obtained in the concentration step described later is used in the acid treatment step, a separation functional layer of the nanofiltration membrane or the reverse osmosis membrane is hydrolyzed, and thus polyamide (including peptide) may be dissolved in the acidic aqueous solution. These organic compounds can be foulants, but according to the method described in this specification, these foulants can be removed by the pretreatment step.

[2] Pretreatment Step

The method for recovering a rare metal salt according to the embodiment of the present invention preferably includes a pretreatment step between the acid treatment step and the separation step.

In this step, the rare metal-containing acidic aqueous solution is preferably treated with a microfiltration membrane or an ultrafiltration membrane, and more preferably treated with a microfiltration membrane or an ultrafiltration membrane after the temperature of the rare metal-containing acidic aqueous solution is adjusted to 0° C. or higher and 100° C. or lower.

The method for recovering a rare metal salt according to the embodiment of the present invention may include, between the treatment step and the separation step, a pretreatment step of treating a rare metal-containing acidic aqueous solution with a microfiltration membrane having an average surface pore diameter of 0.05 µm to 10 µm.

The method for recovering a rare metal salt according to the embodiment of the present invention may include, between the acid treatment step and the separation step, a pretreatment step of treating a rare metal-containing acidic aqueous solution with an ultrafiltration membrane having an average surface pore diameter of 3 nm to 16 nm.

In the pretreatment step, the temperature of the rare metal-containing acidic aqueous solution to be treated may be 0° C. to 100° C.

(1) Microfiltration Membrane

When the rare metal-containing acidic aqueous solution contains an organic substance, the organic substance may cause clogging of the nanofiltration membrane due to fouling in the next separation step. Therefore, it is preferable to perform filtration with a microfiltration membrane before the rare metal-containing acidic aqueous solution is supplied to the separation step with a nanofiltration membrane. By preventing the nanofiltration membrane from being clogged, it is possible to inhibit a decrease in the amount of water production and a decrease in the monovalent/divalent selective separativeness.

On the other hand, when the average surface pore diameter of the microfiltration membrane is small, a foulant is likely to accumulate inside the pores, which causes clogging of the membrane surface of the microfiltration membrane. When the filtration performance deteriorates due to the membrane surface clogging, the performance can be restored by cleaning with a chemical agent such as sodium hypochlorite. However, sodium hypochlorite remaining after cleaning comes into contact with the nanofiltration membrane in the subsequent separation step and the reverse osmosis membrane in the subsequent concentration step. When the nanofiltration membrane or the reverse osmosis membrane in contact with sodium hypochlorite is exposed to strongly acidic conditions for a long period of time, the separation function layer is significantly deteriorated, and as a result, the monovalent/divalent selective separativeness in the separation step decreases, and the recovery rate of monovalent ions in the concentration step decreases. Therefore, in order to inhibit the clogging of the membrane surface of the microfiltration membrane and reduce the frequency of cleaning with a chemical agent while maintaining excellent resistance to foulant, the average surface pore diameter of the microfiltration membrane used in this step is preferably 0.05 μm to 10 μm, more preferably 0.1 μm to 5 μm, and still more preferably 0.5 μm to 1 μm.

The average surface pore diameter of the microfiltration membrane can be calculated by observing the surface of the microfiltration membrane with a scanning microscope (hereinafter referred to as "SEM"). More specifically, the surface of a porous membrane is observed using an SEM at a magnification of 3 to 100000 times, and an area of each of 300 randomly selected pores is measured. From the area of each pore, the diameter when it is assumed that the pore is a circle is calculated as the pore diameter, and the average value thereof can be used as the average surface pore diameter.

(2) Ultrafiltration Membrane

When the rare metal-containing acidic aqueous solution contains an organic compound, the organic compound may cause clogging of the nanofiltration membrane due to fouling in the subsequent separation step. Therefore, it is preferable to perform filtration with an ultrafiltration membrane before the rare metal-containing acidic aqueous solution is supplied to the separation step using a nanofiltration membrane. The ultrafiltration membrane used in this step preferably has an average surface pore diameter of 3 nm to 16 nm, more preferably 6 nm to 14 nm, and still more preferably 8 nm to 11 nm, in order to exhibit excellent separativeness.

The average surface pore diameter of the ultrafiltration membrane can be calculated by observing the surface of the ultrafiltration membrane with a scanning microscope (hereinafter referred to as "SEM"). More specifically, the surface of a porous membrane is observed using an SEM at a magnification of 3 to 100000 times, and an area of each of 300 randomly selected pores is measured. From the area of each pore, the diameter when it is assumed that the pore is a circle is calculated as the pore diameter, and the average value thereof can be used as the average surface pore diameter.

(3) Raw Water

An aqueous solution treated with the microfiltration membrane, the ultrafiltration membrane, the nanofiltration membrane, or the reverse osmosis membrane is referred to as "raw water". As the raw water in the treatment with the microfiltration membrane or the ultrafiltration membrane, the acidic aqueous solution obtained in the acid treatment step may be used as it is, or may be treated in some way. In either case, the raw water in this step is referred to as a "rare metal-containing acidic aqueous solution" for convenience.

In addition to the acid treatment step, the treatment performed on the rare metal-containing acidic aqueous solution may be, for example, pH adjustment. A pH of the raw water is preferably 0.5 or more, more preferably 1.0 or more, and still more preferably 2.0 or more. When the pH is 0.5 or more, the pore diameters of the microfiltration membrane and the ultrafiltration membrane are less likely to be increased due to the pH, and a high rejection rate against the foulant can be maintained. In addition, the pH is preferably 7.0 or less, more preferably 6.0 or less, and still more preferably 5.0 or less. When the pH is 7.0 or less, precipitation of an inorganic salt derived from a polyvalent rare metal can be inhibited.

A total ion concentration of the metal in the raw water is preferably 500 mg/L or more, more preferably 1000 mg/L or more, and still more preferably 2000 m/L or more. This is because when the ion concentration in the aqueous solution is low, the effect of ion blocking by charge repulsion becomes remarkable. On the other hand, the upper limit thereof is preferably 50000 mg/L or less, more preferably 20(0) mg/L or less, and still more preferably 10000 mg/L or less. As the ion concentration in the aqueous solution increases, a solid is generated, and the membrane surface may be damaged. The aqueous solution preferably has a pH of 7 or less. This is because precipitation occurs under basic conditions and clogging of the pipe is caused. In addition, as the acidity of the aqueous solution increases, the deterioration of the membrane performance is accelerated, and therefore, the pH value is preferably in a range of 0.5 or more, more preferably in a range of 1 or more, and still more preferably in a range of 2 or more.

(4) Temperature Conditions

In the filtration with the microfiltration membrane and the ultrafiltration membrane, the temperature of the raw water is preferably 100° C. or lower, more preferably 70° C. or lower, still more preferably 60° C. or lower, and yet still more preferably 40° C. or lower. The pore diameters of the microfiltration membrane and the ultrafiltration membrane change depending on the temperature, but when the water temperature of the raw water is 100° C. or lower, the change is inhibited to such an extent that the foulant can be effectively blocked. On the other hand, the temperature of the raw water is preferably 0° C. or higher, more preferably 5° C. or higher, still more preferably 10° C. or higher, and yet still more preferably 15° C. or higher. When the temperature is 0° C. or higher, the viscosity of the raw water can be kept low, so that the amount of treated water per unit time, that is, the treatment efficiency can be kept high. In addition, the motion of the foulant in water is promoted, the accumulation of the foulant in the pore can be prevented, and the membrane surface clogging can be inhibited.

[3] Separation Step

Figure 2:
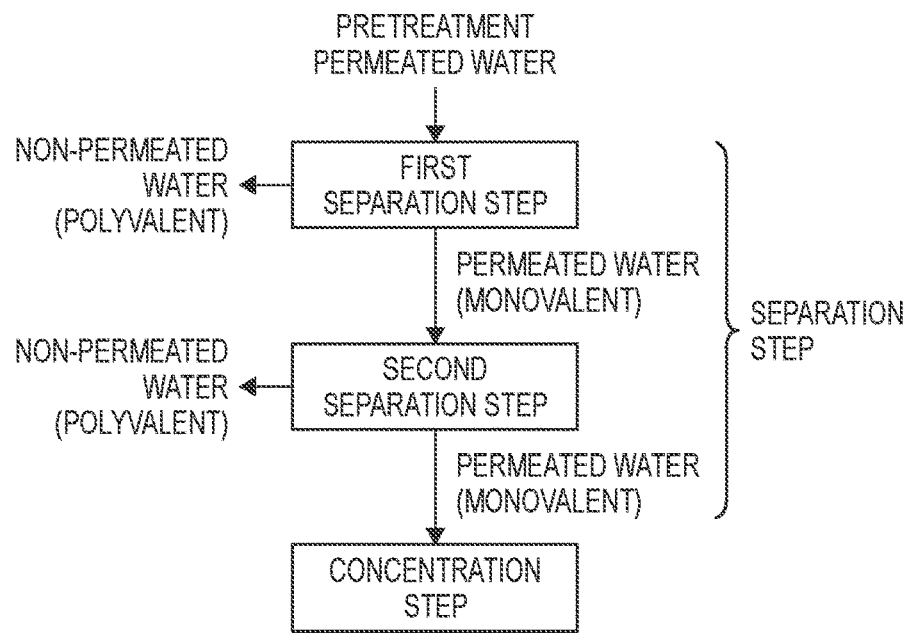
FIG. 2 is a flowchart showing an example of a separation step.

In this step, permeated water containing a monovalent rare metal and non-permeated water containing a polyvalent rare metal are obtained from a rare metal-containing acidic aqueous solution by a nanofiltration membrane satisfying the following condition. FIG. 2 is a flowchart showing an example of the separation step.

(1) Nanofiltration Membrane

In the nanofiltration membrane used in this step, a difference between a removal ratio of magnesium sulfate and a removal ratio of magnesium chloride is 20% or less when a 2000 mg/L magnesium sulfate aqueous solution and a 2000 mg/L magnesium chloride aqueous solution, each having a pH of 6.5 and a temperature of 25° C., are allowed to pass through the nanofiltration membrane under an operating pressure of 0.5 MPa; and a difference between a removal ratio of glucose and a removal ratio of isopropyl alcohol is 40% or more and the removal ratio of glucose is 70% or more when a 1000 mg/L glucose aqueous solution and a 1000 mg/L isopropyl alcohol aqueous solution, each having a pH of 6.5 and a temperature of 25° C., are allowed to pass through the nanofiltration membrane under an operating pressure of 0.5 MPa.

The use of such a nanofiltration membrane is preferable in that a long-term operation of highly efficiency selective separation and recovery of monovalent rare metal ions and polyvalent rare metal ions under acidic conditions can be performed, and a highly efficient process can be achieved, for example, multi-stage treatment of permeated water due to a decrease in highly selective separation and recovery efficiency of rare metal ions is unnecessary or can be reduced.

(2) Raw Water

The raw water in this step is the rare metal-containing acidic aqueous solution obtained in the acid treatment step, but may be an aqueous solution obtained by treating the rare metal-containing acidic aqueous solution by the pretreatment step, or may be an aqueous solution obtained by subjecting the aqueous solution to a pretreatment such as dilution or concentration, or a mixing step described later. In addition, the pH or the temperature may be adjusted as necessary.

The total ion concentration of the monovalent rare metal in the raw water is preferably in a range of 0.5 mg/L or more and 50000 mg/L or less, and more preferably in a range of 5 mg/L or more and 20000 mg/L or less. When lithium is to be recovered, the ion concentration of lithium is preferably in these ranges. That is, the raw water in the separation step may contain lithium as the monovalent rare metal, and the lithium ion concentration in the raw water may be in a range of 0.5 mg/L or more and 50000 mg/L or less.

The total ion concentration of the polyvalent rare metal in the raw water is preferably 0.5 mg/L or more and 100000 mg/L or less. When the total ion concentration of the raw water is 0.5 mg/L or more, a useful amount of polyvalent rare metal can be recovered. When the total ion concentration of the polyvalent rare metal is 100000 mg/L or less, separation from the monovalent rare metal is relatively easy.

The raw water preferably contains at least one polyvalent rare metal among cobalt, nickel, and manganese.

(3) Permeated Water and Non-Permeated Water

In this step, a monovalent rare metal and a divalent rare metal can be separated by utilizing the difference in permeability of the nanofiltration membrane with respect to the monovalent ion and the divalent ion. That is, a ratio of a total ion concentration (mg/L) of the monovalent rare metal to a total concentration (mg/L) of the polyvalent rare metal in the permeated water is larger than a ratio of that in the raw water, i.e., the rare metal-containing acidic aqueous solution, and a ratio of that in the non-permeated water is smaller than the ratio of that in the raw water.

In this step, it is preferable to obtain permeated water in which a ratio of a total ion concentration (mg/L) of the monovalent rare metal to a total ion concentration (mg/L) of the polyvalent metal is 100 or more, and it is more preferable to obtain permeated water in which the ratio is 1000 or more. When such permeated water is not obtained by one separation, a plurality of separation steps may be performed. That is, the permeated water or the non-permeated water may be further separated, and the obtained permeated water may be mixed as necessary to obtain a permeated water having such a concentration. Here, the "concentration of the polyvalent metal ions" is a total of the concentrations of polyvalent rare metal ions and other polyvalent metal ions. The "concentration of the monovalent rare metal ions" is a total of the concentrations of monovalent rare metal ions, and is preferably the concentration of lithium ions alone.

In the separation step, it is preferable to obtain permeated water in which a concentration (mg/L) of lithium ions is 1000 times or more a concentration (mg/L) of polyvalent metal ions.

When this ratio is 1000 times or more, it can be said that the purity of the monovalent rare metal salt is sufficiently high.

A mass of the polyvalent rare metal ions is calculated by, for example, a total ion equivalent mass of cobalt ions, nickel ions, and the like in terms of ions. A monovalent rare metal ion equivalent mass is calculated, for example, by a total of ion equivalent mass of lithium ions, cesium ions, and the like. Depending on the element, the element may be present in the aqueous solution as a multiatomic ion instead of a monoatomic ion, and the equivalent mass is a mass when it is assumed that the element is present as a monoatomic ion. The ion equivalent mass of the polyvalent and monovalent rare metals can be determined, for example, by analyzing the aqueous solution to be measured using a P-4010 type ICP (high frequency inductive coupling plasma emission spectrometry) apparatus manufactured by Hitachi, Ltd., and quantifying the concentration (mg/L) of various rare metal ions.

(4) Pressure

The operating pressure in the separation step (that is, the pressure of the raw water) is preferably 0.1 MPa or more and 8 MPa or less. Since the membrane permeation rate increases as the pressure increases, a practical membrane permeation rate can be realized when the pressure is 0.1 MPa or more. In addition, when the pressure is 8 MPa or less, damage to the nanofiltration membrane can be prevented to be small. The operating pressure is more preferably 0.5 MPa or more and 6 MPa or less, and still more preferably 1 MPa or more and 4 MPa or less.

The operating pressure in the separation step is preferably equal to or lower than the osmotic pressure of the raw water supplied to the nanofiltration membrane. When the operating pressure in the separation step is lower than or equal to the osmotic pressure of the raw water, damage to the nanofiltration membrane can be further prevented.

When the separation step includes a plurality of separation steps, the operating pressure in each separation step is preferably in the above range.

(5) Number of Times

This step may include a plurality of separation steps using a nanofiltration membrane.

Figure 3:
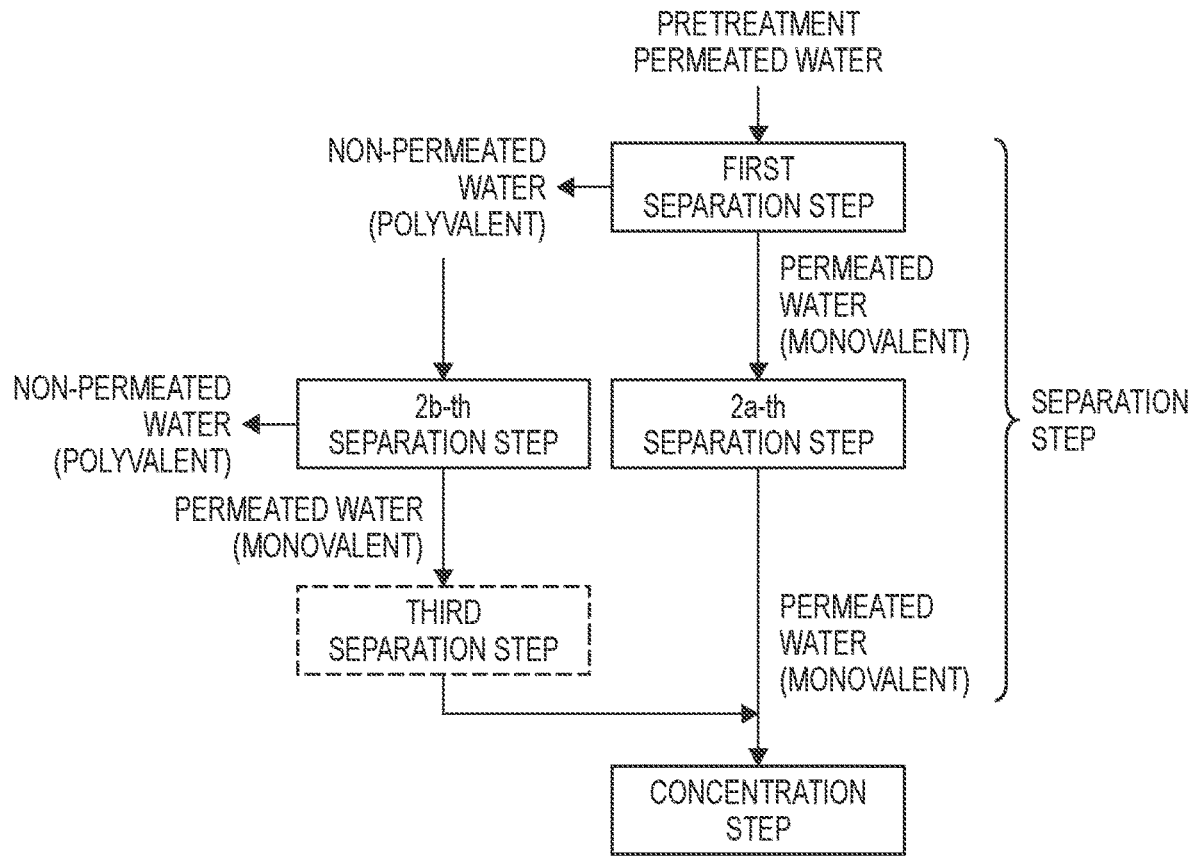
FIG. 3 is a flowchart showing another example of the separation step.

For example, this step may include at least first and second separation steps (FIG. 2), and permeated water and non-permeated water may be obtained in the second separation step using the permeated water obtained in the first separation step as raw water (FIG. 3). The second separation step in this case may be referred to as a 2a-th separation step.

The separation step may include at least the first separation step and the 2a-th separation step using the nanofiltration membrane, and the permeated water obtained in the first separation step may be treated in the 2a-th separation step.

In this step, the permeated water and the non-permeated water may be obtained in the second separation step using the non-permeated water obtained in the first separation step as raw water (FIG. 3). The second separation step in this case may be referred to as a 2b-th separation step.

The separation step may include at least the first separation step and the 2b-th separation step using the nanofiltration membrane, and the non-permeated water obtained in the first separation step may be treated in the 2b-th separation step.

The further separation of the permeated water (for example, a third separation step) and the further separation of the non-permeated water may be performed in combination (FIG. 3).

The step of further separating the permeated water and the non-permeated water by the nanofiltration membrane may be performed in combination with a step of diluting the permeated water and the non-permeated water, which is known as a general dialysis filtration method. The solution used for dilution at this time is not particularly limited, such as pure water or an acidic aqueous solution, but it is preferable to use permeated water having a low concentration of metal ions generated in the concentration step described later, because highly efficient separation and recovery of rare metal ions and reuse of the acidic aqueous solution can be performed.

When a plurality of separation steps are included, the obtained permeated water can be mixed or separately used in the next concentration step. All of the non-permeated water may be mixed or separately used for the recovery of a polyvalent rare metal, or may be mixed with the rare metal-containing acidic aqueous solution obtained in the acid treatment step.

(6) Others

As the raw water recovery rate of the nanofiltration membrane increases, there is a concern that the concentration of monovalent anions in the raw water decreases and the separation and recovery efficiency of lithium ions decreases, and therefore, the monovalent anions may be added to the raw water in the separation step with the nanofiltration membrane. As a method of adding a monovalent anion, a monovalent acid may be added, or a salt containing a monovalent anion may be added. It is possible to selectively employ these methods as necessary.

[4] Concentration Step

Figure 4:
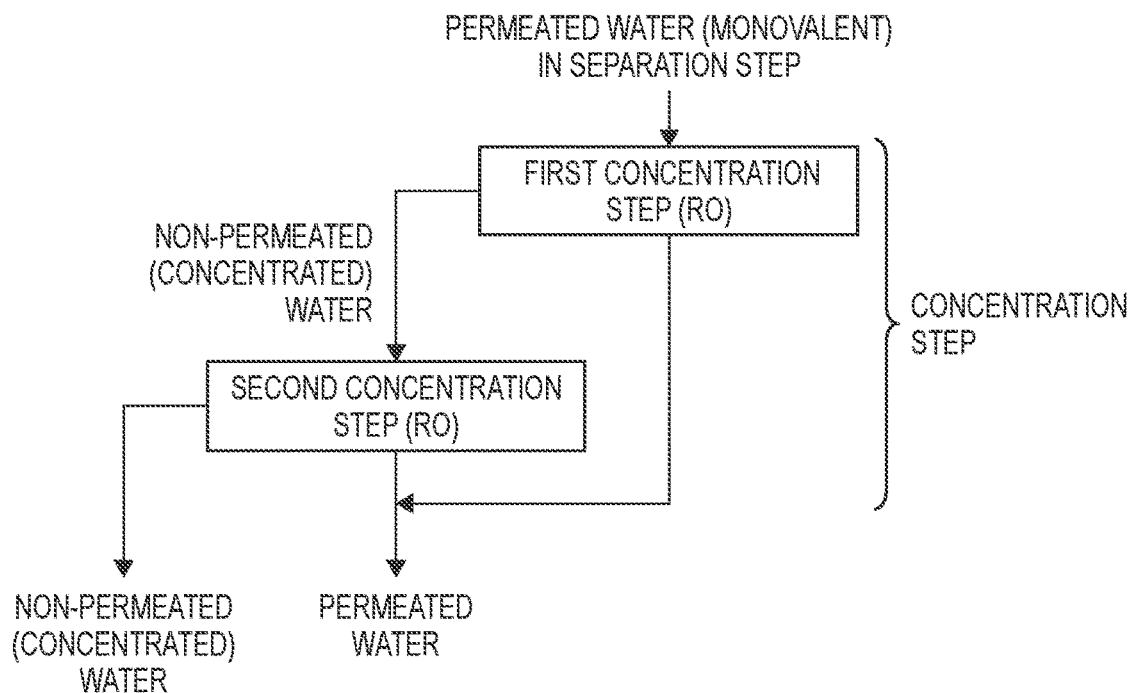
FIG. 4 is a flowchart showing an example of a concentration step.

In this step, the non-permeated water having a higher monovalent rare metal concentration than that of the permeated water in the separation step and the permeated water having a lower monovalent rare metal concentration than that of the permeated water in the separation step can be obtained by the reverse osmosis membrane. FIG. 4 is a flowchart showing an example of the concentration step.

(1) Reverse Osmosis Membrane

The present inventors have found that, by using a reverse osmosis membrane, a loss of a lithium salt in a concentration process of a monovalent rare metal salt, particularly the lithium salt, is extremely small regardless of a total salt concentration of raw water, and recovery with high efficiency is stably achieved.

In particular, it is preferable to use a reverse osmosis membrane that exhibits, after immersion in a sulfuric acid aqueous solution having a pH of 1 and a temperature of 25° C. for 24 hours, a removal ratio of isopropyl alcohol of 95% or more and a removal ratio of boron ion of 75% or more under an operating pressure of 5.5 MPa with respect to an aqueous solution having a pH of 6.5 and a temperature of 25° C. and containing 30 mg/L of boric acid, 100 mg/L of isopropyl alcohol, and 30000 mg/L of lithium chloride (condition (2)). The use of such a reverse osmosis membrane is preferable in that, regardless of the total salt concentration of the raw water, the loss of the lithium salt in the concentration process of the monovalent rare metal salt, in particular, the lithium salt is extremely small, a long-term operation is possible, and a highly efficient process can be achieved, for example, a multistage treatment of concentrated water due to a decrease in ion removability is unnecessary or can be reduced.

The details will be described later.

(2) Raw Water

The raw water is the permeated water obtained in the separation step. As described above, the raw water may be a mixture of the permeated water in the plurality of separation steps performed in the separation step. In addition, the raw water may be the permeated water itself obtained in the separation step, or may be obtained through another step performed between the separation step and the concentration step.

(3) Operating Conditions

The operating pressure in this step (that is, the pressure of the raw water) is preferably 0.5 MPa or more and 12 MPa or less. The larger the pressure is, the higher the membrane permeation rate is. When the pressure is 0.5 MPa or more, a practical membrane permeation rate can be realized. When the operating pressure is 12 MPa or less, damage to the reverse osmosis membrane can be prevented. The operating pressure is more preferably 1 MPa or more and 10 MPa or less, and still more preferably 2 MPa or more and 8 MPa or less.

(4) Number of Times of Concentration

This step may include a plurality of concentration steps using the reverse osmosis membrane.

For example, the concentration step may include at least first and second concentration steps using the reverse osmosis membrane, and the second concentration step may be performed using the non-permeated water obtained in the first concentration step as raw water (a dotted arrow in FIG. 1).

(5) Non-Permeated Water

In this step, non-permeated water having a higher concentration of the monovalent rare metal than that of the permeated water obtained in the separation step is obtained. The non-permeated water may also be referred to as concentrated water. Here, the "permeated water obtained in the separation step" is an aqueous solution supplied to the reverse osmosis membrane in the concentration step, that is, raw water. For example, when the separation step includes a plurality of separation steps and the raw water in the concentration step is a mixture of the permeated water in the plurality of separation steps, the concentration of the mixture is compared with the concentration of the non-permeated water in the concentration step rather than comparing the concentration of the permeated water in each separation step with the concentration of the non-permeated water in the concentration step.

[5] Recovery Step

A non-permeated solution in the concentration step contains a large amount of monovalent rare metals, and the non-permeated solution in the separation step contains a large amount of polyvalent rare metals. For the recovery of rare metals from these aqueous solutions, solvent extraction, adsorption with an ion exchange membrane or an ion exchange resin, crystallization, or the like can be used. The crystallization is induced by concentration of an aqueous solution, heating, cooling, addition of a nucleating agent or addition of a salt, or a combination of these methods.

In general, the crystallization of a monovalent rare metal salt is inhibited by the presence of polyvalent metal ions, and the crystallization becomes easy because the polyvalent metal ion and the monovalent rare metal ion are separated by the separation step described above. In addition, since the concentration of the monovalent rare metal is increased by the concentration step, the monovalent rare metal can be recovered more efficiently.

As the crystallization method, for example, a poorly soluble carbonate or hydroxide salt can be precipitated by adding a salt to an aqueous solution. In particular, lithium salts have a lower solubility than other alkali metal salts. Sodium carbonate and potassium carbonate have sufficiently high solubility in water (20 g or more per 100 mL of water), whereas only 1.33 g of lithium carbonate can be dissolved in 100 mL of water at 25° C., and further the solubility decreases at a higher temperature. By utilizing the difference in solubility, lithium can be recovered as lithium carbonate by adding a carbonate to a rare metal aqueous solution (specifically, a non-permeated water in the concentration step).

Before the polyvalent rare metal salt is recovered from the non-permeated water (containing the polyvalent rare metal salt) in the separation step, a step of concentrating the polyvalent rare metal salt with a reverse osmosis membrane or the like may be further performed.

[6] Mixing Step

The method for recovering a rare metal salt may further include a mixing step of mixing the permeated water obtained in the concentration step with the rare metal-containing acidic aqueous solution obtained in the acid treatment step (which may be the permeated water obtained in the pretreatment step) (a dotted arrow in FIG. 1). The aqueous solution obtained in the mixing step can be used as raw water in the separation step. A mixing ratio is not limited to a specific value, and may be adjusted so that the aqueous solution obtained by the mixing step has a metal salt concentration suitable for the separation step.

By the mixing step and the subsequent separation step, the rare metal contained in the permeated water in the concentration step can be recovered again. In addition, the acid is also reused.

When the permeated water obtained in the concentration step and the aqueous solution after the acid treatment step and before the pretreatment step are mixed, the pretreatment step may be performed after the mixing step. When the permeated water obtained in the concentration step and the permeated water obtained after the pretreatment step are mixed, whether to perform the pretreatment step again may be determined depending on the properties of the obtained mixed water (such as the concentration of foulant).

The method for recovering a rare metal salt according to the embodiment of the present invention may further include a mixing step of mixing the permeated water generated in the concentration step with the rare metal-containing acidic aqueous solution obtained in the acid treatment step, and in the separation step, the permeated water and the non-permeated water may be obtained from the mixed water obtained in the mixing step.

In addition, the mixing ratio may be adjusted so as to be an ion concentration ratio suitable for a subsequent step such as the separation step.

[7] Nanofiltration Membrane and Reverse Osmosis Membrane

The nanofiltration membrane and the reverse osmosis membrane according to the present invention are a composite semipermeable membrane including a support membrane and a separation function layer formed on the support membrane. The separation function layer substantially has separation performance, and the support membrane allows water to pass through but does not substantially have separation performance of ions and the like, and can impart strength to the separation function layer.

The nanofiltration membrane referred to herein is a membrane defined by IUPAC as "a pressure driven membrane by which particles and polymers of a size smaller than 2 nm are blocked" by IUPAC. The nanofiltration membrane effective for application to the present invention is preferably a membrane which has a charge on the membrane surface and in which the ion separation efficiency is particularly improved by a combination of separation by pores (size separation) and electrostatic separation by charge on the membrane surface. It is necessary to apply a nanofiltration membrane capable of removing polymers by size separation while separating alkali metal ions to be recovered and other ions having different charge characteristics by charge.

The nanofiltration membrane according to the embodiment of the present invention is a membrane in a region having fractionation characteristics positioned between the reverse osmosis membrane and the ultrafiltration membrane. A membrane commonly known as a reverse osmosis membrane actually tends to remove most of organic substances and ions, and on the other hand, an ultrafiltration membrane usually does not remove most of ion species, but removes high-molecular-weight organic substances.

As a method for producing the composite semipermeable membrane element, methods disclosed in JP-B-S44-14216, JP-B-H4-11928, JP-A-H11-226366 can be used.

(1) Support Membrane

In the present embodiment, the support membrane includes a base material and a porous support layer. The present invention is not limited to this configuration. For example, the support membrane may be composed of only the porous support layer without having the base material.

(1-1) Base Material Examples of the base material include a polyester-based polymer, a polyphenylene sulfide-based polymer, a polyamide-based polymer, a polyolefin-based polymer, and a mixture or copolymer thereof. Among them, a fabric of a polyester-based polymer or a polyphenylene sulfide-based polymer having high mechanical and thermal stability is particularly preferable. As a form of the fabric, a long fiber nonwoven fabric, a short fiber nonwoven fabric, and a woven or knitted fabric can be preferably used.

(1-2) Porous Support Layer

In the present invention, the porous support layer does not substantially have separation performance of ions or the like, and is for imparting strength to the separation functional layer that substantially has the separation performance. The size and distribution of the pores of the porous support layer are not particularly limited. For example, it is preferable to use a porous support layer having uniform and fine pores or having pores that become larger gradually from the surface of a side on which the separation function layer is formed to the other surface and having a size of the fine pores of 0.1 nm or more and 100 nm or less on the surface of the side on which the separation function layer is formed. A material used for the support layer and a shape thereof are not particularly limited.

As the material of the porous support layer, for example, homopolymers or copolymers such as polysulfone, polyethersulfone, polyamide, polyester, cellulose-based polymer, vinyl polymer, polyphenylene sulfide, polyphenylene sulfide sulfone, polyphenylene sulfone, and polyphenylene oxide can be used alone or in combination. Examples of the cellulose-based polymer include cellulose acetate and cellulose nitrate, and examples of the vinyl polymer include polyethylene, polypropylene, polyvinyl chloride, and polyacrylonitrile.

Among them, homopolymers or copolymers such as polysulfone, polyamide, polyester, cellulose acetate, cellulose nitrate, polyvinyl chloride, polyacrylonitrile, polyphenylene sulfide, and polyphenylene sulfide sulfone are preferable. More preferred is cellulose acetate, polysulfone, polyphenylene sulfide sulfone, and polyphenylene sulfone. Furthermore, among these materials, polysulfone can be generally used because of high chemical, mechanical, and thermal stability and easy molding.

The polysulfone preferably has a mass average molecular weight (Mw) of 10000 or more and 200000 or less, more preferably 15000 or more and 100000 or less, when measured by gel permeation chromatography (GPC) using N-methylpyrrolidone as a solvent and polystyrene as a standard substance.

When the Mw of the polysulfone is 10000 or more, preferable mechanical strength and heat resistance can be obtained as the porous support layer. When the Mw is 200000 or less, the viscosity of the solution falls within an appropriate range, and good formability can be realized.

The thicknesses of the base material and the porous support layer affect the strength of the composite semipermeable membrane and the packing density when the composite semipermeable membrane is used as an element. In order to obtain sufficient mechanical strength and packing density, the total thickness of the base material and the porous support layer is preferably 30 μm or more and 300 μm or less, and more preferably 100 μm or more and 220 μm or less. The thickness of the porous support layer is preferably 20 μm or more and 100 μm or less. In the present specification, unless otherwise noted, the thickness means an average value. Here, the average value means an arithmetic average value. That is, the thicknesses of the base material and the porous support layer are obtained by calculating an average value of thicknesses at 20 points measured at intervals of 20 μm in a direction (surface direction of the membrane) orthogonal to the thickness direction in cross section observation.

(1-3) Forming Step of Support Membrane

A forming step of a support membrane can also be referred to as a forming step of a porous support layer. This step includes a step of applying a polymer solution to the base material and a step of immersing the base material to which the solution has been applied in a coagulation bath to coagulate the polymer.

In the step of applying the polymer solution to the base material, the polymer solution is prepared by dissolving a polymer, which is a component of the porous support layer, in a good solvent of the polymer.

The temperature of the polymer solution at the time of applying the polymer solution is preferably in a range of 10° C. to 60° C. when polysulfone is used as the polymer. When the temperature of the polymer solution is within this range, the polymer is not precipitated, and the polymer solution is sufficiently impregnated between the fibers of the base material and then solidified. As a result, a porous support layer firmly bonded to the base material due to an anchor effect can be obtained. The preferable temperature range of the polymer solution can be appropriately adjusted depending on the type of the polymer to be used, the desired solution viscosity, and the like.

After applying the polymer solution on the base material, a time until immersion in the coagulation bath is preferably in a range of 0.1 second to 5 seconds. When the time until immersion in the coagulation bath falls within this range, an organic solvent solution containing the polymer is sufficiently impregnated between the fibers of the base material and then solidified. The preferable range of the time until immersion in the coagulation bath can be appropriately adjusted depending on the type of the polymer solution to be used, the desired solution viscosity, and the like.

As the coagulation bath, water is usually used, but any bath may be used as long as the bath does not dissolve the polymer which is a component of the porous support layer. The temperature of the coagulation bath is preferably −20° C. to 100° C. The temperature of the coagulation bath is more preferably 10° C. to 50° C. When the temperature of the coagulation bath is 100° C. or less, vibration of a coagulation bath surface due to thermal motion can be prevented, and the smoothness of the membrane surface after membrane formation can be maintained. In addition, when the temperature is −20° C. or more, the coagulation rate can be maintained, and thus the membrane-forming property can be improved.

Next, the support membrane thus obtained may be cleaned with hot water in order to remove the solvent remaining in the membrane. The temperature of the hot water at this time is preferably 40° C. to 100° C., and more preferably 60° C. to 95° C. When the cleaning temperature is equal to or lower than the upper limit, the degree of shrinkage of the support membrane does not become too large, and a decrease in water permeability can be inhibited. In addition, when the cleaning temperature is 40° C. or more, a high cleaning effect is obtained.

(2) Separation Function Layer

The separation function layer of the nanofiltration membrane and the reverse osmosis membrane is a layer responsible for the separation function of a solute in the composite semipermeable membrane. In the present invention, the separation function layer of the nanofiltration membrane is a layer of polyamide mainly containing a polyfunctional aliphatic amine and a polyfunctional acid halide as a raw material, and the separation function layer of the reverse osmosis membrane is a layer of polyamide mainly containing a polyfunctional aromatic amine and a polyfunctional acid halide as a raw material.

(2-1) Separation Function Layer of Nanofiltration Membrane

For the separation function layer of the nanofiltration membrane used in the present invention, a polymer material such as a cellulose acetate-based polymer, polyamide, sulfonated polysulfone, polyacrylonitrile, polyester, polyimide, or vinyl polymer can be used. The membrane is not limited to the membrane composed of only one of these materials, and may be a membrane containing a plurality of materials. In addition, the membrane structure may be an asymmetric membrane having a dense layer on at least one surface of the membrane and having fine pores having a pore diameter gradually increasing from the dense layer toward the inside of the membrane or toward the other surface, or a composite membrane having a very thin functional layer formed of another material on the dense layer of the asymmetric membrane. As the composite membrane, for example, a composite membrane which is described in JP-A-S62-201606 and in which a nanofilter composed of a functional layer of polyamide is formed on a support membrane formed of polysulfone as a membrane material can be used.

Among these, a composite membrane having polyamide as a separation functional layer, which has a high pressure resistance, a high water permeability, and a high solute removal performance, and has an excellent potential is preferable. In order to maintain resistance to operating pressure, high water permeability, and blocking performance, a structure in which polyamide is used as a functional layer and the functional layer is held by a support formed of a porous membrane or nonwoven fabric is suitable. As the separation functional layer formed of polyamide, a composite semipermeable membrane having a functional layer of crosslinked polyamide obtained by a polycondensation reaction of a polyfunctional aliphatic amine and a polyfunctional acid halide on a support is suitable.

In the nanofiltration membrane according to the embodiment of the present invention, a difference between a removal ratio of magnesium sulfate and a removal ratio of magnesium chloride is 20% or less, more preferably 15% or less when a 2000 mg/L magnesium sulfate aqueous solution and a 2000 mg/L magnesium chloride aqueous solution, each having a pH of 6.5 and a temperature of 25° C., are respectively allowed to pass through the nanofiltration membrane under an operating pressure of 0.5 MPa; and a difference between a removal ratio of glucose and a removal ratio of isopropyl alcohol is 40% or more, the removal ratio of glucose is 70% or more, more preferably the removal ratio of glucose is 80% or more, and further preferably the removal ratio of glucose is 90% or more when a 1000 mg/L glucose aqueous solution and a 1000 mg/L isopropyl alcohol aqueous solution, each having a pH of 6.5 and a temperature of 25° C. are respectively allowed to pass through the nanofiltration membrane under an operating pressure of 0.5 MPa. Accordingly, both high acid resistance and high selective separation performance can be achieved.

In addition, as compared with a polyamide membrane formed of piperazine having no substituent, which is known as a common nanofiltration membrane, a polyamide membrane formed of piperazine having a substituent has high resistance to chemicals and can inhibit a decrease in selective separativeness of ions in the case of treating an acidic aqueous solution, and therefore, the polyamide membrane is preferably used in a long-term operation for the present purpose.

In particular, the polyamide separation function layer in the nanofiltration membrane according to the embodiment of the present invention preferably contains crosslinked polyamide having a structure derived from a polyfunctional aliphatic amine (piperazine-based compound) represented by the following general formula (1).

In the method for recovering a rare metal salt according to the embodiment of the present invention, it is preferable that the nanofiltration membrane includes a base material, a porous support layer on the base material, and a separation function layer on the porous support layer; and the separation function layer contains crosslinked polyamide having a structure derived from a polyfunctional aliphatic amine represented by the following general formula (1).

Specifically, it is preferable to contain crosslinked polyamide obtained by interfacial polymerization between a piperazine-based compound represented by the general formula (1) and a polyfunctional acid halide being divalent or higher. The separation function layer preferably contains 90 mass % or more of the crosslinked polyamide, and more preferably contains only the crosslinked polyamide.

[Chem. 4]

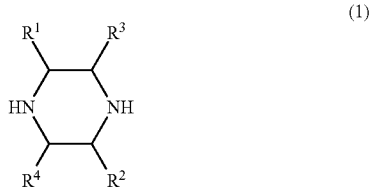

(1)

Since the nanofiltration membrane includes the separation function layer containing the polymer of the piperazine-based compound represented by the general formula (1) and the polyfunctional acid halide being divalent or higher, a gap of a crosslinked polyamide chain is widened due to a substituent in the vicinity of an amide group of a piperazine ring, a membrane having an appropriate pore diameter distribution is obtained, a steric hindrance occurs in the vicinity of the amide group, hydrolysis of the amide group by an acid or an alkali is inhibited, and resistance is improved. Therefore, it is preferable in that a long-term operation is possible, and a highly efficient process can be performed, for example, a multistage treatment of permeated water and concentrated water due to a decrease in selective separativeness of ions is unnecessary or can be reduced.

$R^1$ and $R^2$ in the general formula (1) each independently represent an alkyl group having 1 to 6 carbon atoms, a phenyl group, a benzyl group, $COOR^5$, $CONHR^5$, $CON(R^5)_2$, or $OR^5$, and $R^5$ represents hydrogen, an alkyl group having 1 to 6 carbon atoms, a phenyl group, or a benzyl group. On the other hand, $R^1$ and $R^4$ each independently represent hydrogen, an alkyl group having 1 to 6 carbon atoms, a phenyl group, a benzyl group, $COOR^6$, $CONHR^6$, $CON(R^6)_2$ or $OR^6$, and $R^6$ represents hydrogen, an alkyl group having 1 to 6 carbon atoms, a phenyl group or a benzyl group. Examples of the alkyl group having 1 to 6 carbon atoms in $R^1$ to $R^6$ include linear or branched methyl, ethyl, propyl, butyl, pentyl, hexyl, and cyclic cyclopropyl, cyclobutyl, cyclopentyl, and cyclohexyl. $R^1$ and $R^2$ are each independently preferably an alkyl group having 1 to 6 carbon atoms, a phenyl group, or a benzyl group, and particularly preferably an alkyl group having 3 to 6 carbon atoms, a phenyl group, or a benzyl group. $R^3$ and $R^4$ are each independently preferably hydrogen, an alkyl group having 1 to 6 carbon atoms, a phenyl group, or a benzyl group. By introducing the substituent into the piperazine structure, steric hindrance in the vicinity of the amide group and the pore diameter distribution (molecular gap) of the polyamide crosslinked structure can be suitably controlled, and the resistance to acid and alkali can be improved while maintaining water permeability and selective separativeness. When the carbon number of the substituent is too large, the crosslinking reaction of the polyamide is difficult to proceed due to the steric hindrance, and the selective separativeness and the resistance to acid and alkali are reduced. The piperazine-based compound represented by the general formula (1) may be used alone, or two or more kinds thereof may be used in combination.

The polyfunctional acid halide is an acid halide having two or more halogenated carbonyl groups in one molecule, and is not particularly limited as long as the compound gives polyamide by a reaction with the piperazine-based compound. Examples of the polyfunctional acid halide include halides such as oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, 1,4-benzenedicarboxylic acid, 1,3,5-benzenetrisulfonic acid, and 1,3,6-naphthalenetrisulfonic acid. Among the acid halides, acid chlorides are preferable, and in particular, trimesic acid chloride which is an acid halide of 1,3,5-benzenetricarboxylic acid, isophthalic acid chloride which is an acid halide of 1,3-benzenedicarboxylic acid, terephthalic acid chloride which is an acid halide of 1,4-benzenedicarboxylic acid, 1,3,5-benzenetrisulfonic acid chloride which is an acid halide of 1,3,5-benzenetrisulfonic acid, and 1,3,6-naphthalenetrisulfonic acid chloride which is an acid halide of 1,3,6-naphthalenetrisulfonic acid are preferable from the viewpoint of economic efficiency, easy availability, ease of handling, ease of reactivity, and the like. The polyfunctional acid halide may be used alone or as a mixture of two or more thereof, but by mixing any one of bifunctional isophthalic acid chloride and terephthalic acid chloride with trifunctional trimesic acid chloride, 1,3,5-benzenetrisulfonic acid chloride, or 1,3,6-naphthalenetrisulfonic acid chloride, the molecular gap of the polyamide crosslinked structure is increased, and a membrane having a uniform pore diameter distribution can be controlled in a wide range. A mixing molar ratio of trifunctional acid chloride to bifunctional acid chloride is preferably 1:20 to 50:1, and more preferably 1:1 to 20:1.

It is preferable that the separation function layer of the nanofiltration membrane according to the embodiment of the present invention has a thin membrane of crosslinked polyamide, and the thin membrane forms a fold structure in which convex portions and concave portions are repeated. By having the fold structure including convex portions and concave portions, the surface area of the separation function layer is increased, high water permeability and excellent acid resistance are obtained, and the separation performance of monovalent and polyvalent rare metal ions can be maintained under acidic conditions for a long period of time. The presence or absence of the fold structure and the specific surface area can be evaluated by measurement with an electron microscope, a molecular force microscope, or the like.

In the method for recovering a rare metal salt according to the embodiment of the present invention, it is preferable that the nanofiltration membrane includes a base material, a porous support layer on the base material, and a separation function layer on the porous support layer, the separation function layer contains crosslinked aromatic polyamide, and the crosslinked aromatic polyamide has a structure represented by the following general formula (2).

The crosslinked polyamide according to the embodiment of the present invention is preferably crosslinked aromatic polyamide, and more preferably has a structure represented by the following general formula (2). Since a terminal amino group of the crosslinked polyamide is positively charged under acidic conditions, the selective separativeness of ions is reduced due to swelling of the membrane. Therefore, by having the structure represented by the following general formula (2), the high selective separativeness of the monovalent and polyvalent rare metals can be stably maintained for a long period of time even under acidic conditions.

[Chem. 5]

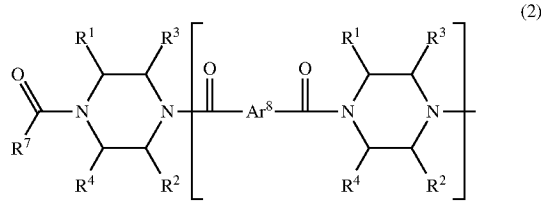

(2)

$R^1$ to $R^4$ have the same meanings as $R^1$ to $R^4$ in the general formula (1). $R^7$ is an aliphatic chain or an aliphatic ring containing only a carbon atom and a hydrogen atom as a constituent element, and $Ar^8$ is an aromatic ring having 6 to 14 carbon atoms which may have a substituent.

As a result of intensive studies, the present inventors have found that there is a close relationship between the surface zeta potential of the nanofiltration membrane and the long-term stability of the monovalent rare metal ion content in permeated water through the nanofiltration membrane in the step of treating the monovalent and polyvalent rare metal-containing aqueous solution.

The zeta potential is a measure of a net fixed charge on the surface of an ultrathin membrane layer. The zeta potential on the surface of the thin membrane layer according to the embodiment of the present invention can be determined from electric mobility by the formula of Helmholtz-Smoluchowski shown in the following formula (1).

[Math 1]

$$\text{Zeta potential } \xi = \frac{4\pi\eta U}{\varepsilon}$$

In the formula. U is electric mobility, c is a dielectric constant of a solution, and η is a viscosity of the solution.

Here, as the dielectric constant and viscosity of the solution, literature values at the measurement temperature are used.

The measurement principle of the zeta potential will be described. In the solution or aqueous solution in contact with the material, there is a static layer that cannot flow in the vicinity of the surface due to the influence of charges on the surface of the material. The zeta potential is a potential for the solution at an interface (sliding surface) between the static layer and the fluid layer of the material.

Here, considering the aqueous solution in a quartz glass cell, since a quartz surface is generally negatively charged, positively charged ions and particles gather in the vicinity of the cell surface. On the other hand, an amount of negatively charged ions and particles increases at the center of the cell, and an ion distribution occurs in the cell. When an electric field is applied in this state, the ion distribution is reflected in the cell, and the ions are moved at different migration speeds at positions in the cell (referred to as an electro-osmotic flow). Since the migration speed reflects the charges on the cell surface, the charges (surface potential) on the cell surface can be evaluated by determining the migration speed distribution.

In general, the zeta potential can be measured by using a membrane sample having a size of 20 mm×30 mm and dispersing polystyrene particles (particle size: 520 nm) whose surface is coated with hydroxypropyl cellulose in a NaCl aqueous solution adjusted to a predetermined concentration as standard particles for electrophoresis. For example, an electrophoresis light scattering photometer ELS-8000 manufactured by Otsuka Electronics Co., Ltd. can be used as a measuring apparatus.

The nanofiltration membrane according to the embodiment of the present invention is preferably a nanofiltration membrane having a positive surface zeta potential at pH 3, and is preferably a nanofiltration membrane of which a separation function layer has a positive surface zeta potential under conditions of pH 3 and NaCl 10 mM.

The separation function layer of the nanofiltration membrane contains an amino group derived from a polyfunctional aliphatic amine and a carboxy group derived from a polyfunctional aromatic acid chloride which is preferably used as a polyfunctional acid halide, and the value of the surface zeta potential changes depending on the dissociation degree of these functional groups.

In the method for recovering a rare metal salt according to the present invention, a nanofiltration membrane having a positive surface zeta potential at pH 3 is preferably used as the nanofiltration membrane.

When the zeta potential of the nanofiltration membrane at pH 3 is positive, a proportion of positively charged functional groups in the nanofiltration membrane is large under acidic conditions, and the pore diameter is increased due to swelling of the membrane, whereby the permeation of a monovalent rare metal having a small hydrated ion radius can be increased compared to the permeation of a polyvalent rare metal ion having a large hydrated ion radius, that is, the selective separativeness of the monovalent and polyvalent rare metal ions under acidic conditions can be maintained at a high level, and recovery can be performed with high efficiency.

When a spectrum of the surface of the nanofiltration membrane on the separation function layer side is obtained by total reflection infrared absorption measurement (hereinafter referred to as ATR-IR), only one peak having a maximum in a range of 1600 to 1700 cm$^{-1}$ is observed. The peak is defined as a peak A. A peak intensity ratio ($I_A/I_{1242}$) measured after the nanofiltration membrane is immersed in a 1 M sulfuric acid aqueous solution at 40° C. for 21 days is preferably 0.40 or more and 1.0 or less as compared with a peak intensity ratio ($I_A/I_{1242}$) measured before the immersion.

The peak intensity ratio ($I_A/I_{1242}$) of the present invention can be used as an index of the strength of the separation function layer. The peak intensity ratio is a ratio of an absorption peak value for the porous support layer to an absorption peak value corresponding to the separation function layer. As the peak intensity ratio before and after the acid immersion is closer to 1.0, the separation function layer is maintained without being decomposed by the acid.

$I_A$: absorption peak value corresponding to the separation function layer existing in the range of 1600 to 1700 cm$^{-1}$ $I_{1242}$: absorption peak value corresponding to the porous support layer at 1242 cm$^{-1}$ The peak intensity ratio ($I_A/I_{1242}$) can be measured as follows. First, a membrane to be measured is sufficiently dried. Next, the surface of the membrane (that is, the surface of the separation function layer) is irradiated with infrared rays to detect reflected light, thereby obtaining a spectrum. A more specific measurement method is described in Examples. Specifically, the peak intensity ratio ($I_A/I_{1242}$) described in this specification is calculated from a value measured by the method described in Examples.

In the present invention, the obtained composite semipermeable membrane is dried at room temperature under vacuum, and composition analysis of elements detected in a range of 0 eV or more and 1400 eV or less was performed by wide scan analysis by X-ray photoelectron spectroscopy measurement. Using an X-ray photoelectron spectrometer SSX-100 manufactured by SSI USA, measurement was performed under the conditions of an aluminum Kα1 ray and a Kα2 ray (1486.6 eV) as excitation X-rays, an X-ray output of 10 kV and 20 mV, and a photoelectron escape angle of 90°, measurement at different membrane positions was repeated three times, and an average value thereof was used as a measurement value.

In the method for recovering a rare metal salt according to the present invention, it is preferable that the nanofiltration membrane includes a base material, a porous support layer on the base material, and a separation function layer on the porous support layer, the separation function layer contains crosslinked polyamide, and a total proportion of halogen in elements measured in the X-ray photoelectron spectroscopy measurement of the surface on the separation function layer side is less than 0.1%.

Depending on the application, a part of the polyamide contained in the separation function layer may be halogenated by bringing the polyamide into contact with chlorine, bromine, or the like. However, in the nanofiltration membrane used in the separation step, it is preferable that the proportion of halogen in the elements measured in the X-ray photoelectron spectroscopy measurement of the surface on the separation function layer side is less than 0.1%. When the proportion of halogen is within this range, a high removal ratio of ions can be stably maintained for a long period of time under acidic conditions, and water permeability is also high, which is preferable.

The polyamide separation function layer includes an amide group derived from polymerization of an aliphatic polyfunctional amine and a polyfunctional acid halide, an amide group derived from amidation of an aliphatic polyfunctional amine and an aliphatic carboxylic acid derivative, and an amino group and a carboxy group derived from an unreacted functional group. As a result of intensive studies, the present inventors have found that when an amide group ratio represented by the following formula is preferably 0.80 or more and 1.20 or less, high resistance to acid and alkali can be obtained in addition to high water permeability and selective separativeness. The amide group ratio is more preferably 0.90 or more and 1.10 or less. When the amide group ratio is less than 0.80, the crosslinked structure of the polyamide is not sufficiently formed, so that the resistance to acid and alkali is low, and conversely, when the amide group ratio is more than 1.20, the resistance to acid and alkali is further increased, but the denseness is too high, so that the water permeability and the selective separativeness are significantly reduced.

(Amide group ratio)=(amide group molar ratio)/{
(aliphatic polyfunctional amine molar ratio)+
(polyfunctional acid halide molar ratio)}

Here, the amide group molar ratio, the aliphatic polyfunctional amine molar ratio, and the polyfunctional acid halide molar ratio in the formula can be determined by $^{13}$C-solid NMR measurement of the separation function layer described above.

(2-2) Separation Function Layer of Reverse Osmosis Membrane

The reverse osmosis membrane used in the concentration step includes a base material, a porous support layer on the base material and a separation function layer on the porous support layer, and the separation function layer may contain crosslinked aromatic polyamide.

Examples of the separation functional layer of the reverse osmosis membrane include a cellulose acetate-based polymer and polyamide, but it is preferable to use polyamide from the viewpoint of chemical stability to acid and alkali and ion removability. In particular, the separation function layer preferably contains crosslinked aromatic polyamide as a main component. The term "main component" refers to a component that occupies 50 mass % or more of components of the separation function layer. When the separation function layer contains 50 mass % or more of the crosslinked aromatic polyamide, high removal performance can be exhibited. A content of the crosslinked aromatic polyamide in the separation function layer is preferably 90 mass % or more, and more preferably 95 mass % or more.

The reverse osmosis membrane according to the embodiment of the present invention preferably includes a separation function layer (polyamide separation function layer) containing crosslinked aromatic polyamide that is a polymer of a polyfunctional aromatic amine and a polyfunctional aromatic acid halide. Here, it is preferable that at least one of the polyfunctional aromatic amine and the polyfunctional aromatic acid halide contains a trifunctional or higher functional compound. As a result, a rigid molecular chain is obtained, and a good pore structure for concentrating a solute having a small ion size such as lithium ions is formed. Therefore, the polyamide separation function layer in the reverse osmosis membrane according to the embodiment of the present invention preferably contains crosslinked aromatic polyamide obtained by interfacial polymerization between a polyfunctional aromatic amine and a divalent or higher polyfunctional aromatic acid halide.

The separation function layer has a thin membrane of the crosslinked aromatic polyamide, and the thin membrane forms a fold structure in which convex portions and concave portions are repeated. By having the fold structure including convex portions and concave portions, the surface area of the separation function layer is increased, and thus high water permeability can be obtained.

The polyfunctional aromatic amine means an aromatic amine which has two or more amino groups of at least one of a primary amino group and a secondary amino group in one molecule, and in which at least one of the amino groups is a primary amino group. Examples of the polyfunctional aromatic amine include polyfunctional aromatic amines in which two amino groups are bonded to an aromatic ring in a positional relationship of an ortho position, a meta position, or a para position, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine; and polyfunctional aromatic amines such as 1,3,5-triaminobenzene, 1,2,4-triaminobenzene, 3,5-diaminobenzoic acid, 3-aminobenzylamine, and 4-aminobenzylamine. In particular, m-phenylenediamine, p-phenylenediamine, and 1,3,5-triaminobenzene are preferably used in consideration of selective separativeness, permeability, and heat resistance of the membrane. Among these, m-phenylenediamine (hereinafter also referred to as m-PDA) is more preferably used from the viewpoint of easy availability and easy handling. These polyfunctional aromatic amines may be used alone or in combination of two or more kinds thereof.

The polyfunctional aromatic acid halide is an aromatic acid halide having two or more halogenated carbonyl groups in one molecule, and is not particularly limited as long as it gives aromatic polyamide by a reaction with the polyfunctional aromatic amine. Examples of the polyfunctional aromatic acid halide include halides such as 1,3,5-benzenetricarboxylic acid, 1,2,4-benzenetricarboxylic acid, 1,3-benzenedicarboxylic acid, 1,4-benzenedicarboxylic acid, 1,3,5-benzenetrisulfonic acid, and 1,3,6-naphthalenetrisulfonic acid. Among the acid halides, acid chlorides are preferable, and in particular, trimesic acid chloride which is an acid halide of 1,3,5-benzenetricarboxylic acid, isophthalic acid chloride which is an acid halide of 1,3-benzenedicarboxylic acid, terephthalic acid chloride which is an acid halide of 1,4-benzenedicarboxylic acid, 1,3,5-benzenetrisulfonic acid chloride which is an acid halide of 1,3,5-benzenetrisulfonic acid, and 1,3,6-naphthalenetrisulfonic acid chloride which is an acid halide of 1,3,6-naphthalenetrisulfonic acid are preferable from the viewpoint of economic efficiency, easy availability, ease of handling, ease of reactivity, and the like. The polyfunctional acid halide may be used alone or as a mixture of two or more thereof, but by mixing any one of bifunctional isophthalic acid chloride and terephthalic acid chloride with trifunctional trimesic acid chloride, 1,3,5-benzenetrisulfonic acid chloride, or 1,3,6-naphthalenetrisulfonic acid chloride, the molecular gap of the polyamide crosslinked structure is increased, and a membrane having a uniform pore diameter distribution can be controlled in a wide range. A mixing molar ratio of trifunctional acid chloride to bifunctional acid chloride is preferably 1:20 to 50:1, and more preferably 1:1 to 20:1.

The crosslinked aromatic polyamide has an amide group derived from a polymerization reaction between a polyfunctional aromatic amine and a polyfunctional aromatic acid chloride, and an amino group and a carboxy group derived from an unreacted terminal functional group. The amount of these functional groups affects the water permeability and salt removal ratio of the composite semipermeable membrane.

When the chemical treatment is performed after the formation of the crosslinked aromatic polyamide, the functional group in the crosslinked aromatic polyamide can be converted, or a new functional group can be introduced into the crosslinked aromatic polyamide. Therefore, the amount of permeated water through the composite semipermeable membrane and the salt removal ratio can be improved. Examples of the functional group to be introduced include an alkyl group, an alkenyl group, an alkynyl group, a hydroxyl group, an amino group, a carboxy group, an ether group, a thioether group, an ester group, an aldehyde group, a nitro group, a nitroso group, a nitrile group, and an azo group.

In the reverse osmosis membrane according to the embodiment of the present invention, as in the case of the nanofiltration membrane, a proportion of halogen in elements measured in the X-ray photoelectron spectroscopy measurement of the surface on the separation function layer side is preferably less than 0.1%.

It is preferable that the reverse osmosis membrane used in the concentration step includes a base material, a porous support layer on the base material, and a separation function layer on the porous support layer, the separation function layer contains crosslinked aromatic polyamide, and a total proportion of halogen in the elements measured in the X-ray photoelectron spectroscopy measurement of the surface on the separation function layer side is less than 0.1%.

It is preferable that the reverse osmosis membrane according to the embodiment of the present invention has a removal ratio of boron ion of 75% or more and a removal ratio of isopropyl alcohol of 95% or more when an aqueous solution having a pH of 6.5 and a temperature of 25° C. and containing 30 mg/L of boric acid, 100 mg/L of isopropyl alcohol, and 30000 mg/L of lithium chloride is allowed to pass through the reverse osmosis membrane which has been immersed in a sulfuric acid aqueous solution having a pH of 1 for 24 hours, under an operating pressure of 5.5 MPa.

It is preferable that the reverse osmosis membrane used in the concentration step includes a base material, a porous support layer on the base material, and a separation function layer on the porous support layer, the separation function layer contains crosslinked aromatic polyamide, and the crosslinked aromatic polyamide has at least one of structures represented by the following general formula (3) or (4).

The crosslinked aromatic polyamide preferably has at least one of the structures represented by the following general formula (3) or (4). Since a terminal amino group of the crosslinked aromatic polyamide is positively charged under acidic conditions, ion removability is reduced due to the swelling of the membrane. Therefore, by having the structure represented by the following general formula (3) or (4), high ion removability can be maintained even under acidic conditions, and the monovalent and polyvalent rare metals separated by the nanofiltration membrane can be stably concentrated over a long period of time with high efficiency.

[Chem. 6]

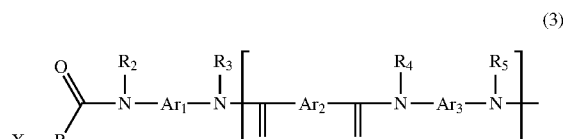

(3)

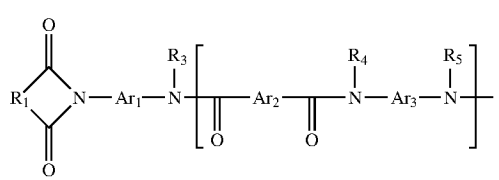

(4)

$Ar_1$ to $Ar_3$ are each independently an aromatic ring having 5 to 14 carbon atoms which may have a substituent, $R^1$ is an atomic group having neither an aromatic ring nor a heteroatom, X is a hydrogen atom or a carboxy group, and $R^2$ to $R^3$ are each independently a hydrogen atom or an aliphatic chain having 1 to 10 carbon atoms.

It is preferable that $R^2$ to $R^5$ are hydrogen atoms, and $Ar_1$ to $Ar_3$ are benzene rings which may have a substituent.

$R^1$ preferably has 1 to 5 carbon atoms.

Furthermore, among the convex portions on the surface of the separation function layer of the reverse osmosis membrane, it is preferable that the number of convex portions having a deformation amount of 2.5 nm or less when the convex portions are pressed with a force of 5 nN in pure water at 25° C. occupies 40% or more.

It is preferable that the reverse osmosis membrane used in the concentration step includes a base material, a porous support layer on the base material, and a separation function layer on the porous support layer, the separation function layer has a fold structure in which convex portions and concave portions are repeated, the convex portions and concave portions being formed of a thin membrane of crosslinked aromatic polyamide, and the convex portion having a deformation amount of 2.5 nm or less when the convex portion is pressed with a force of 5 nN in pure water occupies 40% or more.

The surface of the separation function layer is observed in pure water with an atomic force microscope (AFM), and any three regions in a 2 μm square range are selected. The convex portions included in these three regions are selected at 10 points in each region, that is, 30 points in total. Further, when one point in a circular region having a diameter of 100 nm around the apex of the selected convex portion is pressed with a force of 5 nN, the number X of convex portions indicating a deformation amount of 2.5 nm or less is counted, and a proportion (X/30) is obtained. When the proportion (X/30) is 40% or more (0.4 or more), deformation during high-pressure operation can be inhibited, and the loss of monovalent lithium ions due to a reduction in the removal ratio can be reduced. The proportion (X/30) is preferably 50% or more (0.5 or more), and more preferably 60% or more (0.6 or more).

As a result of intensive studies, the present inventors have found that the monovalent rare metal can be stably concentrated for a long period of time by using, as the reverse osmosis membrane, a reverse osmosis membrane in which a proportion of a convex portion having a deformation amount of 2.5 nm or less when the convex portion of the separation function layer is pressed with a force of 5 nN in a sulfuric acid aqueous solution having a pH of 1 is 0.50 times or more a proportion of a convex portion having a deformation amount of 2.5 nm or less when the convex portion of the separation function layer is pressed with a force of 5 nN in pure water. By treating the rare metal-containing acidic aqueous solution with the reverse osmosis membrane having the above ratio of 0.50 times or more, deformation during long-term operation under acidic aqueous solution conditions and an increase in pore diameter due to hydrolysis of the separation function layer can be inhibited, loss due to the permeation of monovalent rare metal can be reduced, and the concentration of monovalent rare metal can be performed with high efficiency.

The deformation of the convex portion can be measured in a tapping mode of an atomic force microscope (AFM). Specifically, on a force curve where a horizontal axis is a chip-sample distance (Separation) and a vertical axis is a load, when a point before a cantilever is brought close to the sample is taken as a point A, a moment at which the load rises is taken as a point B, a point at which the load becomes 90% of the maximum load is taken as a point C. and a maximum load point is taken as a point D, a CD distance is taken as the deformation. The force curve used is when the cantilever is brought closer to the sample.

As the atomic force microscope, for example, Dimension Fast Scan manufactured by Bruker AXS can be used. By using an attachment thereof, observation in water is possible. In this case, a shape of a probe of the cantilever to be used is a conical shape (pyramid shape). Before using the cantilever, calibration is performed. First, the deflection sensitivity of the cantilever is measured with a substance having sufficient hardness. As the substance having sufficient hardness, a silicon wafer or sapphire can be used. Next, a spring constant of the cantilever is measured by a thermal tune. By performing the calibration, the accuracy of the measurement is improved.

As a result of intensive studies, the present inventors have found that there is a close relationship between the surface zeta potential of the reverse osmosis membrane and the long-term stability of the monovalent rare metal ion content in the permeated water through the reverse osmosis membrane in the step of treating the monovalent rare metal-containing aqueous solution.

The zeta potential is a measure of a net fixed charge on the surface of an ultrathin membrane layer. The zeta potential on the surface of the thin membrane layer according to the embodiment of the present invention can be determined from electric mobility by the formula of Helmholtz-Smoluchowski shown in the following formula (1), as described above.

[Math 2]

$$\text{Zeta potential } \xi = \frac{4\pi\eta U}{\varepsilon}$$

In the formula, U is electric mobility, ε is a dielectric constant of a solution, and η is a viscosity of the solution.

Here, as the dielectric constant and viscosity of the solution, literature values at the measurement temperature are used.

The measurement principle of the zeta potential will be described. In the solution or aqueous solution in contact with the material, there is a static layer that cannot flow in the vicinity of the surface due to the influence of charges on the surface of the material. The zeta potential is a potential for the solution at an interface (sliding surface) between the static layer and the fluid layer of the material.

Here, considering the aqueous solution in a quartz glass cell, since a quartz surface is generally negatively charged, positively charged ions and particles gather in the vicinity of the cell surface. On the other hand, an amount of negatively charged ions and particles increases at the center of the cell, and an ion distribution occurs in the cell. When an electric field is applied in this state, the ion distribution is reflected in the cell, and the ions are moved at different migration speeds at positions in the cell (referred to as an electroosmotic flow). Since the migration speed reflects the charges on the cell surface, the charges (surface potential) on the cell surface can be evaluated by determining the migration speed distribution.

In general, the zeta potential can be measured by using a membrane sample having a size of 20 mm×30 mm and dispersing polystyrene particles (particle size: 520 nm) whose surface is coated with hydroxypropyl cellulose in a NaCl aqueous solution adjusted to a predetermined concentration as standard particles for electrophoresis. For example, an electrophoretic light scattering photometer ELS-8000 manufactured by Otsuka Electronics Co., Ltd. can be used as a measuring apparatus.

In the method for recovering a rare metal salt according to the embodiment of the present invention, a reverse osmosis membrane having a negative surface zeta potential at pH 3 may be used as the reverse osmosis membrane used in the concentration step.

The reverse osmosis membrane according to the embodiment of the present invention is preferably a reverse osmosis membrane having a negative surface zeta potential at pH 3, and more preferably a reverse osmosis membrane of which a separation function layer has a negative surface zeta potential under conditions of pH 3 and NaCl 10 mM.

The separation function layer of the reverse osmosis membrane contains an amino group derived from a polyfunctional aromatic amine and a carboxy group derived from a polyfunctional aromatic acid chloride, and the value of the surface zeta potential changes depending on the dissociation degree of these functional groups.

When the zeta potential of the reverse osmosis membrane at pH 3 is negative, a proportion of positively charged functional groups in the reverse osmosis membrane is small under acidic conditions, an increase in the pore diameter due to swelling of the membrane can be inhibited, the removal ratio of the rare metal salt under acidic conditions can be maintained at a high level, that is, the loss of the monovalent rare metal can be inhibited, and the recovery can be performed with high efficiency.

(3) Method for Producing Nanofiltration Membrane and Reverse Osmosis Membrane (3-1) Forming Step of Separation Function Layer of Reverse Osmosis Membrane As an example of the method for producing the reverse osmosis membrane, a forming step of a separation function layer which has the following polymerization step and modification step will be described in this section.

The polymerization step is a step of forming a layer containing crosslinked aromatic polyamide having a structure represented by the following general formula (5) on the porous support layer of the membrane having a base material and a porous support layer on the base material.

[Chem. 7]

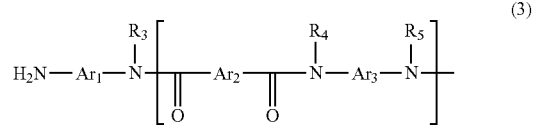

$Ar_1$ to $Ar_3$ are each independently an aromatic ring having 5 to 14 carbon atoms which may have a substituent, and $R_3$ to $R_5$ are each independently a hydrogen atom or an aliphatic chain having 1 to 10 carbon atoms.

Specifically, the polymerization step is a step of forming crosslinked aromatic polyamide by polycondensation of a polyfunctional aromatic amine and a polyfunctional aromatic acid chloride. More specifically, the polymerization step includes a step of bringing an aqueous solution containing a polyfunctional aromatic amine into contact with the porous support layer, and then a step of bringing a polyfunctional aromatic acid chloride solution into contact with the porous support layer.

In this section, a case where the support membrane includes a base material and a porous support layer is described as an example, but when the support membrane includes another configuration, the "porous support layer" may be read as the "support membrane".

The crosslinked aromatic polyamide constituting the separation function layer of the reverse osmosis membrane according to the embodiment of the present invention preferably contains a polymer of m-phenylenediamine and trimesic acid chloride.

A concentration of the polyfunctional aromatic amine in the polyfunctional aromatic amine aqueous solution is preferably in a range of 0.1 mass % or more and 20 mass % or less, and more preferably in a range of 0.5 mass % or more and 15 mass % or less. When the concentration of the polyfunctional aromatic amine is in this range, sufficient solute removal performance and water permeability can be obtained.

After the polyfunctional aromatic amine aqueous solution is brought into contact with the porous support layer, liquid is removed so that liquid droplets do not remain on the membrane. By performing the liquid removing, it is possible to prevent the removal performance from being deteriorated due to the membrane defect caused by the liquid droplet remaining portion after the formation of the porous support layer. As a method of removing the liquid, a method of holding the support membrane after the contact with the polyfunctional aromatic amine aqueous solution in a vertical direction and allowing an excessive aqueous solution to naturally flow down, a method of forcibly removing the liquid by blowing an air flow such as nitrogen from an air nozzle, or the like can be used. In addition, after the liquid is removed, the membrane surface may be dried to partially remove the moisture of the aqueous solution.

A concentration of the polyfunctional aromatic acid chloride in an organic solvent solution is preferably in a range of 0.01 mass % or more and 10 mass % or less, and more preferably in a range of 0.02 mass % or more and 2.0 mass % or less. When the concentration is 0.01 mass % or more, a sufficient reaction rate can be obtained. When the concentration is 10 mass % or less, the occurrence of a side reaction can be inhibited.

The organic solvent is preferably immiscible with water, dissolves the polyfunctional aromatic acid chloride, and does not break the support membrane, and may be inert to the polyfunctional aromatic amine and the polyfunctional aromatic acid chloride. Preferred examples thereof include hydrocarbon compounds such as n-nonane, n-decane, n-undecane, n-dodecane, isooctane, isodecane, and isododecane, and mixed solvents.

The contact of the organic solvent solution of the polyfunctional aromatic acid chloride with the porous support layer may be performed in the same manner as in the method of coating the porous support layer with the polyfunctional aromatic amine aqueous solution.

After the contact, the liquid may be removed in the same manner as in the case of the polyfunctional aromatic amine aqueous solution. In addition to the examples recited for the polyfunctional aromatic amine aqueous solution, a mixed fluid of water and air may be used for the liquid removing.

At the interface between the polyfunctional aromatic amine aqueous solution and the polyfunctional aromatic acid chloride solution, the polyfunctional aromatic amine and the polyfunctional aromatic acid chloride, which are a monomer, are polycondensed to produce crosslinked aromatic polyamide. The polycondensation is preferably performed at 80° C. or lower. The phrase "polycondensation is performed at 80° C. or lower" means that at least the temperature around the support membrane from the time of application of the polyfunctional aromatic acid chloride to the subsequent liquid removal and the temperature of the polyfunctional aromatic acid chloride solution are 80° C. or lower.

By cleaning the thus obtained membrane with hot water, unreacted monomers can be removed. The temperature of the hot water is preferably 40° C. or higher and 100° C. or lower, and more preferably 60° C. or higher and 100° C. or lower.

In the modification step, a reaction with an aliphatic carboxylic acid derivative is performed on the composite semipermeable membrane obtained through the above-described steps. The aliphatic carboxylic acid derivative may be brought into contact with the composite semipermeable membrane as it is, or may be dissolved in a solvent that does not change the quality of the support membrane and brought into contact with the composite semipermeable membrane.

As a method of bringing the aliphatic carboxylic acid derivative into contact with the composite semipermeable membrane, a reaction may be performed by coating the separation function layer of the composite semipermeable membrane, or a reaction may be performed by immersing the membrane including the separation function layer in the aliphatic carboxylic acid derivative or a solution including the aliphatic carboxylic acid derivative.

The reaction time and temperature at the time of applying the aliphatic carboxylic acid derivative as an aqueous solution or as it is to the composite semipermeable membrane can be appropriately adjusted depending on the type of the aliphatic carboxylic acid derivative and the application method. When the aliphatic carboxylic acid derivative is applied as an aqueous solution, the concentration of the aqueous solution is preferably 10 mmol/L to 100 mmol/L, and more preferably 30 mmol/L to 100 mmol/L, from the viewpoint of the acid resistance of the separation function layer and the effect of improving the chlorine resistance.

(3-2) Forming Step of Separation Function Layer of Nanofiltration Membrane

Next, a forming step of the separation function layer constituting the nanofiltration membrane will be described. As an example of the method for producing the nanofiltration membrane, a forming step of the separation function layer which has the following polymerization step and modification step will be described in this section.

In the forming step of the separation function layer, an aqueous solution containing a piperazine-based compound which is a polyfunctional aliphatic amine and an organic solvent solution containing a polyfunctional acid halide are used to perform interfacial polycondensation on the surface of the porous support layer, thereby forming a polyamide separation function layer.

As an organic solvent for dissolving the polyfunctional acid halide, an organic solvent is used which is immiscible with water, does not destroy the support membrane, does not inhibit the formation reaction of crosslinked polyamide, has a solubility parameter (SP value) of 15.2 $(MPa)^{1/2}$ or more, and has a distribution coefficient log P of 3.2 or more. When the SP value is 15.2 $(MPa)^{1/2}$ or more and the log P is 3.2 or more, the distribution and diffusion of the polyfunctional aliphatic amine at the time of interfacial polycondensation are optimized, and the amount of functional groups can be increased. Typical examples thereof include octane, nonane, decane, undecane, dodecane, tridecane, tetradecane, heptadecane, hexadecane, cyclooctane, ethylcyclohexane, l-octene, 1-decene, and mixtures thereof.

The aqueous solution containing a piperazine-based compound may contain a surfactant. Examples thereof include sodium dodecylbenzene sulfonate, sodium dodecyl sulfate, sodium dodecyldiphenyl ether disulfonate, styrene bis(sodium naphthalene sulfonate), and sodium polyoxyethylene alkyl ether sulfate. When a surfactant is contained, the surface of the porous support layer can be uniformly coated with the aqueous solution of a piperazine-based compound, so that the separation function layer can be uniformly formed, and the effect of stabilizing the membrane performance and the effect of increasing the adhesiveness between the separation function layer and the porous support layer can be obtained.

The aqueous solution containing the piperazine-based compound may contain alcohol. Examples thereof include ethanol, 1-propanol, 2-propanol, and butanol. When alcohol is contained, the same effects as those of the surfactant described above can be obtained.

The aqueous solution containing a piperazine-based compound may contain an alkaline compound. Examples thereof include sodium hydroxide, trisodium phosphate, and triethylamine. When an alkaline compound is contained, hydrogen halide generated by the interfacial polycondensation reaction can be removed, a decrease in reactivity of the piperazine-based compound can be inhibited, the polyamide reaction can be promoted, the selective separativeness can be improved, and the resistance to acid and alkali can be improved.

The aqueous solution containing a piperazine-based compound or the organic solvent solution containing a polyfunctional acid halide may each contain a compound such as an acylation catalyst, a polar solvent, an acid-trapping agent, or an antioxidant, if necessary.

In order to perform interfacial polycondensation on the porous support layer, first, the surface of the porous support layer is coated with the aqueous solution containing a piperazine-based compound represented by the general formula (1). The method of coating the surface of the porous support layer with the aqueous solution containing a piperazine-based compound may be any method as long as the surface of the porous support layer is uniformly and continuously coated with the aqueous solution. A known coating means, for example, a method of coating the surface of the porous support layer with an aqueous solution, a method of immersing the support membrane in an aqueous solution, or the like may be used. The contact time between the porous support layer and the aqueous solution containing a piperazine-based compound is preferably in a range of 5 seconds or more and 10 minutes or less, and more preferably in a range of 10 seconds or more and 2 minutes or less.

Next, it is preferable to remove the excessively applied aqueous solution by a liquid removing step. As a method of liquid removing, for example, there is a method of holding the membrane surface in the vertical direction and allowing the liquid to naturally flow down. After the liquid is removed, the membrane surface may be dried to remove all or a part of the water of the aqueous solution.

A concentration of the piperazine-based compound in the aqueous solution is preferably 0.5 mass % or more and 5.0 mass % or less, more preferably 1.0 mass % or more and 4.0 mass % or less, and still more preferably 2.0 mass % or more and 3.0 mass % or less. When the concentration is 0.5 mass % or more, a uniform separation function layer is easily formed, and a membrane having sufficient selective separativeness and resistance to acid and alkali can be obtained. In addition, when the concentration is 5.0 mass % or less, the thickness of the separation function layer does not become too thick, and a decrease in water permeability can be inhibited.

Thereafter, an organic solvent solution containing the polyfunctional acid halide is applied to the porous support layer coated with the aqueous solution containing a piperazine-based compound. The coating temperature is preferably 5° C. or higher and 45° C. or lower.

When trimesic acid chloride is contained as the polyfunctional acid halide, the concentration of trimesic acid chloride in the organic solvent solution is preferably about 0.05 mass % or more and 0.70 mass % or less, and more preferably 0.08 mass % or more and 0.3 mass % or less. Within this range, sufficient water permeability, selective separation performance, and resistance to acid and alkali can be obtained. When another trifunctional acid chloride or bifunctional acid chloride is used, a molar concentration of acid chloride is adjusted to be about the same in accordance with a molecular weight ratio of the trimesic acid chloride described above.

In this manner, the polyfunctional aliphatic amine and the polyfunctional acid halide are brought into contact with each other, thereby performing interfacial polymerization of the both. The interfacial polymerization is preferably performed under a temperature condition of 30° C. or higher, and more preferably performed under a temperature condition of 50° C. or higher. The interfacial polymerization is preferably performed under a temperature condition of 120° C. or lower. When the interfacial polymerization is performed at 30° C. or higher, in the interfacial polymerization reaction, a decrease in the mobility of the monomer or oligomer due to an increase in the bulkiness of the polyamide can be inhibited, and an amide group ratio (amide group ratio= (amide group molar ratio)/{(aliphatic polyfunctional amine molar ratio)+(polyfunctional acid halide molar ratio)}) becomes 0.80 or more. In addition, when the interfacial polymerization is performed at 120° C. or lower, overdrying of the separation function layer and the porous support layer can be prevented, and practical water permeability can be secured.

A time for performing the interfacial polymerization is preferably 0.1 seconds or more and 3 minutes or less, and more preferably 0.1 seconds or more and 1 minute or less.

Next, the organic solvent solution after the reaction is preferably removed by a liquid removing step. The organic solvent can be removed by, for example, a method of holding a membrane in a vertical direction and allowing an excessive organic solvent to naturally flow down, a method of drying an organic solvent by blowing air with a blower, or a method of removing an excess organic solvent with a mixed fluid of water and air. In particular, removal by a mixed fluid of water and air is preferable. When a mixed fluid of water and air is used, water is contained in the separation function layer, which causes swelling and results in high water permeability. In the case of a natural flow-down, the holding time in the vertical direction is preferably 1 minute or more and 5 minutes or less, and more preferably 1 minute or more and 3 minutes or less. When the holding time is 1 minute or more, it is easy to obtain a separation function layer having a target function, and when the holding time is 3 minutes or less, it is possible to inhibit the occurrence of membrane defects due to overdrying of the organic solvent, and thus it is possible to inhibit performance deterioration.

The composite semipermeable membrane obtained by the above-described method can be further improved in solute blocking performance and water permeability by further adding a step of cleaning the composite semipermeable membrane with hot water in a range of 25° C. to 90° C. for 1 minute to 60 minutes.

In the modification step, a reaction with an aliphatic carboxylic acid derivative is performed on the composite semipermeable membrane obtained through the above-described steps. The aliphatic carboxylic acid derivative may be brought into contact with the composite semipermeable membrane as it is, or may be dissolved in a solvent that does not change the quality of the support membrane and brought into contact with the composite semipermeable membrane.

As a method of bringing the aliphatic carboxylic acid derivative into contact with the composite semipermeable membrane, a reaction may be performed by coating the separation function layer of the composite semipermeable membrane, or a reaction may be performed by immersing the membrane including the separation function layer in the aliphatic carboxylic acid derivative or a solution including the aliphatic carboxylic acid derivative.

The reaction time and temperature at the time of applying the aliphatic carboxylic acid derivative as an aqueous solution or as it is to the composite semipermeable membrane can be appropriately adjusted depending on the type of the aliphatic carboxylic acid derivative and the application method. When the aliphatic carboxylic acid derivative is applied as an aqueous solution, the concentration of the aqueous solution is preferably 10 mmol/L to 100 mmol/L, and more preferably 30 mmol/L to 100 mmol/L, from the viewpoint of the acid resistance of the separation function layer and the effect of improving the chlorine resistance.

[8] Method for Producing Ultrafiltration Membrane and Microfiltration Membrane (1) Ultrafiltration Membrane The ultrafiltration membrane used in the present invention is, for example, a porous membrane containing a polymer such as polyvinylidene fluoride, polyether sulfone, cellulose acetate polymer, polysulfone, polyacrylonitrile, polyester, polyimide, or vinyl polymer. The ultrafiltration membrane is not limited to a membrane composed of only one of these materials, and may be a membrane containing a plurality of materials. The membrane structure may be a composite membrane including the porous membrane and another layer, in which the porous membrane is disposed at a surface portion. Here, the "surface portion" of the composite membrane refers to a portion from the surface of the composite membrane to a depth of 20 μm in a thickness direction thereof. Here, in a case where the composite membrane has a hollow fiber shape, the inner surface and/or the outer surface thereof is the "surface of the composite membrane" mentioned here, and the thickness direction of the composite membrane coincides with the radial direction of the hollow fiber membrane. Since the porous membrane exhibiting excellent separation performance is disposed on the surface portion, the components contained in the liquid to be filtered do not easily enter the inside of the composite membrane, and the composite membrane can maintain high permeation performance over a long period of time.

The other layer is not particularly limited as long as it is a component capable of lying on the porous membrane and forming a layer, but the other layer is preferably a support. Here, the "support" refers to a structure whose breaking strength is higher than that of the porous membrane for physically reinforcing the porous membrane. In order to increase the breaking strength of the support, the breaking strength of the support is preferably 3 MPa or more, and more preferably 10 MPa or more. When the composite membrane has a hollow fiber shape, the breaking strength of the support is preferably 3 N or more, and more preferably 8 N or more. The support preferably has a fibrous structure, a columnar structure, or a spherical structure in order to further enhance the strength of the composite membrane.

The breaking strength or the breaking force of the support can be calculated by repeating a tensile test five times on a sample having a length of 50 mm under the conditions of a tensile speed of 50 mm/min using a tensile tester and taking the average value. In a case where the proportion of the volume of the support to the total volume of the composite membrane is 50% or more, the breaking strength or the breaking force of the composite membrane can be regarded as the breaking strength or the breaking force of the support which is the component of the composite membrane.

The porous membrane preferably has a three-dimensional network structure in order to further enhance the separation performance by homogenization of the polymer density of the surface layer due to entanglement of the polymers. Here, the "three-dimensional network structure" refers to a structure in which the polymer constituting the porous membrane spreads three-dimensionally in a network. The three-dimensional network structure has fine pores and voids which are partitioned by the polymer forming the network.

(2) Microfiltration Membrane

In the present invention, the microfiltration membrane may have a flat membrane shape or a hollow fiber shape. The details of the flat membrane-shaped separation membrane will be described below. In the case of a flat membrane-shaped separation membrane, it is preferable that a separation function layer is formed on a base material of a nonwoven fabric base.

In the separation membrane formed of a separation function layer and a base material, the base material has a function of supporting the separation function layer and imparting strength to the separation membrane. As the base material, a fibrous base material is preferably used in terms of strength, flow channel forming ability, and fluid permeability. As the base material, either a long fiber nonwoven fabric or a short fiber nonwoven fabric can be preferably used. In particular, since the long fiber nonwoven fabric has excellent membrane-forming properties, when a polymer solution is cast, it is possible to inhibit back-through of the solution due to over-penetration, peeling of the separation function layer; non-uniformity of the membrane due to fluffing of the base material; and occurrence of defects such as pinholes. In addition, since the base material is formed of the long fiber nonwoven fabric composed of thermoplastic continuous filaments, it is possible to inhibit the non-uniformity of the membrane due to fluffing of fibers and the occurrence of membrane defects at the time of casting the polymer solution, as compared with the short fiber nonwoven fabric. Further, since tension is applied to the separation membrane in a membrane forming direction when continuously forming the separation membrane, it is preferable to use a long fiber nonwoven fabric having excellent dimensional stability as the base material.

A material constituting the base material is not particularly limited, such as an organic substance and an inorganic substance, but an organic substance is preferable from the viewpoint of easy weight reduction. Examples of the organic substance include cellulose fibers, cellulose triacetate fibers, polyester fibers, polypropylene fibers, and polyethylene fibers.

The nonwoven fabric preferably has a densely welded portion, a coarsely welded portion, and a non-welded portion. Since the nonwoven fabric has the densely welded portion, the coarsely welded portion, and the non-welded portion, a resin portion as a flow channel material is impregnated into pore opening portions between fibers of the nonwoven fabric, and thus an adhesive force is improved.

A density welding ratio of the nonwoven fabric is preferably 5% to 50%. By setting the density welding ratio of the nonwoven fabric to 5% to 50%, the pore opening portions between the fibers of the nonwoven fabric are in an amount suitable for fixing the resin, and the shape retainability of the nonwoven fabric is enhanced, and the shape of the nonwoven fabric is not easily deformed even during conveyance.

The density welding ratio is a ratio of an area occupied by the densely welded portion to an area of the nonwoven fabric.

The densely welded portion is a region in which a plurality of fibers are thermally fused, and a size of the densely welded portion is different from a fiber diameter of the fibers constituting the nonwoven fabric. For example, when the surface of the nonwoven fabric is observed with an electron microscope or the like, a portion having a width larger than an average fiber diameter of the fibers constituting the nonwoven fabric becomes a welded portion, a portion having a width being less than 1.8 times the average fiber diameter becomes a coarsely welded portion, and a portion having a width being 1.8 times or more the average fiber diameter becomes a densely welded portion. The average fiber diameter is an average value of diameters measured for any 50 fibers constituting the nonwoven fabric and not welded to other fibers.

The density welding ratio of the base material is calculated by scanning the surface of the base material cut into 50 mm×50 mm with a digital scanner (Cano Scan N676U manufactured by Canon), analyzing the obtained digital image with image analysis software (Image J), and calculating the density welding ratio (%)=100×(densely welded portion/cut out area) for the obtained image. This operation is repeated 50 times, and an average value thereof can be used as the density welding ratio.

A surface porosity, which is a void between fibers, in the coarsely welded portion is preferably 25% or more and 60% or less for the same reason as the density welding ratio.

The non-welded portion is a region where the nonwoven fabric fibers are not welded. The surface porosity, which is a void between fibers, in the non-welded portion is preferably 15% or more and 70% or less for the same reason as the density welding ratio. When protrusions are arranged on a straight line, it is preferable that 20% or more of the area of the protrusions in contact with the non-woven fabric is arranged in the surface pore opening portion.

When the width of the densely welded portion is too wide, a region where the protrusions cannot be impregnated is widened, so that the width is preferably 2 mm or less, and more preferably 1 mm or less. For the same reason, a pitch may be appropriately designed to be 1 mm or more and 50 mm or less. The pitch is a horizontal distance between a center-of-gravity position of a certain densely welded portion and a center-of-gravity position of another densely welded portion adjacent to the densely welded portion.

Since the impregnation of the protrusions proceeds in the non-welded portion and does not proceed in the densely welded portion, the protrusions are divided into a layer impregnated in the nonwoven fabric and a region not impregnated. When the protrusions are manufactured by applying and solidifying a molten resin to a nonwoven fabric, quality deterioration such as curling of a membrane generated in the case of uniform impregnation tends to be less likely to occur since the thermal shrinkage behaviors of these two regions are different.

Since the densely welded portions exist regularly, the unevenness in rigidity of the nonwoven fabric is reduced, and wrinkles, tears, and the like during conveyance can be inhibited. In a case where a plurality of densely welded portions provided on the nonwoven fabric form a pattern and there is a region similarly arranged in a length direction, the pattern formed by the plurality of densely welded portions may be referred to as a "pattern". The pattern is more preferably a lattice pattern, a staggered pattern, or a combination thereof.

The shape of the pattern of the densely welded portion is not particularly limited, but the example shape observed from an upper surface of a surface to which the protrusion is fixed includes an ellipse, a circle, an oval, a trapezoid, a triangle, a rectangle, a square, a parallelogram, and a rhombus.

As a method of welding the nonwoven fabric, a common known method such as laser irradiation, heat roll, or calendering can be adopted. In the case of welding with a heat roll, embossing is preferable from the viewpoint of stably forming a densely welded portion during manufacturing.

The embossing is a process of hot pressing a nonwoven fabric using an embossing roll, and is usually performed by two rolls of a roll having a smooth surface and a heat roll having an embossed pattern. A linear pressure at the time of pressing is preferably 1 kg/cm to 50 kg/cm. When the linear pressure is too low, sufficient strength cannot be imparted. When the linear pressure is too high, the fibers constituting the nonwoven fabric are formed into a film, and it tends to be difficult for the protrusions to be impregnated into the nonwoven fabric.

The embossing may be performed on either one surface or both surfaces of the nonwoven fabric. In the case of one surface, the density welding ratio tends to be lower on the surface side where a height difference is present than on the other surface side, and therefore, the point of impregnating the protrusion is preferable. However, in the case of the both surfaces, the densely welded portion exists in contrast in the thickness direction, and thus the rigidity is increased, and it is excellent in terms of stable conveyance.

When the thickness of the base material is too thin, it is difficult to maintain the strength as the separation membrane, when the thickness is extremely thick, the amount of water permeation decreases, and when the thickness of the membrane element is thick, a total membrane area of a separation membrane module decreases, and therefore, the thickness is preferably in a range of 50 µm to 1000 µm. The most preferable thickness is in a range of 70 µm to 500 µm.

A density of the base material is preferably 0.7 g/cm$^3$ or less, and more preferably 0.6 g/cm$^3$ or less. When the density of the porous base material is in this range, it is suitable for accepting a resin forming the porous resin layer and forming an appropriate composite layer of the porous base material and the porous resin layer, and the resin is easily impregnated when the resin as the flow channel material is formed on the base material surface of the separation membrane, so that the adhesive force can be secured. However, when the density is extremely low, the strength as the separation membrane is reduced, and the resin as the flow channel material is excessively impregnated, which reduces the separation membrane performance, and therefore, the density is preferably 0.3 g/cm$^3$ or more. The density referred to herein is an apparent density, and can be determined from the area, thickness, and weight of the porous base material.

The apparent density of the base material can be calculated by measuring the dry weight and thickness of 50 samples of the base material cut into 50 mm×50 mm, calculating the average value thereof, and dividing the weight by the thickness.

As a material of the separation function layer of the microfiltration membrane, a polyethylene resin, a polypropylene resin, a polyvinyl chloride resin, a polyvinylidene fluoride resin, a polysulfone resin, a polyether sulfone resin, a polyimide resin, a polyether imide resin, or the like can be used. The separation function layer may be formed of only these resins, or may be formed of a resin containing these resins as a main component. The term "main component" as used herein refers to a component contained in an amount of 50 wt % or more, and preferably 60 wt % or more. Among these, a polyvinyl chloride resin, a polyvinylidene fluoride resin, a polysulfone resin, and a polyether sulfone resin, which are easily formed into a membrane by a solution and are also excellent in physical resistance and chemical resistance, are preferable, and a polyvinylidene fluoride resin or a resin containing the polyvinylidene fluoride resin as a main component is particularly preferable.

The thickness of the separation function layer of the microfiltration membrane is usually preferably in a range of 1 µm to 500 µm, and more preferably in a range of 5 µm to 200 µm. When the separation function layer is too thin, the base material may be exposed, and a suspended substance may adhere to the base material to increase a filtration pressure, or the filtration performance may not be sufficiently recovered even when the separation function layer is cleaned. In addition, when the separation function layer is too thick, the amount of water permeation may decrease.

A part of the resin constituting the separation function layer of the microfiltration membrane enters at least the surface layer portion of the base material, and forms a composite layer with the porous base material at least in the surface layer portion. When a polyvinylidene fluoride-based blend resin enters the inside from the surface of the base material, the separation function layer is firmly fixed to the base material due to a so-called anchor effect, and the separation function layer can be prevented from peeling off from the base material. The separation function layer may have a symmetrical structure or an asymmetrical structure in the thickness direction of the separation function layer.

Next, a method for producing the separation membrane used in the present invention will be described. The separation membrane can be produced by attaching a membrane forming solution containing a polyvinylidene fluoride-based resin, a pore forming material, or the like to one surface of a base material and coagulating the membrane forming solution in a coagulation liquid containing a non-solvent to form a separation function layer. It is also possible to form only the separation function layer separately from the base material and then bond both layers.

When coagulating the membrane forming solution, only a membrane forming solution film for forming the separation function layer on the base material may be brought into contact with the coagulation liquid, or the membrane forming solution film for forming the separation function layer may be immersed in the coagulation liquid together with the base material. In order to bring only the membrane forming solution film for forming the separation functional layer into contact with the coagulation liquid, for example, there are a method of bringing a membrane forming solution film formed on a base material into contact with a surface of a coagulation bath so that the membrane forming solution film faces down, and a method of bringing a base material into contact with a smooth plate such as a glass plate or a metal plate, attaching the base material to the smooth plate so that a coagulation bath does not go around to a base material side, and immersing the base material having a membrane forming solution film together with the plate in the coagulation bath. In the latter method, the membrane forming solution film may be formed after the base material is attached to the plate, or the membrane forming solution film may be formed on the base material first and then the base material is attached to the plate.

In addition to the polyvinylidene fluoride-based resin described above, a pore forming material, a solvent that dissolves the pore forming material, or the like may be added to the membrane forming solution as necessary.

When a pore forming agent having a function of promoting the formation of a porous material is added to the membrane forming solution, the pore forming agent may be any as long as it can be extracted by the coagulation liquid, and an agent having high solubility in the coagulation liquid is preferable. For example, inorganic salts such as calcium chloride and calcium carbonate can be used. Polyoxyalkylene such as polyethylene glycol and polypropylene glycol, water-soluble polymers such as polyvinyl alcohol, polyvinyl butyral, and polyacrylic acid, and glycerin can also be used. The pore forming agent can be optionally selected depending on the kind of the resin used for the membrane forming solution. For example, when a resin containing polyvinylidene fluoride as a main component is used, a polymer containing polyethylene glycol as a main component is preferable. Among them, a polymer containing polyethylene glycol as a main component and having a weight average molecular weight of 10000 or more is particularly preferable in terms of achieving a balance among the pore diameter, the pore diameter distribution, and the water permeability of the surface.

When a solvent for dissolving the polyvinylidene fluoride-based resin, another organic resin, the pore forming agent, and the like in the membrane forming solution is used. N-methylpyrrolidone (NMP), N,N-dimethylacetamide (DMAc), N,N-dimethylformamide (DMF), dimethyl sulfoxide (DMSO), acetone, methyl ethyl ketone, and the like can be used as the solvent. Among them, NMP, DMAc, DMF, and DMSO, which are highly soluble in the polyvinylidene fluoride-based resin, can be preferably used.

In addition, a non-solvent may be added to the membrane forming solution. The non-solvent does not dissolve the polyvinylidene fluoride-based resin and other organic resin, and acts to control a coagulation rate of the polyvinylidene fluoride-based resin and other organic resin to control the size of the pores. As the non-solvent, water and alcohols such as methanol and ethanol can be used. Among these, water and ethanol are preferable from the viewpoint of easiness of wastewater treatment and price. In addition, a mixture thereof may be used.

In the composition of the membrane forming solution, it is preferable that the content of the polyvinylidene fluoride-based resin is in a range of 5 wt % to 30 wt %, the content of the pore forming agent is in a range of 0.1 wt % to 15 wt %, the content of the solvent is in a range of 45 wt % to 94.8 wt %, and the content of the non-solvent is in a range of 0.1 wt % to 10 wt %. Among them, the content of the polyvinylidene fluoride-based resin is more preferably in a range of 8 wt % to 20 wt % because the strength of the porous layer decreases when the content of the polyvinylidene fluoride-based resin is extremely small, and the water permeability decreases when the content of the polyvinylidene fluoride-based resin is excessively large. When the content of the pore forming agent is too small, the water permeability may decrease, and when the content of the pore forming agent is too large, the strength of the porous layer may decrease. In addition, when the content of the pore forming agent is extremely large, the pore forming agent may be excessively left in the polyvinylidene fluoride-based resin and eluted during use, and thus the water quality of the permeated water may be deteriorated or the water permeability may vary. Therefore, a more preferable range thereof is 0.5 wt % to 10 wt %. Furthermore, when the content of the solvent is too small, gelation of the membrane forming solution tends to occur, and when the content is too large, the strength of the porous layer decreases. The content of the solvent is more preferably in a range of 60 wt % to 90 wt %. In addition, when the content of the non-solvent is too large, gelation of the membrane forming solution tends to occur, and when the content of the non-solvent is extremely small, it becomes difficult to control sizes of the pores and macrovoids. Therefore, the content of the non-solvent is more preferably 0.5 wt % to 5 wt %.

On the other hand, as the coagulation bath, a non-solvent or a mixed solution containing a non-solvent and a solvent can be used. When a non-solvent is also used for the membrane forming solution, the content of the non-solvent in the coagulation bath is preferably at least 80 wt % of the coagulation bath. When the content of the non-solvent is too small, the coagulation rate of the polyvinylidene fluoride-based resin becomes slow, and the pore diameter becomes large. The content of the non-solvent in the coagulation bath is more preferably in a range of 85 wt % to 100 wt %. On the other hand, when the non-solvent is not used for the membrane forming solution, it is preferable to reduce the content of the non-solvent in the coagulation bath as compared with the case where the non-solvent is also used for the membrane forming solution. The content of the non-solvent in the coagulation bath is preferably 40 wt % at most. When the content of the non-solvent is large, the coagulation rate of the polyvinylidene fluoride-based resin becomes fast, the surface of the porous layer becomes dense, and the water permeability may decrease. The content of the non-solvent is more preferably in a range of 1 wt % to 40 wt %. By adjusting the content of the non-solvent in the coagulation liquid, the pore diameter on the surface of the porous layer and the size of the macrovoids can be controlled. In addition, the coagulation rate becomes too fast when the temperature of the coagulation bath is too high, and conversely, the coagulation rate becomes too slow when the temperature of the coagulation bath is too low. Therefore, it is usually preferable to select the temperature in a range of 15° C. to 80° C. The temperature is more preferably in a range of 20° C. to 60° C.

EXAMPLES

Hereinafter, the present invention will be described with reference to Examples, but the present invention is not limited to these Examples. Measurements in Examples and Comparative Examples were performed as follows.
1. Measurement
(Average Surface Pore Diameter of Microfiltration Membrane and Ultrafiltration Membrane)
A surface of a microfiltration membrane or an ultrafiltration membrane was observed at a magnification of 30000 to 100000 times using an SEM (SS-5500, manufactured by Hitachi High-Technologies Corporation), and an area of each of 300 randomly selected pores was measured. From the area of the pores, a diameter when the pore was assumed to be a circle was calculated as a pore diameter, and an average value thereof was defined as an average surface pore diameter.
(Removal Ratio of Magnesium Sulfate and Removal Ratio of Magnesium Chloride of Nanofiltration Membrane)
Evaluation was performed by comparing permeated water and feed water for a magnesium sulfate concentration and a magnesium chloride concentration when a 2000 mg/L magnesium sulfate aqueous solution and a 2000 mg/L magnesium chloride aqueous solution, each having a pH of 6.5 and a temperature of 25° C., as feed water were allowed to pass through a nanofiltration membrane respectively, under an operating pressure of 0.5 MPa.
The magnesium sulfate concentration and the magnesium chloride concentration were determined by measuring electric conductivities of the feed water and the permeated water with an electric conductivity meter manufactured by Toa Electronics Ltd. to obtain practical salinity units, that is, a $MgSO_4$ concentration and a $MgCl_2$ concentration, respectively. A removal ratio of $MgSO_4$ and a removal ratio of $MgCl_2$ were calculated based on the thus obtained $MgSO_4$ concentration and $MgCl_2$ concentration.

Removal ratio (%) of $MgSO_4$=100×{1−($MgSO_4$ concentration in permeated water/$MgSO_4$ concentration in feed water)}

Removal ratio (%) of $MgCl_2$=100×{1−($MgCl_2$ concentration in permeated water/$MgCl_2$ concentration in feed water)}

(Removal Ratio of Glucose and Removal Ratio of Isopropyl Alcohol of Nanofiltration Membrane)
Evaluation was performed by comparing permeated water and feed water for a glucose concentration and isopropyl alcohol when a 1000 mg/L glucose aqueous solution and a 2000 mg/L isopropyl alcohol aqueous solution, each having a pH of 6.5 and a temperature of 25° C., as feed water were allowed to pass through a nanofiltration membrane respectively, under an operating pressure of 0.5 MPa.
The isopropyl alcohol concentration was determined using a gas chromatograph (GC-18A, manufactured by Shimadzu Corporation).

Removal Ratio (%) of Isopropyl alcohol=100×(1−(isopropyl alcohol concentration in permeated water/isopropyl alcohol concentration in feed water))

The glucose concentration was determined by a refractive index meter (RID-6A, manufactured by Shimadzu Corporation).

Removal ratio (%) of glucose=100×(1−(glucose concentration in permeated water/glucose concentration in feed water))

(Removal Ratio of Isopropyl Alcohol and Removal Ratio of Boron Ion of Reverse Osmosis Membrane)
Evaluation was performed by comparing permeated water and feed water for an isopropyl alcohol concentration and a boron ion concentration when an aqueous solution having a pH of 6.5 and a temperature of 25° C. and containing 30 mg/L of boric acid, 100 mg/L of isopropyl alcohol, and 30000 mg/L of lithium chloride was allowed to pass through a reverse osmosis membrane, which has been immersed in a sulfuric acid aqueous solution having a pH of 1 and a temperature of 25° C. for 24 hours, under an operating pressure of 5.5 MPa.
That is, a removal ratio of isopropyl alcohol was calculated by removal ratio (%) of isopropyl alcohol=100×(1−(isopropyl alcohol concentration in permeated water/isopropyl alcohol concentration in feed water)). The isopropyl alcohol concentration was determined using a gas chromatograph (GC-18A, manufactured by Shimadzu Corporation).
The boron ion concentration was measured by measuring the boron ion concentrations of the feed water and the permeated water using a P-4010 type ICP (high frequency inductively coupled plasma emission spectrometry) apparatus manufactured by Hitachi, Ltd.
The removal ratio of boron ion was calculated based on the boron ion concentration thus obtained and the following formula.

Removal ratio (%) of boron ion=100×{1−(boron ion concentration in permeated water/boron ion concentration in feed water)}

(Specific Surface Area Measurement of Nanofiltration Membrane)
A separation membrane sample was embedded in a PVA resin, dyed with $OsO_4$ in order to facilitate cross-sectional observation, and cut with an ultramicrotome to prepare 10 ultrathin sections. Across-sectional photograph of the obtained ultrathin section was taken using a transmission electron microscope. An acceleration voltage at the time of observation was 100 kV, and an observation magnification was 10000 times. The obtained 10 cross-sectional photographs were analyzed with an image analysis software ImageJ to calculate a length of a separation function layer and a length of a porous support layer, and then an average value of a specific surface area of the separation function layer was obtained from the following formula.

Specific surface area of separation function layer= (length of separation function layer)$^2$/(length of porous support layer)$^2$ (ATR-IR Measurement of Nanofiltration Membrane)
A spectrum was obtained by irradiating a surface of a separation function layer of the nanofiltration membrane with infrared rays using an Avatar 360FT-IR measuring instrument manufactured by Nicolet Corporation, a single reflection horizontal ATR measuring apparatus (OMNI-Sampler) manufactured by the same company as an accessory for total reflection measurement, and an ATR crystal formed of germanium. As measurement conditions, the resolution was set to 2 cm$^{-1}$, the number of scans was set to 256, and measurement was performed at arbitrary 10 points. After the thus obtained spectrum was subjected to auto baseline correction, three points of 900 cm$^{-1}$, 1800 cm$^{-1}$ and 3800 cm$^{-1}$ were corrected as zero points. From the spectrum obtained in this manner, one peak having a maximum value between 1600 cm$^{-1}$ and 1700 cm$^{-1}$ was determined, a peak intensity ratio $I_A/I_{1242}$ was obtained, and an average value of 10 point measurements was calculated. Further, the nanofiltration membrane was immersed in a 1 M sulfuric acid aqueous solution at 40° C. for 21 days, then cleaned with a large amount of pure water, and sufficiently dried, a peak intensity ratio $I_A/I_{1242}$ was determined again under the above conditions, and a ratio of the peak intensity ratio after acid immersion to the peak intensity ratio ($I_A/I_{1242}$) before acid immersion was calculated. When there were a plurality of peaks between 1600 cm$^{-1}$ and 1700 cm$^{-1}$, this ratio was not calculated.

(Acid Resistance of Nanofiltration Membrane)

A nanofiltration membrane was immersed in a 1 M sulfuric acid aqueous solution at 40° C. for 10 days. A magnesium chloride aqueous solution was allowed to pass through the nanofiltration membrane after immersion as feed water under the above conditions, and a removal ratio of magnesium chloride was determined.

2. Preparation of Microfiltration Membrane

Raw materials of a polymer solution used in preparation of a microfiltration membrane are summarized below.

PVDF1 (Kynar (registered trademark) 710 manufactured by Arkema, weight average molecular weight: 180000 Da)

PVDF2 (Solef 1015 manufactured by Solvay, Ltd., weight average molecular weight: 330000 Da)

N-methyl-2-pyrrolidone (hereinafter referred to as "NMP") (manufactured by Mitsubishi Chemical Corporation)

Polyethylene glycol (hereinafter referred to as "PEG") (manufactured by FUJIFILM Wako, Ltd., weight-average molecular weight: 20000 Da)

(Preparation of Microfiltration Membrane 1)

TSP-50100 (PVDF microfiltration membrane manufactured by Toray Industries. Inc.) was used as a microfiltration membrane I. An average surface pore diameter calculated by surface SEM observation was 0.08 μm.

(Preparation of Microfiltration Membrane II)

NMP and the like were added to PVDF1 and stirred at 120° C. for 4 hours to prepare a polymer solution having a composition ratio of PVDF1/PEG/NMP=15/9/76 by weight.

Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was brought into contact with water vapor for 12 hours, and then immersed in distilled water at 40° C. for 60 seconds to be coagulated, thereby forming a porous membrane. An average surface pore diameter calculated by surface SEM observation was 0.55 μm.

Note that 1 mil=0.0254 mm.

(Preparation of Microfiltration Membrane III)

NMP and the like were added to PVDF2 and stirred at 120° C. for 4 hours to prepare a polymer solution having a composition ratio of PVDF2/PEG/NMP=5/10/85 by weight. Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was brought into contact with water vapor for 12 hours, and then immersed in distilled water at 60° C. for 120 seconds to be coagulated, thereby forming a porous membrane. An average surface pore diameter calculated by surface SEM observation was 0.95 μm.

(Preparation of Microfiltration Membrane IV)

NMP and the like were added to PVDF2 and stirred at 120° C. for 4 hours to prepare a polymer solution having a composition ratio of PVDF2/PEG/NMP=3/12/85 by weight. Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was brought into contact with water vapor for 12 hours, and then immersed in distilled water at 80° C. for 120 seconds to be coagulated, thereby forming a porous membrane. An average surface pore diameter calculated by surface SEM observation was 1.1 μm.

3. Preparation of Ultrafiltration Membrane

Raw materials of a polymer solution used in preparation of an ultrafiltration membrane are summarized below.

PVDF3 (Solef 9009 manufactured by Solvay Specialty Chemicals, crystallinity: 44%, melt viscosity: 3 kP)

PVDF4 (Solef 460 manufactured by Solvay Specialty Chemicals, crystallinity: 38%, melt viscosity: 26 kP)

N-methyl-2-pyrrolidone (hereinafter referred to as "NMP") (manufactured by Mitsubishi Chemical Corporation)

Cellulose acetate (hereinafter referred to as "CA") (LT-35 manufactured by Daicel Corporation)

(Preparation of Ultrafiltration Membrane I)

NMP and the like were added to PVDF3 and stirred at 120° C. for 4 hours to prepare a polymer solution having a composition ratio of PVDF3/CA/NMP=12/7/81 by weight.

Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was immersed in distilled water at 15° C. for 60 seconds, after 3 seconds from the coating, to be coagulated, thereby forming a porous membrane having a three-dimensional network structure. An average surface pore diameter calculated by surface SEM observation was 9 nm.

(Preparation of Ultrafiltration Membrane II)

NMP and the like were added to PVDF 4 and stirred at 120° C. for 4 hours to prepare a polymer solution having a composition ratio of PVDF4/CA/NMP=12/7/81 by weight. Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was immersed in distilled water at 30° C. for 60 seconds, after 3 seconds from the coating, to be coagulated, thereby forming a porous membrane having a three-dimensional network structure. An average surface pore diameter calculated by surface SEM observation was 15 nm.

(Preparation of Ultrafiltration Membrane III)

NMP was added to PVDF 4 and stirred at 120° C. for 4 hours to prepare a polymer solution having a composition ratio of PVDF4/NMP=20/80 by weight.

Next, a nonwoven fabric formed of polyester fibers and having a density of 0.42 g/cm$^3$ was used as a support, and the prepared polymer solution was uniformly applied to the surface of the support using a bar coater (membrane thickness: 2 mil) at 10 m/min. The support coated with the polymer solution was immersed in distilled water at 40° C. for 60 seconds, after 3 seconds from the coating, to be coagulated, thereby forming a porous membrane having a three-dimensional network structure. An average surface pore diameter calculated by surface SEM observation was 18 nm.

(Preparation of Ultrafiltration Membrane IV)

MK (SPE30) (PES ultrafiltration membrane manufactured by Synder) was immersed in distilled water at 25° C. for 24 seconds. An average surface pore diameter calculated by surface SEM observation was 5 nm.

(Preparation of Ultrafiltration Membrane V)

ST (SPE10) (PES ultrafiltration membrane manufactured by Synder) was immersed in distilled water at 25° C. for 24 seconds. An average surface pore diameter calculated by surface SEM observation was 3 nm.

4. Preparation of Nanofiltration Membrane (Preparation of Porous Support Membrane)

A 15.0 mass % dimethylformamide (DMF) solution of polysulfone was cast on a nonwoven fabric (air permeability: 0.5 to 1 cc/cm$^2$/sec) formed of polyester fibers at room temperature (25° C.) with a thickness of 180 μm, and immediately immersed in pure water and allowed to stand for 5 minutes to prepare a porous support membrane (thickness: 150 μm to 160 μm) formed of a fiber reinforced polysulfone support membrane. In the followings it was used to prepare a nanofiltration membrane and a reverse osmosis membrane.

(Preparation of Nanofiltration Membrane A)

A porous support membrane was immersed in an aqueous solution containing 2.5 mass % of piperazine for 2 minutes, the support membrane was slowly pulled up in a vertical direction, nitrogen was blown from an air nozzle to remove an excess aqueous solution from the surface of the support membrane, and then an n-decane solution containing 0.2 mass % of trimesic acid chloride was applied at a proportion of 160 cm$^3$/m$^2$ so that the surface of the support membrane was completely wetted, followed by heating under an atmosphere of 80° C. for 1 minute. Next, in order to remove excess solution from the membrane, the membrane was vertically held for 1 minute to perform liquid removal, and a gas of 20° C. was blown using a blower to dry the membrane. Immediately after drying, the membrane was cleaned with water and stored at room temperature to obtain a nanofiltration membrane A.

(Preparation of Nanofiltration Membrane B)

A nanofiltration membrane B was obtained by the same operation as that of the nanofiltration membrane A except that 2-methylpiperazine was used instead of piperazine.

(Preparation of Nanofiltration Membrane C)

The nanofiltration membrane B was immersed in an aqueous solution containing 1.0 mass % of propionic anhydride for 2 minutes, immediately cleaned with water, and stored at room temperature to obtain a nanofiltration membrane C.

(Preparation of Nanofiltration Membrane D)

A nanofiltration membrane D was obtained by the same operation as that of the nanofiltration membrane A, except that 2,5-dimethylpiperazine was used instead of piperazine, the trimesic acid chloride concentration was changed to 0.1 mass %, and the heating at 80° C. was changed to being allowed to stand under an atmosphere of 25° C. for 1 minute.

(Preparation of Nanofiltration Membrane E)

A nanofiltration membrane E was obtained by the same operation as that of the nanofiltration membrane A except that 2.5 mass % of 2,5-dimethylpiperazine was used instead of piperazine, the trimesic acid chloride concentration was changed to 0.1 mass %, and the heating temperature was changed to 100° C.

(Preparation of Nanofiltration Membrane F)

A nanofiltration membrane F was obtained by the same operation as that of the nanofiltration membrane A except that the aqueous solution containing 2.5 mass % of piperazine was changed to an aqueous solution containing 2.0 mass % of 2,5-diethylpiperazine, the trimesic acid chloride concentration was changed to 0.1 mass %, the heating at 80° C. was changed to being allowed to stand under an atmosphere of 25° C. for 1 minute, and further the membrane was immersed in an aqueous solution containing 1.0 mass % of acetic anhydride for 2 minutes after drying and before cleaning with water.

(Preparation of Nanofiltration Membrane G)

A nanofiltration membrane G was obtained by the same operation as that of the nanofiltration membrane A except that the aqueous solution containing 2.5 mass % of piperazine was changed to an aqueous solution containing 2.0 mass % of 2,5-diethylpiperazine and 0.4 mass % of triethylenetetramine, the trimesic acid chloride concentration was changed to 0.1 mass %, and the heating temperature was set to 100° C.

(Preparation of Nanofiltration Membrane H)

A nanofiltration membrane H was obtained by the same operation as that of the nanofiltration membrane A except that the piperazine concentration was changed to 2.0 mass %, the trimesic acid chloride concentration was changed to 0.5 mass %, and the heating at 80° C. was changed to being allowed to stand under an atmosphere of 25° C. for 1 minute.

(Preparation of Nanofiltration Membrane I)

The nanofiltration membrane H was immersed in a 2.0 mass % sodium hypochlorite aqueous solution adjusted to pH 11 for 2 hours, and then cleaned with pure water at 30° C. to obtain a nanofiltration membrane 1.

(Preparation of Nanofiltration Membrane J)

The nanofiltration membrane A was immersed in a 4.0 mass % sodium hypochlorite aqueous solution adjusted to pH 11 for 2 hours, and then cleaned with pure water at 30° C. to obtain a nanofiltration membrane J.

(Preparation of Nanofiltration Membrane K)

A porous support membrane was immersed for 2 minutes in an aqueous solution containing 3.0 mass % of polyfunctional amine and ε-caprolactam prepared so that a total amount of polyfunctional amine was 1.5 mass % and a molar ratio of meta-phenylenediamine/1,3,5-triaminobenzene=70/30, and the support membrane was slowly pulled up in the vertical direction, nitrogen was blown from an air nozzle to remove an excess aqueous solution from the surface of the support membrane, and then an n-decane solution containing 0.05 mass % of trimesic acid chloride was applied so that the surface was completely wetted, followed by being allowed to stand under an atmosphere of 25° C. for 1 minute. Next, in order to remove excess solution from the membrane, the membrane was vertically held for 2 minutes to perform liquid removal, and a gas of 20° C. was blown using a blower to dry the membrane. The separation membrane thus obtained was treated with an aqueous solution containing 0.7 mass % of sodium nitrite and 0.1 mass % of sulfuric acid at room temperature for 2 minutes, immediately cleaned with water, and stored at room temperature to obtain a nanofiltration membrane K.

(Preparation of Nanofiltration Membrane L)

SCL-100 (cellulose acetate reverse osmosis membrane manufactured by Toray Industries, Inc.) was treated with a 0.5 mass % sodium hypochlorite aqueous solution adjusted to pH 9 at room temperature for 24 hours, and then cleaned with water to obtain a nanofiltration membrane L.

(Preparation of Nanofiltration Membrane M)

A nanofiltration membrane M was obtained by the same operation as that of the nanofiltration membrane A except that polyethyleneimine (weight average molecular weight: 600) was used instead of piperazine.

5. Preparation of Reverse Osmosis Membrane (Preparation of Reverse Osmosis Membrane A)

A porous support membrane was immersed in an aqueous solution in which 1.8 mass % of m-phenylenediamine (m-PDA) was dissolved for 15 seconds, then nitrogen was blown from an air nozzle to remove the excess aqueous solution. Further, an n-decane solution containing 0.07 mass % of trimesic acid chloride at 30° C. was uniformly applied to the entire surface of the porous support layer, followed by being allowed to stand at 30° C. for 1 minute, and two fluids (pure water and air) were blown onto the membrane surface to remove the solution on the surface. Thereafter, the membrane was cleaned with pure water at 80° C. to obtain a reverse osmosis membrane A.

(Preparation of Reverse Osmosis Membrane B)

The reverse osmosis membrane A was immersed in a 0.3 mass % sodium nitrite aqueous solution adjusted to pH 3 at 35° C. for 1 minute. The pH of sodium nitrite was adjusted with sulfuric acid. Thereafter, the membrane was immersed in a 0.1 wt % sodium sulfite aqueous solution for 1 minute, and then cleaned with pure water at 30° C. to obtain a reverse osmosis membrane B.

(Preparation of Reverse Osmosis Membrane C)

A porous support membrane was immersed in an aqueous solution in which 3.0 mass % of m-phenylenediamine (m-PDA) was dissolved for 15 seconds, then nitrogen was blown from an air nozzle to remove the excess aqueous solution. Further, an n-decane solution containing 0.15 mass % of trimesic acid chloride at 40° C. was uniformly applied to the entire surface of the porous support layer, followed by drying by heating at 80° C. for 1 minute, and then two fluids (pure water and air) were blown to the membrane surface to remove the solution on the surface. Next, the membrane was cleaned with pure water at 80° C. to obtain a reverse osmosis membrane C.

(Preparation of Reverse Osmosis Membrane D)

The reverse osmosis membrane C was immersed in a 0.3 mass % sodium nitrite aqueous solution adjusted to pH 3 at 35° C. for 1 minute. The pH of sodium nitrite was adjusted with sulfuric acid. Thereafter, the membrane was immersed in pure water at 30° C. for 10 seconds, then immersed in an aqueous solution at 80° C. in which 0.01 mass % of m-PDA was dissolved for 1 minute, and cleaned again with pure water at 30° C. to obtain a reverse osmosis membrane D.

(Preparation of Reverse Osmosis Membrane E)

The reverse osmosis membrane C was immersed in a 1.0 mass % acetic anhydride aqueous solution at 25° C. for 2 minutes, and then cleaned with pure water at 30° C. to obtain a reverse osmosis membrane E.

(Preparation of Reverse Osmosis Membrane F)

A porous support membrane was immersed for 15 seconds in an aqueous solution prepared so that a total amount of polyfunctional aromatic amine was 1.8 mass % and a molar ratio of m-PDA/1,3,5-triaminobenzene was 90/10, then nitrogen was blown from an air nozzle to remove the excess aqueous solution. Further, an n-decane solution containing 0.07 mass % of trimesic acid chloride at 30° C. was uniformly applied to the entire surface of the porous support layer, followed by being allowed to stand at 30° C. for 1 minute, and two fluids (pure water and air) were blown to the membrane surface to remove the solution on the surface. Thereafter, the membrane was cleaned with pure water at 80° C. to obtain a reverse osmosis membrane F.

(Preparation of Reverse Osmosis Membrane G)

A porous support membrane was immersed for 15 seconds in an aqueous solution prepared so that a total amount of polyfunctional amine was 1.8 mass % and a molar ratio of m-PDA/piperazine was 95/5, then nitrogen was blown from an air nozzle to remove the excess aqueous solution. Further, an n-decane solution containing 0.07 mass % of trimesic acid chloride at 30° C. was uniformly applied to the entire surface of the porous support layer, followed by being allowed to stand at 30° C. for 1 minute, and two fluids (pure water and air) were blown to the membrane surface to remove the solution on the surface. Thereafter, the membrane was cleaned with pure water at 80° C. to obtain a reverse osmosis membrane G.

(Preparation of Reverse Osmosis Membrane H)

The reverse osmosis membrane A was immersed in a 2.0 mass % sodium hypochlorite aqueous solution adjusted to pH 11 for 2 hours, and then cleaned with pure water at 30° C. to obtain a reverse osmosis membrane H.

(Preparation of Reverse Osmosis Membrane I)

The reverse osmosis membrane A was immersed in a 4.0 mass % sodium hypochlorite aqueous solution adjusted to pH 11 for 4 hours, and then cleaned with pure water at 30° C. to obtain a reverse osmosis membrane I.

(Preparation of Reverse Osmosis Membrane J)

SCL-100 (cellulose acetate reverse osmosis membrane manufactured by Toray Industries, Inc.) was treated with a 0.5 mass % sodium hypochlorite aqueous solution adjusted to pH 9 at room temperature for 24 hours, and then cleaned with water to obtain a reverse osmosis membrane J.

6. Recovery of Lithium Ion (1) Acid Treatment Step (Rare Metal-Containing Acid Aqueous Solution A)

A 1 M sulfuric acid aqueous solution was brought into contact with NMC 622 as a positive electrode material of a lithium ion battery, various rare metals were extracted, and then the pH was adjusted to 1.0 using a 1M sulfuric acid aqueous solution to obtain a transparent solution. The transparent solution was used as a rare metal-containing acidic aqueous solution A. Using a P-4010 type ICP (high frequency inductively coupled plasma emission spectrometry) apparatus manufactured by Hitachi, Ltd., various ion concentrations of the obtained solution were quantitatively determined, and the results were as shown in Table 1.

(Rare Metal-Containing Acidic Aqueous Solution B)

A suspension obtained by adding dimethyl carbonate as a simulated electrolytic solution of a lithium ion battery and PVDF (weight average molecular weight: 114 kDa) as a simulated binder material to the rare metal-containing acidic aqueous solution A was used as a rare metal-containing acidic aqueous solution B.

(Rare Metal-Containing Acidic Aqueous Solution C)

A transparent solution obtained by adding dimethyl carbonate as a simulated electrolytic solution of a lithium ion battery and crosslinked polyacrylic acid (monomer composition: acrylic acid/trimethylolpropane trimethacrylate copolymer: 99 mol %/1 mol %, weight average molecular weight: 55 kDa) as a simulated binder material to the rare metal-containing acidic aqueous solution A was used as a rare metal-containing acidic aqueous solution C.

(Rare Metal-Containing Acidic Aqueous Solution D)

A 1M sulfuric acid aqueous solution was brought into contact with NMC 622 as a positive electrode material of a lithium ion battery, various rare metals were extracted, and then the pH was adjusted to 1.0 using 1 M hydrochloric acid and 1 M sulfuric acid aqueous solution to obtain a rare metal-containing acidic aqueous solution D.

(Rare Metal-Containing Acidic Aqueous Solution E)

A rare metal-containing acidic aqueous solution E was prepared in the same manner as in the preparation of the rare metal-containing acidic aqueous solution D except that the final pH was set to 0.5.

(Rare Metal-Containing Acidic Aqueous Solution F)

A rare metal-containing acidic aqueous solution F was prepared in the same manner as in the preparation of the rare metal-containing acidic aqueous solution D except that the final pH was set to 0.4.

(Rare Metal-Containing Acidic Aqueous Solution G)

A rare metal-containing acidic aqueous solution G was prepared in the same manner as in the rare metal-containing acidic aqueous solution D except that sodium hydroxide was used so that the final pH was 7.0.

(Rare Metal-Containing Acidic Aqueous Solution H)

A rare metal-containing acidic aqueous solution H was prepared in the same manner as in the rare metal-containing acidic aqueous solution D except that sodium hydroxide was used so that the final pH was 8.0.

(Rare Metal-Containing Acidic Aqueous Solution I)

A rare metal-containing acidic aqueous solution I was prepared in the same manner as in the preparation of the rare metal-containing acidic aqueous solution D except that the molar concentration of monovalent anions relative to the molar concentration of all anions was 0.5 equivalents.

(Rare Metal-Containing Acidic Aqueous Solution J)

A rare metal-containing acidic aqueous solution J was prepared in the same manner as in the rare metal-containing acidic aqueous solution I except that nitric acid was used instead of hydrochloric acid so that the monovalent anion was a nitrate ion.

(Rare Metal-Containing Acidic Aqueous Solution K)

A rare metal-containing acidic aqueous solution K was prepared in the same manner as in the rare metal-containing acidic aqueous solution A except that sodium hydroxide was used so that the final pH was 7.0.

tion membrane under each temperature condition and an operating pressure of 0.1 MPa.

Two hours after the start of filtration, various ion concentrations in the permeated water were measured using a P-4010 type ICP (high frequency inductively coupled plasma emission spectrometry) apparatus manufactured by Hitachi, Ltd., and the ion concentrations were the same under all conditions as shown in Table 3.

In addition, when the membrane surface of the microfiltration membrane was clogged in the pretreatment step and the amount of the permeate liquid was reduced to half or less of the initial value, the membrane surface was cleaned with a 0.5 wt % sodium hypochlorite aqueous solution adjusted to pH 9 to eliminate the clogging of the membrane surface, and then the chemical agent was cleaned away with distilled water. Thereafter, the filtration was further continued. The same operation was continued for one year, an interval from the start of filtration to the first cleaning and a cleaning interval after the first cleaning were recorded, and the average value of the intervals was calculated as shown in Table 2.

TABLE 2

| | Conditions | | | | | | |
|---|---|---|---|---|---|---|---|
| | a | b | c | d | e | f | g |
| | Microfiltration membrane | | | | | | |
| | I | II | I | I | I | III | IV |
| Pore diameter (μm) of microfiltration membrane | 0.08 | 0.55 | 0.08 | 0.08 | 0.08 | 0.95 | 1.1 |
| Treatment temperature (° C.) | 25 | 25 | −0.5 | 102 | 98 | 25 | 25 |
| Average value (month) of cleaning interval | 6 | 6 | 3 | 2 | 6 | 6 | 2 |

(Conditions h to p)

TABLE 1

| Rare metal-containing acidic aqueous solution | $Li^+$ concentration mg/L | $Ni^{2+}$ concentration mg/L | $Co^{2+}$ concentration mg/L | $Mn^{2+}$ concentration mg/L | Simulated electrolytic solution | Simulated binder material | Monovalent anion | Monovalent anion equivalent | pH |
|---|---|---|---|---|---|---|---|---|---|
| A | 6590 | 16500 | 5500 | 3400 | — | — | — | 0 | 1.0 |
| B | | | | | Dimethyl carbonate | PVDF | — | 0 | 1.0 |
| C | | | | | Dimethyl carbonate | Crosslinked polyacrylic acid | — | 0 | 1.0 |
| D | | | | | — | — | Cl | 0.1 | 1.0 |
| E | | | | | — | — | Cl | 0.1 | 0.5 |
| F | | | | | — | — | Cl | 0.1 | 0.4 |
| G | | | | | — | — | Cl | 0.1 | 7.0 |
| H | | | | | — | — | Cl | 0.1 | 8.0 |
| I | | | | | — | — | Cl | 0.5 | 1.0 |
| J | | | | | — | — | $NO_3$ | 0.5 | 1.0 |
| K | | | | | — | — | — | 0 | 7.0 |

In Table 1, the monovalent anion equivalent represents the molar equivalent of the monovalent anion in the whole anions in the aqueous solution.

(2) Pretreatment Step (Conditions a to g)

As shown in Table 2, the above rare metal-containing acidic aqueous solution B was supplied to each microfiltra- As shown in Table 4, the above rare metal-containing acidic aqueous solution C was supplied to each ultrafiltration membrane under each temperature condition and operating pressure of 0.1 MPa.

Two hours after the start of filtration, total organic carbon (TOC) in the permeated water was quantified using TOC-Vcsh (total organic carbon meter) manufactured by Shimadzu Corporation, and the results are shown in Table 4. Various ion concentrations in the permeated water were measured using a P-4010 type ICP (high frequency inductively coupled plasma emission spectrometry) apparatus manufactured by Hitachi, Ltd., and the ion concentrations were the same under all conditions as shown in Table 3.

TABLE 3

Permeated water in pretreatment steps a to p (raw water in first separation step)

| | |
|---|---|
| $Li^+$ (mg/L) | 6590 |
| $Ni^{2+}$ (mg/L) | 16500 |
| $Co^{2+}$ (mg/L) | 5500 |
| $Mn^{2+}$ (mg/L) | 3400 |
| $Li^+$/polyvalent ion | 0.26 |

TABLE 4

| | Conditions | | | | | | | |
|---|---|---|---|---|---|---|---|---|
| | h | i | j | k | l | m | n | o | p |
| | Ultrafiltration membrane | | | | | | | | |
| | I | II | III | I | IV | V | I | I | IV |
| Pore diameter (nm) of ultrafiltration membrane | 9 | 15 | 18 | 9 | 5 | 3 | 9 | 9 | 5 |

TABLE 4-continued

| | Conditions | | | | | | | |
|---|---|---|---|---|---|---|---|---|
| | h | i | j | k | l | m | n | o | p |
| | Ultrafiltration membrane | | | | | | | | |
| | I | II | III | I | IV | V | I | I | IV |
| Treatment temperature (° C.) | 25 | 25 | 25 | 102 | 25 | 25 | 40 | 60 | 65 |
| TOC of permeated water | 0.03 | 0.12 | 3.2 | 2.7 | 0.02 | 0.01 | 0.02 | 0.04 | 0.52 |

(3) Separation Step

The results of evaluation of removal ratios of magnesium sulfate, magnesium chloride, glucose, and isopropyl alcohol using the nanofiltration membranes A to M are shown in Table 5. The specific surface area, ATR-IR measurement data, and acid resistance of the separation function layer are also shown in Table 5. In addition, the surface zeta potential at pH 3 and the total proportion of halogen in elements measured in X-ray photoelectron spectroscopy measurement of the surface on the separation function layer side, which were measured by the above method, are also shown.

TABLE 5

| | | Nanofiltration membrane | | | | | | | | | | | | |
|---|---|---|---|---|---|---|---|---|---|---|---|---|---|---|
| | | A | B | C | D | E | F | G | H | I | J | K | L | M |
| Specific surface area of separation function layer | | 1.09 | 1.35 | 1.41 | 1.40 | 1.38 | 1.67 | 1.21 | 1.05 | 1.09 | 1.09 | 1.78 | 1.03 | 1.02 |
| Total proportion (%) of balogen | | 0.0 | 0.0 | 0.0 | 0.0 | 0.0 | 0.0 | 0.0 | 0.0 | 0.3 | 0.4 | 0.0 | 0.0 | 0 |
| Surface zeta potential (mV) at pH 3 | | 15 | 6 | 1 | 9 | 3 | 1 | 8 | −2 | −5 | −11 | 12 | −10 | 20 |
| Number of peaks having a maximum value between 1600 $cm^{-1}$ and 1700 $cm^{-1}$ in infrared spectroscopy measurement | | 1 | 1 | 1 | 1 | 1 | 1 | 1 | 1 | 1 | 1 | 2 | 1 | 1 |
| Initial performance | (m) Removal ratio (%) of magnesium sulfate | 99.8 | 99.3 | 99.0 | 99.4 | 99.6 | 98.81 | 99.4 | 99.7 | 99.8 | 99.8 | 99.8 | 97.5 | 97.2 |
| | (n) Removal ratio (%) of magnesium chloride | 86.2 | 80.2 | 84.2 | 86.2 | 94.8 | 84.1 | 88.0 | 78.4 | 70.3 | 75.3 | 90.5 | 76.0 | 91.0 |
| | m-n (%) | 13.6 | 19.1 | 14.8 | 13.2 | 4.8 | 14.7 | 11.4 | 21.3 | 29.5 | 24.5 | 9.3 | 21.5 | 6.2 |
| | (q) Removal ratio (%) of glucose | 96.2 | 73.0 | 75.2 | 71.2 | 94.0 | 70.6 | 88.0 | 93.1 | 92.5 | 93.5 | 99.4 | 83.0 | 66.4 |
| | (r) Removal ratio of isopropanol (%) | 39.2 | 19.5 | 22.0 | 16.4 | 29.0 | 26.5 | 28.4 | 29.3 | 17.0 | 18.0 | 70.3 | 5.2 | 27.1 |
| | q-r (%) | 57.0 | 53.5 | 53.2 | 54.8 | 65.0 | 44.1 | 59.6 | 63.8 | 75.5 | 75.5 | 29.1 | 77.8 | 39.3 |
| Removal ratio (%) of magnesium chloride after immersion in 1M sulfuric acid aqueous solution at 40° C. for 10 days | | 33.0 | 48.7 | 55.4 | 51.0 | 88.0 | 89.1 | 92.0 | 28.0 | 23.0 | 12.0 | 88.0 | 72.0 | 24.6 |
| Ratio of peak intensity ratio before and after immersion in 1M sulfuric acid aqueous solution at 40° C. for 21 days after immersion ($I_{1600-1700}/I_{1242}$)/ before immersion ($I_{1600-1700}/I_{1242}$) | | 0.23 | 0.35 | 0.39 | 0.41 | 0.66 | 0.56 | 0.76 | 0.23 | 0.15 | 0.10 | — | 0.32 | 0.30 |

Example 1

The nanofiltration membrane A was used as a separation membrane, the rare metal-containing acidic aqueous solution A was treated as feed water in a first separation step, and the permeated water in the first separation step was further treated in a second separation step. The ion concentration in the permeated water was evaluated. The operating pressure was 5.5 MPa in the first separation step and 0.5 MPa in the second separation step. The results are shown in Table 6.

Examples 2 to 7

The same procedure as in Example 1 was carried out except that nanofiltration membranes B to G were used as the separation membrane. The results are shown in Table 6.

TABLE 6

| | | | Example 1 | | Example 2 | | Example 3 | | Example 4 | |
|---|---|---|---|---|---|---|---|---|---|---|
| Feed water for first separation step | | | Rare metal-containing acidic aqueous solution A | | | | | | | |
| Separation step | Nanofiltration membrane | | A | | B | | C | | D | |
| | Measurement timing | | 2 hours after operation | 1 week after operation | 2 hours after operation | 1 week after operation | 2 hours after operation | 1 week after operation | 2 hours after operation | 1 week after operation |
| | Permeated water in first separation step | Concentration (mg/L) $Li^+$ | 2306 | 5707 | 5085 | 6102 | 4683 | 5479 | 5263 | 6158 |
| | | $Ni^{2+}$ | 33 | 4900 | 114 | 3266 | 163 | 1633 | 98 | 980 |
| | | $Co^{2+}$ | 11 | 1617 | 38 | 1078 | 54 | 539 | 32 | 323 |
| | | $Mn^{2+}$ | 7 | 1000 | 23 | 666 | 33 | 333 | 20 | 200 |
| | $Li^+$/polyvalent ion in permeated water through nanofiltration membrane | | 46 | 0.76 | 29 | 1.2 | 19 | 2.2 | 35 | 4.1 |
| | Permeated water in second separation step | Concentration (mg/L) $Li^+$ | 645 | 1597 | 1423 | 1708 | 1311 | 1534 | 1473 | 1724 |
| | | $Ni^{2+}$ | 0.07 | 10 | 0.23 | 6 | 0.33 | 3 | 0.20 | 2 |
| | | $Co^{2+}$ | 0.02 | 3 | 0.08 | 2 | 0.11 | 1 | 0.06 | 1 |
| | | $Mn^{2+}$ | 0.01 | 2 | 0.05 | 1 | 0.07 | 1 | 0.04 | 0 |
| | $Li^+$/polyvalent ion in permeated water through nanofiltration membrane | | 6415 | 108 | 4042 | 173 | 2606 | 311 | 4881 | 582 |

| | | | Example 5 | | Example 6 | | Example 7 | |
|---|---|---|---|---|---|---|---|---|
| Feed water for first separation step | | | Rare metal-containing acidic aqueous solution A | | | | | |
| Separation step | Nanofiltration membrane | | E | | F | | G | |
| | Measurement timing | | 2 hours after operation | 1 week after operation | 2 hours after operation | 1 week after operation | 2 hours after operation | 1 week after operation |
| | Permeated water in first separation step | Concentration (mg/L) $Li^+$ | 3184 | 3630 | 4516 | 5799 | 369 | 3954 |
| | | $Ni^{2+}$ | 65 | 122 | 196 | 224 | 98 | 114 |
| | | $Co^{2+}$ | 22 | 40 | 65 | 74 | 32 | 38 |
| | | $Mn^{2+}$ | 13 | 25 | 40 | 46 | 20 | 23 |
| | $Li^+$/polyvalent ion in permeated water through nanofiltration membrane | | 32 | 19 | 15 | 17 | 25 | 23 |
| | Permeated water in second separation step | Concentration (mg/L) $Li^+$ | 891 | 1016 | 1264 | 1623 | 1033 | 1107 |
| | | $Ni^{2+}$ | 0.13 | 0.24 | 0.40 | 0.44 | 0.20 | 0.23 |
| | | $Co^{2+}$ | 0.04 | 0.08 | 0.13 | 0.14 | 0.06 | 0.07 |
| | | $Mn^{2+}$ | 0.03 | 0.05 | 0.08 | 0.09 | 0.04 | 0.05 |
| | $Li^+$/polyvalent ion in permeated water through nanofiltration membrane | | 4429 | 2744 | 2094 | 2400 | 3423 | 3203 |

Examples 8 to 20

As shown in Tables 7 and 8, the same procedure as in Example 1 was carried out except that permeated water through the microfiltration membrane obtained by treating the rare metal-containing acidic aqueous solution B under the conditions a to g was used as feed water of the first separation step, and the treatment was performed using the nanofiltration membranes A to G, respectively. The results are shown in Tables 7 and 8. Data for 2 hours after operation in Examples 14 to 20 were shown in Table 8 as common results.

TABLE 7

| | | | | Example 8 | | Example 9 | | Example 10 | |
|---|---|---|---|---|---|---|---|---|---|
| | Pretreatment step | | | a | | a | | a | |
| Separation step | Nanofiltration membrane | | | A | | B | | C | |
| | Measurement timing | | | 2 hours after operation | 1 year after operation | 2 hours after operation | 1 year after operation | 2 hours after operation | 1 year after operation |
| | Permeated water in first step | Concentration mg/L | $Li^+$ | 2306 | 6278 | 5085 | 6530 | 4683 | 6027 |
| | | | $Ni^{2+}$ | 33 | 9799 | 114 | 6533 | 163 | 3266 |
| | | | $Co^{2+}$ | 11 | 3234 | 38 | 2156 | 54 | 1078 |
| | | | $Mn^{2+}$ | 7 | 1999 | 23 | 1333 | 33 | 666 |
| | | $Li^+$/polyvalent ion | | 46 | 0.42 | 29 | 0.65 | 19 | 1.2 |
| | Permeated water in second step | Concentration mg/L | $Li^+$ | 645 | 1757 | 1423 | 1879 | 1311 | 1687 |
| | | | $Ni^{2+}$ | 0.07 | 19 | 0.23 | 13 | 0.33 | 6.5 |
| | | | $Co^{2+}$ | 0.02 | 6.3 | 0.08 | 4.2 | 0.11 | 2.1 |
| | | | $Mn^{2+}$ | 0.01 | 3.9 | 0.05 | 2.6 | 0.07 | 1.3 |
| | | $Li^+$/polyvalent ion | | 6415 | 59 | 4042 | 95 | 2606 | 171 |
| | | | | Example 11 | | Example 12 | | Example 13 | |
| | Pretreatment step | | | a | | a | | a | |
| Separation step | Nanofiltration membrane | | | D | | E | | F | |
| | Measurement timing | | | 2 hours after operation | 1 year after operation | 2 hours after operation | 1 year after operation | 2 hours after operation | 1 year after operation |
| | Permeated water in first step | Concentration mg/L | $Li^+$ | 5263 | 6589 | 3184 | 3993 | 4516 | 6379 |
| | | | $Ni^{2+}$ | 98 | 1960 | 65 | 245 | 196 | 447 |
| | | | $Co^{2+}$ | 32 | 647 | 2.2 | 81 | 65 | 148 |
| | | | $Mn^{2+}$ | 20 | 400 | 13 | 50 | 40 | 91 |
| | | $Li^+$/polyvalent ion | | 35 | 2.2 | 32 | 11 | 15 | 9.3 |
| | Permeated water in second step | Concentration mg/L | $Li^+$ | 1473 | 1896 | 891 | 1118 | 1264 | 1786 |
| | | | $Ni^{2+}$ | 0.20 | 3.9 | 0.13 | 0.48 | 0.40 | 0.89 |
| | | | $Co^{2+}$ | 0.06 | 1.3 | 0.04 | 0.16 | 0.13 | 0.29 |
| | | | $Mn^{2+}$ | 0.04 | 0.8 | 0.03 | 0.10 | 0.08 | 0.18 |
| | | $Li^+$/polyvalent ion | | 4881 | 320 | 4429 | 1509 | 2094 | 1320 |

TABLE 8

| | | | | — | Example 14 | Example 15 | Example 16 |
|---|---|---|---|---|---|---|---|
| | Pretreatment step | | | a to g | a | b | e |
| Separation step | Nanofiltration membrane | | | G | G | G | G |
| | Measurement timing | | | 2 hours after operation | 1 year after operation | 1 year after operation | 1 year after operation |
| | Permeated water in first step | Concentration mg/L | $Li^+$ | 3691 | 4349 | 4152 | 4011 |
| | | | $Ni^{2+}$ | 98 | 229 | 137 | 235 |
| | | | $Co^{2+}$ | 32 | 75 | 45 | 78 |
| | | | $Mn^{2+}$ | 20 | 47 | 28 | 51 |
| | | $L^+$/polyvalent ion | | 25 | 12 | 20 | 11 |
| | Permeated water in second step | Concentration mg/L | $Li^+$ | 1033 | 1217 | 1162 | 1160 |
| | | | $Ni^{2+}$ | 0.20 | 0.45 | 0.27 | 0.4 |
| | | | $Co^{2+}$ | 0.06 | 0.15 | 0.09 | 0.16 |
| | | | $Mn^{2+}$ | 0.04 | 0.09 | 0.05 | 0.1 |
| | | $L^+$/polyvalent ion | | 3423 | 1762 | 2803 | 1589 |
| | | | | Example 17 | Example 18 | Example 19 | Example 20 |
| | Pretreatment step | | | f | c | d | g |
| Separation step | Nanofiltration membrane | | | G | G | G | G |
| | Measurement timing | | | 1 year after operation | 1 year after operation | 1 year after operation | 1 year after operation |
| | Permeated water in first step | Concentration mg/L | $Li^+$ | 3867 | 4705 | 989 | 1050 |
| | | | $Ni^{2+}$ | 119 | 915 | 229 | 240 |
| | | | $Co^{2+}$ | 38 | 302 | 75 | 81 |
| | | | $Mn^{2+}$ | 20 | 187 | 47 | 51 |
| | | $L^+$/polyvalent ion | | 22 | 3.4 | 2.8 | 2.8 |

TABLE 8-continued

| | | | | | | |
|---|---|---|---|---|---|---|
| Permeated water in second step | Concentration mg/L | $Li^+$ | 990 | 1317 | 304 | 312 |
| | | $Ni^{2+}$ | 0.24 | 1.8 | 0.45 | 0.47 |
| | | $Co^{2+}$ | 0.08 | 0.59 | 0.15 | 0.16 |
| | | $Mn^{2+}$ | 0.04 | 0.36 | 0.09 | 0.10 |
| | $L^+$/polyvalent ion | | 2750 | 476 | 440 | 427 |

Examples 21 to 35

As shown in Tables 9 and 10, the same procedure as in Example 1 was carried out except that permeated water through the ultrafiltration membrane obtained by treating the rare metal-containing acidic aqueous solution C under the conditions h to p was used as feed water of the first separation step, and the treatment was performed using the nanofiltration membranes A to G, respectively. The results are shown in Tables 9 and 10.

TABLE 9

| | | | Example 21 | | Example 22 | | Example 23 | | Example 24 | |
|---|---|---|---|---|---|---|---|---|---|---|
| Separation step | Pretreatment step | | h | | h | | h | | h | |
| | Nanofiltration membrane | | A | | B | | C | | D | |
| | Measurement timing | | 2 hours after operation | 1 week after operation | 2 hours after operation | 1 week after operation | 2 hours after operation | 1 week after operation | 2 hours after operation | 1 week after operation |
| | Permeated water in first separation step | Concentration mg/L $Li^+$ | 2306 | 5707 | 5085 | 6102 | 4683 | 5479 | 5263 | 6158 |
| | | $Ni^{2+}$ | 33 | 4900 | 114 | 3266 | 163 | 1633 | 98 | 980 |
| | | $Co^{2+}$ | 11 | 1617 | 38 | 1078 | 54 | 539 | 32 | 323 |
| | | $Mn^{2+}$ | 7 | 1000 | 23 | 666 | 33 | 333 | 20 | 200 |
| | | $Li^+$/polyvalent ion in permeated water through nanofiltration membrane | 46 | 0.76 | 29 | 1.2 | 19 | 2.2 | 35 | 4.1 |
| | | Flow rate (m/d) | 0.43 | 0.48 | 0.52 | 0.54 | 0.50 | 0.5 | 0.56 | 0.60 |
| | Measurement timing | | 2 hours after operation | 1 week after operation | 2 hours after operation | 1 week after operation | 2 hours after operation | 1 week after operation | 2 hours after operation | 1 week after operation |
| | Permeated water in second separation step | Concentration mg/L $Li^+$ | 645 | 1597 | 1423 | 1708 | 1311 | 1534 | 1473 | 1724 |
| | | $Ni^{2+}$ | 0.07 | 10 | 0.23 | 6 | 0.33 | 3 | 0.20 | 2 |
| | | $Co^{2+}$ | 0.02 | 3 | 0.08 | 2 | 0.11 | 1 | 0.06 | 1 |
| | | $Mn^{2+}$ | 0.01 | 2 | 0.05 | 1 | 0.07 | 1 | 0.04 | 0 |
| | | $Li^+$/polyvalent ion in permeated water through nanofiltration membrane | 6415 | 108 | 4042 | 173 | 2606 | 311 | 4881 | 582 |
| | | Flow rate (m/d) | 0.53 | 0.59 | 0.64 | 0.67 | 0.62 | 0.63 | 0.69 | 0.74 |
| | | | Example 25 | | Example 26 | | Example 27 | | | |
| Separation step | Pretreatment step | | h | | h | | h | | | |
| | Nanofiltration membrane | | E | | F | | G | | | |
| | Measurement timing | | 2 hours after operation | 1 week after operation | 2 hours after operation | 1 week after operation | 2 hours after operation | 1 week after operation | | |
| | Permeated water in first separation step | Concentration mg/L $Li^+$ | 3184 | 3630 | 4516 | 5799 | 3691 | 3954 | | |
| | | $Ni^{2+}$ | 65 | 122 | 196 | 224 | 98 | 114 | | |
| | | $Co^{2+}$ | 22 | 40 | 65 | 74 | 32 | 38 | | |
| | | $Mn^{2+}$ | 13 | 25 | 40 | 46 | 20 | 23 | | |
| | | $Li^+$/polyvalent ion in permeated water through nanofiltration membrane | 32 | 19 | 15 | 17 | 25 | 23 | | |
| | | Flow rate (m/d) | 0.41 | 0.42 | 0.54 | 0.55 | 0.19 | 0.19 | | |
| | Measurement timing | | 2 hours after operation | 1 week after operation | 2 hours after operation | 1 week after operation | 2 hours after operation | 1 week after operation | | |

TABLE 9-continued

|  |  |  |  |  |  |  |  |  |
|---|---|---|---|---|---|---|---|---|
| Perme- | Concen- | Li⁺ | 891 | 1016 | 1264 | 1623 | 1033 | 1107 |
| ated | tration | Ni²⁺ | 0.13 | 0.24 | 0.40 | 0.44 | 0.20 | 0.23 |
| water in | mg/L | Co²⁺ | 0.04 | 0.08 | 0.13 | 0.14 | 0.06 | 0.07 |
| second |  | Mn²⁺ | 0.03 | 0.05 | 0.08 | 0.09 | 0.04 | 0.05 |
| separation step | Li⁺/polyvalent ion in permeated water through nanofiltration membrane |  | 4429 | 2744 | 2094 | 2400 | 342: | 3203 |
|  | Flow rate (m/d) |  | 0.50 | 0.52 | 0.67 | 0.68 | 0.23 | 0.23 |

TABLE 10

|  |  |  |  | Example 28 | | Example 29 | | Example 30 | | Example 31 | |
|---|---|---|---|---|---|---|---|---|---|---|---|
| Separation step | Pretreatment step | | | i | | j | | k | | l | |
| | Nanofiltration membrane | | | A | | A | | B | | B | |
| | Measurement timing | | | 2 hours after operation | 1 week after operation | 2 hours after operation | 1 week after operation | 2 hours after operation | 1 week after operation | 2 hours after operation | 1 week after operation |
| | Permeated water in first separation step | Concentration mg/L | Li⁺ | 1891 | 4680 | 277 | 685 | 763 | 915 | 5085 | 6102 |
| | | | Ni²⁺ | 33 | 4900 | 33 | 4900 | 114 | 3266 | 114 | 3266 |
| | | | Co²⁺ | 11 | 1617 | 11 | 1617 | 38 | 1078 | 38 | 1078 |
| | | | Mn²⁺ | 7 | 1000 | 7 | 1000 | 23 | 666 | 23 | 666 |
| | | Li⁺/polyvalent ion in permeated water through nanofiltration membrane | | 38 | 0.62 | 5.5 | 0.091 | 4.4 | 0.18 | 29 | 1.2 |
| | | Flow rate (m/d) | | 0.35 | 0.39 | 0.052 | 0.058 | 0.078 | 0.081 | 0.52 | 0.54 |
| | Measurement timing | | | 2 hours after operation | 1 week after operation | 2 hours after operation | 1 week after operation | 2 hours after operation | 1 week after operation | 2 hours after operation | 1 week after operation |
| | Permeated water in second separation step | Concentration mg/L | Li⁺ | 529 | 1310 | 77 | 192 | 214 | 256 | 1423 | 1708 |
| | | | Ni²⁺ | 0.07 | 10 | 0.07 | 10 | 0.23 | 6 | 0.23 | 6 |
| | | | Co²⁺ | 0.02 | 3 | 0.02 | 3 | 0.08 | 2 | 0.08 | 2 |
| | | | Mn²⁺ | 0.01 | 2 | 0.01 | 2 | 0.05 | 1 | 0.05 | 1 |
| | | Li⁺/polyvalent ion in permeated water through nanofiltration membrane | | 5260 | 88 | 770 | 13 | 606 | 26 | 4042 | 173 |
| | | Flow rate (m/d) | | 0.53 | 0.59 | 0.53 | 0.59 | 0.65 | 0.68 | 0.64 | 0.67 |
|  |  |  |  | Example 32 | | Example 33 | | Example 34 | | Example 35 | |
| Separation step | Pretreatment step | | | m | | n | | o | | P | |
| | Nanofiltration membrane | | | D | | E | | F | | B | |
| | Measurement timing | | | 2 hours after operation | 1 week after operation | 2 hours after operation | 1 week after operation | 2 hours after operation | 1 week after operation | 2 hours after operation | 1 week after operation |
| | Permeated water in first separation step | Concentration mg/L | Li⁺ | 5263 | 6158 | 6184 | 3630 | 4426 | 5683 | 4068 | 4882 |
| | | | Ni²⁺ | 98 | 980 | 65 | 122 | 192 | 219 | 103 | 2940 |
| | | | Co²⁺ | 32 | 323 | 22 | 40 | 63 | 72 | 34 | 970 |
| | | | Mn²⁺ | 20 | 200 | 13 | 25 | 39 | 45 | 21 | 600 |
| | | Li⁺/polyvalent ion in permeated water through nanofiltration membrane | | 35 | 4.1 | 32 | 19 | 15 | 17 | 26 | 1 |
| | | Flow rate (m/d) | | 0.56 | 0.60 | 0.41 | 0.42 | 0.53 | 0.54 | 0.42 | 0.43 |
| | Measurement timing | | | 2 hours after operation | 1 week after operation | 2 hours after operation | 1 week after operation | 2 hours after operation | 1 week after operation | 2 hours after operation | 1 week after operation |
| | Permeated water in second separation step | Concentration mg/L | Li⁺ | 1473 | 1724 | 891 | 1016 | 1239 | 1591 | 1139 | 1366 |
| | | | Ni²⁺ | 0.20 | 2 | 0.13 | 0.24 | 0 | 0 | 0 | 6 |
| | | | Co²⁺ | 0.06 | 1 | 0.04 | 0.08 | 0 | 0 | 0 | 2 |
| | | | Mn²⁺ | 0.04 | 0 | 0.03 | 0.05 | 0 | 0 | 0 | 1 |
| | | Li⁺/polyvalent ion in permeated water through nanofiltration membrane | | 4881 | 582 | 4429 | 2744 | 2052 | 2352 | 3593 | 154 |
| | | Flow rate (m/d) | | 0.69 | 0.74 | 0.50 | 0.52 | 0.67 | 0.68 | 0.64 | 0.67 |

Examples 36 to 43

As shown in Table 11, the same procedure as in Example 1 was carried out except that the rare metal-containing acidic aqueous solutions D to K were used as feed water for the first separation step and the treatment was performed using the nanofiltration membrane E. The results are shown in Table 11 together with the results of Example 5.

TABLE 11

| | | | | Example 5 | | Example 36 | | Example 37 | | Example 38 | | Example 39 | |
|---|---|---|---|---|---|---|---|---|---|---|---|---|---|
| | Feed water for first separation step (rare metal-containing acidic aqueous solution) | | | A | | D | | E | | F | | G | |
| Sepa-ration step | Nanofiltration membrane | | | E | | E | | E | | E | | E | |
| | Measurement timing | | | 2 hours after operation | 1 week after operation | 2 hours after operation | 1 week after operation | 2 hours after operation | 1 week after operation | 2 hours after operation | 1 week after operation | 2 hours after operation | 1 week after operation |
| | Perme-ated water in first sepa-ration step | Concen-tration (mg/L) | $Li^+$ | 3184 | 3630 | 3980 | 4537 | 3916 | 4465 | 3853 | 5270 | 3343 | 3343 |
| | | | $Ni^{2+}$ | 65 | 122 | 69 | 129 | 69 | 130 | 70 | 328 | 63 | 70 |
| | | | $Co^{2+}$ | 22 | 40 | 22 | 42 | 23 | 43 | 23 | 108 | 2 | 23 |
| | | | $Mn^{2+}$ | 13 | 25 | 14 | 26 | 14 | 26 | 14 | 67 | 13 | 14 |
| | | $Li^+$/polyvalent ion in permeated water through nanofiltration membrane | | 32 | 19 | 38 | 23 | 37 | 22 | 36 | 10 | 34 | 31 |
| | Perme-ated water in second sepa-ration step | Concen-tration (mg/L) | $Li^+$ | 891 | 1016 | 1114 | 1270 | 1096 | 1250 | 1078 | 1475 | 936 | 936 |
| | | | $Ni^{2+}$ | 0.13 | 0.24 | 0.14 | 0.26 | 0.14 | 0.26 | 0.14 | 0.66 | 0.13 | 0.14 |
| | | | $Co^{2+}$ | 0.04 | 0.08 | 0.05 | 0.08 | 0.05 | 0.09 | 0.05 | 0.22 | 0.04 | 0.05 |
| | | | $Mn^{2+}$ | 0.03 | 0.05 | 0.03 | 0.05 | 0.03 | 0.05 | 0.03 | 0.13 | 0.03 | 0.03 |
| | | $Li^+$/polyvalent ion in permeated water through nanofiltration membrane | | 4429 | 2744 | 5273 | 3202 | 5140 | 3121 | 5009 | 1460 | 4795 | 4359 |

| | | | | Example 40 | | Example 41 | | Example 42 | | Example 43 | |
|---|---|---|---|---|---|---|---|---|---|---|---|
| | Feed water for first separation step (rare metal-containing acidic aqueous solution) | | | H | | 1 | | J | | K | |
| Sepa-ration step | Nanofiltration membrane | | | E | | E | | E | | E | |
| | Measurement timing | | | 2 hours after operation | 1 week after operation | 2 hours after operation | 1 week after operation | 2 hours after operation | 1 week after operation | 2 hours after operation | 1 week after operation |
| | Perme-ated water in first sepa-ration step | Concen-tration (mg/L) | $Li^+$ | 3377 | — | 5970 | 6806 | 5373 | 6125 | 2483 | 2831 |
| | | | $Ni^{2+}$ | 64 | — | 70 | 11 | 66 | 106 | 52 | 98 |
| | | | $Co^{2+}$ | 21 | — | 23 | 37 | 22 | 35 | 17 | 32 |
| | | | $Mn^{2+}$ | 13 | — | 14 | 23 | 13 | 22 | 11 | 20 |
| | | $Li^+$/polyvalent ion in permeated water through nanofiltration membrane | | 34 | — | 56 | 40 | 53 | 38 | 31 | 19 |
| | Perme-ated water in second sepa-ration step | Concen-tration (mg/L) | $Li^+$ | 945 | — | 1671 | 1905 | 1504 | 1714 | 695 | 792 |
| | | | $Ni^{2+}$ | 0.13 | — | 0.14 | 0.23 | 0.13 | 0.21 | 0.11 | 0.20 |
| | | | $Co^{2+}$ | 0.04 | — | 0.05 | 0.07. | 0.04 | 0.07 | 0.03 | 0.06 |
| | | | $Mn^{2+}$ | 0.03 | — | 0.03 | 0.05. | 0.03 | 0.04 | 0.02 | 0.04 |
| | | $Li^+$/polyvalent ion in permeated water through nanofiltration membrane | | 4795 | — | 7761 | 5544 | 7353 | 5253 | 4318 | 2622 |

Comparative Examples 1 to 6

The same procedure as in Example 1 was carried out except that the nanofiltration membranes H to M were used as the separation membrane. The results are shown in Table 12.

TABLE 12

| | | | Comparative Example 1 | | Comparative Example 2 | | Comparative Example 3 | | Comparative Example 4 | | Comparative Example 5 | | Comparative Example 6 | |
|---|---|---|---|---|---|---|---|---|---|---|---|---|---|---|
| | Feed water for first separation step | | Rare metal-containing acidic aqueous solution A | | | | | | | | | | | |
| Separation step | Nanofiltration membrane | | H | | I | | J | | K | | L | | M | |
| | Measurement timing | | 2 hours after operation | 1 week after operation | 2 hours after operation | 1 week after operation | 2 hours after operation | 1 week after operation | 2 hours after operation | 1 week after operation | 2 hours after operation | 1 week after operation | 2 hours after operation | 1 week after operation |
| | Permeated water in first separation step | Concentration (mg/L) $Li^+$ | 3771 | 5186 | 4349 | 4745 | 4920 | 5140 | 290 | 395 | 5404 | 5931 | 1450 | 2175 |
| | | $Ni^{2+}$ | 52 | 9799 | 33 | 10616 | 33 | 12249 | 33 | 817 | 408 | 13392 | 21 | 3780 |
| | | $Co^{2+}$ | 17 | 3234 | 11 | 3504 | 11 | 4043 | 11 | 270 | 135 | 4420 | 8 | 1440 |
| | | $Mn^{2+}$ | 11 | 1999 | 7 | 2166 | 7 | 2499 | 7 | 167 | 82 | 2732 | 8 | 1440 |
| | | $Li^+$/polyvalent ion in permeated water through nanofiltration membrane | 47 | 0.35 | 87 | 0.29 | 98 | 0.27 | 5.8 | 0.3 | 8.6 | 0.29 | 39 | 0.33 |
| | Permeated water in second separation step | Concentration (mg/L) $Li^+$ | 1056 | 1452 | 1217 | 1577 | 1377 | 1762 | 81 | 127 | 1513 | 1660 | 452 | 678 |
| | | $Ni^{2+}$ | 0.11 | 19 | 0.07 | 21 | 0.07 | 24 | 0.07 | 2 | 0.82 | 33 | 0.06 | 11 |
| | | $Co^{2+}$ | 0.03 | 6 | 0.02 | 7 | 0.02 | 8 | 0.02 | 1 | 0.27 | 11 | 0.02 | 4 |
| | | $Mn^{2+}$ | 0.02 | 4 | 0.01 | 4 | 0.01 | 5 | 0.01 | 0 | 0.16 | 7 | 0.02 | 4 |
| | | $Li^+$/polyvalent ion in permeated water through nanofiltration membrane | 6558 | 49 | 12101 | 49 | 13688 | 48 | 807 | 51 | 1203 | 33 | 4520 | 38 |

Comparative Examples 7 to 11

As shown in Table 13, the same procedure as in Example 1 was carried out except that permeated water through the microfiltration membrane obtained by treating the rare metal-containing acidic aqueous solution B under the condition a was used as feed water for the first separation step, and the treatment was performed using the nanofiltration membranes H to L, respectively. The results are shown in Table 13.

TABLE 13

| | | | Comparative Example 7 | | Comparative Example 8 | | Comparative Example 9 | | Comparative Example 10 | | Comparative Example 11 | |
|---|---|---|---|---|---|---|---|---|---|---|---|---|
| | Pretreatment step | | a | | a | | a | | a | | a | |
| Separation step | Nanofiltration membrane | | H | | I | | J | | K | | L | |
| | Measurement timing | | 2 hours after operation | 1 year after operation | 2 hours after operation | 1 year after operation | 2 hours after operation | 1 year after operation | 2 hours after operation | 1 year after operation | 2 hours after operation | 1 year after operation |
| | Permeated water in first step | Concentration mg/L $Li^+$ | 3771 | 5705 | 4349 | 5219 | 4920 | 5654 | 290 | 791 | 5404 | 6524 |
| | | $Ni^{2+}$ | 52 | 15678 | 33 | 15923 | 33 | 15923 | 33 | 1307 | 408 | 14731 |
| | | $Co^{2+}$ | 17 | 5174 | | 5255 | 11 | 5255 | 11 | 431 | 135 | 4862 |
| | | $Mn^{2+}$ | 11 | 3199 | 6.6 | 3249 | 6.6 | 3249 | 6.6 | 267 | 82 | 3005 |
| | | $L^+$/polyvalent ion | 47 | 0.24 | 87 | 0.21 | 98 | 0.23 | 5.8 | 0.39 | 8.6 | 0.29 |
| | Permeated water in second step | Concentration mg/L $Li^+$ | 1056 | 1597 | 1217 | 1735 | 1377 | 1939 | 81 | 254 | 1513 | 1826 |
| | | $Ni^{2+}$ | 0.11 | 31 | 0.07 | 32 | 0.07 | 32 | 0.07 | 2.6 | 0.82 | 29 |
| | | $Co^{2+}$ | 0.03 | 10 | 0.02 | 10 | 0.02 | 10 | 0.02 | 0.85 | 0.27 | 10 |
| | | $Mn^{2+}$ | 0.02 | 6.2 | 0.01 | 6.3 | 0.01 | 6.3 | 0.01 | 0.52 | 0.16 | 5.8 |
| | | $Li^+$/polyvalent ion | 65581 | 34 | 12101 | 36 | 13688 | 40 | 807 | 64 | 1203 | 41 |

Comparative Examples 12 to 17

As shown in Table 14, the same procedure as in Example 1 was carried out except that permeated water through the ultrafiltration membrane obtained by treating the rare metal-containing acidic aqueous solution C under the condition h was used as feed water for the first separation step, and the treatment was performed using the nanofiltration membranes H to L, respectively. The results are shown in Table 14.

TABLE 14

|  |  |  | Comparative Example 12 | | Comparative Example 13 | | Comparative Example 14 | |
|---|---|---|---|---|---|---|---|---|
| | Pretreatment step | | h | | h | | h | |
| Separation step | Nanofiltration membrane | | H | | I | | J | |
| | Measurement timing | | 2 hours after operation | 1 week after operation | 2 hours after operation | 1 week after operation | 2 hours after operation | 1 week after operation |
| Permeated water in first separation step | Concentration (mg/L) | $Li^+$ | 3771 | 5186 | 4349 | 4745 | 4920 | 5140 |
| | | $Ni^{2+}$ | 52 | 9799 | 33 | 10616 | 33 | 12249 |
| | | $Co^{2+}$ | 17 | 3234 | 11 | 3504 | 11 | 4043 |
| | | $Mn^{2+}$ | 11 | 1999 | 7 | 2166 | 7 | 2499 |
| | $Li^+$/polyvalent ion in permeated water through nanofiltration membrane | | 47 | 0.35 | 87 | 0.29 | 98 | 0.27 |
| | Flow rate (m/d) | | 0.51 | 0.56 | 0.67 | 0.93 | 1.5 | 3.4 |
| Permeated water in second separation step | Concentration mg/L | $Li^+$ | 1056 | 1452 | 1217 | 1577 | 1377 | 1762 |
| | | $Ni^{2+}$ | 0.11 | 19 | 0.07 | 21 | 0.0 | 24 |
| | | $Co^{2+}$ | 0.03 | 6 | 0.02 | 7 | 0.02 | 8 |
| | | $Mn^{2+}$ | 0.02 | 4 | 0.01 | 4 | 0.01 | 5 |
| | $Li^+$/polyvalent ion in permeated water through nanofiltration membrane | | 6558 | 49 | 12101 | 49 | 13688 | 48 |
| | Flow rate (m/d) | | 0.63 | 0.69 | 0.83 | 1.1 | 1.91 | 4.2 |

|  |  |  | Comparative Example 15 | | Comparative Example 16 | | Comparative Example 17 | |
|---|---|---|---|---|---|---|---|---|
| | Pretreatment step | | h | | h | | h | |
| Separation step | Nanofiltration membrane | | K | | L | | M | |
| | Measurement timing | | 2 hours after operation | 1 week after operation | 2 hours after operation | 1 week after operation | 2 hours after operation | 1 week after operation |
| Permeated water in first separation step | Concentration (mg/L) | $Li^+$ | 290 | 395 | 5404 | 5931 | 1450 | 2175 |
| | | $Ni^{2+}$ | 33 | 817 | 408 | 13392 | 21 | 3780 |
| | | $Co^{2+}$ | 11 | 270 | 135 | 4420 | 8 | 1440 |
| | | $Mn^{2+}$ | 7 | 167 | 82 | 2732 | 8 | 1440 |
| | $Li^+$/polyvalent ion in permeated water through nanofiltration membrane | | 5.8 | 0.32 | 8.6 | 0.29 | 39 | 0.33 |
| | Flow rate (m/d) | | 0.027 | 0.032 | 0.027 | 0.064 | 0.30 | 0.43 |
| Permeated water in second separation step | Concentration mg/L | $Li^+$ | 81 | 112 | 1513 | 1660 | 452 | 678 |
| | | $Ni^{2+}$ | 0.07 | 2 | 0.82 | 32.99 | 0.06 | 11 |
| | | $Co^{2+}$ | 0.02 | 1 | 0.27 | 10.78 | 0.02 | 4 |
| | | $Mn^{2+}$ | 0.01 | 0 | 0.16 | 6.53 | 0.02 | 4 |
| | $Li^+$/polyvalent ion in permeated water through nanofiltration membrane | | 807 | 45 | 1203 | 33 | 4520 | 38 |
| | Flow rate (m/d) | | 0.14 | 0.13 | 0.25 | 0.27 | 0.45 | 0.80 |

(4) Concentration Step

The results of evaluating the removal ratio of isopropyl alcohol and the removal ratio of boron using the reverse osmosis membranes A to J are shown in Table 14. The surface zeta potential at pH 3 and the total proportion of halogen in the elements measured in the X-ray photoelectron spectroscopy measurement of the surface on the separation function layer side, which were measured by the above method, are also shown. In addition, a proportion of a convex portion having a deformation amount of 2.5 nm or less when the convex portion of the separation function layer is pressed in pure water with a force of 5 nN and a proportion of a convex portion having a deformation amount of 2.5 nm or less when the convex portion of the separation function layer is pressed in a sulfuric acid aqueous solution having a pH of 1 with a force of 5 nN, and a ratio thereof (proportion in sulfuric acid aqueous solution having a pH of 1/proportion in pure water) are also shown.

TABLE 15

| Reverse osmosis membrane | | A | B | C | D | E | F | G | H | I | J |
|---|---|---|---|---|---|---|---|---|---|---|---|
| Total proportion (%) of halogen | | 0.00 | 0.00 | 0.00 | 0.00 | 0.00 | 0.00 | 0.00 | 0.10 | 0.50 | 0.00 |
| Proportion of convex portion having deformation amount of 2.5 nm or less when convex portion is pressed with a force of 5 nN | Proportion (%) in pure water | 33 | 26 | 43 | 40 | 46 | 17.0 | 10.0 | 22.0 | 37.0 | 35.0 |
| | Proportion (%) in sulfuric acid aqueous solution having pH of 1 | 14 | 13 | 30 | 33 | 40 | 3 | 2 | 10 | 18 | 29 |
| | Proportion (%) in sulfuric acid aqueous solution having pH of 1/proportion (%) in pure water | 0.42 | 0.50 | 0.70 | 0.83 | 0.87 | 0.18 | 0.20 | 0.45 | 0.49 | 0.83 |
| Initial performance | Removal ratio (%) of isopropanol | 96.0 | 95.2 | 97.5 | 98.0 | 98.6 | 95.1 | 93.2 | 94.0 | 93.5 | 87.0 |
| | Removal ratio (%) of boron | 79 | 75.4 | 83.0 | 88.1 | 91.0 | 74.1 | 60.2 | 74.2 | 73.1 | 65.7 |
| Surface zeta potential (mV) at pH 3 | | 18 | −8 | 11 | −1 | −5 | 20 | 25 | −3 | −5 | −18 |

Examples 44 to 48

The reverse osmosis membranes A to E were respectively used as the separation membrane, and the permeated water through the nanofiltration membrane in the first separation step and the permeated water through the nanofiltration membrane in the second separation step of Example 1 were respectively treated as feed water, and the ion concentration in the permeated water through the reverse osmosis membrane was evaluated. The operating pressure was 5.5 MPa. The results are shown in Table 16.

TABLE 16

| | | | | Example 44 | | Example 45 | | Example 46 | | Example 47 | | Example 48 | |
|---|---|---|---|---|---|---|---|---|---|---|---|---|---|
| Concentration step | Reverse osmosis membrane | | | A | | B | | C | | D | | E | |
| | Measurement timing | | | 2 hours after operation | 1 week after operation | 2 hours after operation | 1 week after operation | 2 hours after operation | 1 week after operation | 2 hours after operation | 1 week after operation | 2 hours after operation | 1 week after operation |
| | Permeated water in concentration step using permeated water in first separation step of Example 1 as feed water | Concentration (mg/L) | $Li^+$ | 11 | 24 | 15 | 21 | 9 | 19 | 7 | 11 | 8 | 12 |
| | | | $Ni^{2+}$ | 0 | 6 | 0 | 3 | 0 | 4 | 0 | 2 | 0 | 4 |
| | | | $Co^{2+}$ | 0 | 2 | 0 | 1 | 0 | 1 | 0 | 1 | 0 | 1 |
| | | | $Mn^{2+}$ | 0 | 2 | 0 | 1 | 0 | 1 | 0 | 1 | 0 | 1 |
| | Permeated water in concentration step using permeated water in second separation step of Example 1 as feed water | Concentration (mg/L) | $Li^+$ | 3 | 7 | 4 | 6 | 2 | 5 | 2 | 3 | 2 | 3 |
| | | | $Ni^{2+}$ | 0 | 0 | 0 | 0 | 0 | 0 | 0 | 0 | 0 | 0 |
| | | | $Co^{2+}$ | 0 | 0 | 0 | 0 | 0 | 0 | 0 | 0 | 0 | 0 |
| | | | $Mn^{2+}$ | 0 | 0 | 0 | 0 | 0 | 0 | 0 | 0 | 0 | 0 |

Comparative Examples 18 to 22

The same procedure as in Example 44 was carried out except that the reverse osmosis membranes F to J were used as the separation membrane. The results are shown in Table 17.

TABLE 17

| Concentration step | | | | Comparative Example 18 F | | Comparative Example 19 G | | Comparative Example 20 H | | Comparative Example 21 I | | Comparative Example 22 J | |
|---|---|---|---|---|---|---|---|---|---|---|---|---|---|
| | Reverse osmosis membrane Measurement timing | | | 2 hours after operation | 1 week after operation | 2 hours after operation | 1 week after operation | 2 hours after operation | 1 week after operation | 2 hours after operation | 1 week after operation | 2 hours after operation | 1 week after operation |
| | Permeated water in concentration step using permeated water in first separation step of Comparative Example 1 as feed water | Concentration (mg/L) | $Li^+$ | 45 | 109 | 56 | 124 | 21 | 89 | 16 | 118 | 64 | 184 |
| | | | $Ni^{2+}$ | 0 | 88 | 0 | 98 | 0 | 83 | 0 | 88 | 0 | 122 |
| | | | $Co^{2+}$ | 0 | 29 | 0 | 32 | 0 | 27 | 0 | 29 | 0 | 40 |
| | | | $Mn^{2+}$ | 0 | 24 | 0 | 27 | 0 | 20 | 0 | 24 | 0 | 33 |
| | Permeated water in concentration step using permeated water in second separation step of Comparative Example 1 as feed water | Concentration (mg/L) | $Li^+$ | 12 | 31 | 16 | 35 | 6 | 25 | 5 | 33 | 18 | 52 |
| | | | $Ni^{2+}$ | 0 | 1 | 0 | 0 | 0 | 0 | 0 | 1 | 0 | 1 |
| | | | $Co^{2+}$ | 0 | 0 | 0 | 0 | 0 | 0 | 0 | 0 | 0 | 0 |
| | | | $Mn^{2+}$ | 0 | 0 | 0 | 0 | 0 | 0 | 0 | 0 | 0 | 0 |

INDUSTRIAL APPLICABILITY

The present invention can be suitably used as a method for efficiently separating and recovering rare metals such as lithium, cobalt, and nickel from a lithium ion battery or a waste material, a waste liquid, an ore, a slag, or the like generated in a manufacturing process of the lithium ion battery.

Although the invention has been described in detail with reference to a specific embodiment, it will be apparent to those skilled in the art that various changes and modifications can be made without departing from the spirit and scope of the invention.

The present application is based on Japanese Patent Application No. 2020-075283 filed on Apr. 21, 2020, Japanese Patent Application No. 2020-075284 filed on Apr. 21, 2020, Japanese Patent Application No. 2020-094341 filed on May 29, 2020, Japanese Patent Application No. 2021-0506860 filed on Mar. 30, 2021, and Japanese Patent Application No. 2021-056865 filed on Mar. 30, 2021, the contents of which are incorporated herein by reference.

The invention claimed is:

1. A method for recovering a rare metal salt, the method comprising:
   an acid treatment step of obtaining a rare metal-containing acidic aqueous solution by bringing a material comprising a monovalent rare metal and a polyvalent rare metal into contact with an acidic aqueous solution;
   a separation step of obtaining permeated water comprising the monovalent rare metal and non-permeated water comprising the polyvalent rare metal from the rare metal-containing acidic aqueous solution by using a nanofiltration membrane satisfying the condition (1) below; and
   a concentration step of obtaining non-permeated water having a higher concentration of the monovalent rare metal and permeated water having a lower concentration of the monovalent rare metal than that of the permeated water in the separation step, by using a reverse osmosis membrane,
   condition (1):
   a difference between a removal ratio of magnesium sulfate and a removal ratio of magnesium chloride is 20% or less when a 2000 mg/L magnesium sulfate aqueous solution and a 2000 mg/L magnesium chloride aqueous solution, each having a pH of 6.5 and a temperature of 25° C., are respectively allowed to pass through the nanofiltration membrane under an operating pressure of 0.5 MPa; and
   a difference between a removal ratio of glucose and a removal ratio of isopropyl alcohol is 40% or more and the removal ratio of glucose is 70% or more when a 1000 mg/L glucose aqueous solution and a 1000 mg/L isopropyl alcohol aqueous solution, each having a pH of 6.5 and a temperature of 25° C. are respectively allowed to pass through the nanofiltration membrane under an operating pressure of 0.5 MPa.

2. The method for recovering a rare metal salt according to claim 1, wherein the rare metal-containing acidic aqueous solution in the separation step comprises lithium as the monovalent rare metal, and a lithium ion concentration in the rare metal-containing acidic aqueous solution is in a range of 0.5 mg/L or more and 50000 mg/L or less.

3. The method for recovering a rare metal salt according to claim 1, wherein a total ion concentration of the polyvalent rare metal in the rare metal-containing acidic aqueous solution in the separation step is in a range of 0.5 mg/L or more and 100000 mg/L or less.

4. The method for recovering a rare metal salt according to claim 1, wherein the rare metal-containing acidic aqueous solution in the separation step comprises at least one metal of cobalt, nickel, and manganese as the polyvalent rare metal.

5. The method for recovering a rare metal salt according to claim 1, wherein the separation step comprises at least a first separation step of obtaining permeated water and non-permeated water by a nanofiltration membrane and a 2a-th separation step of obtaining permeated water and non-permeated water by further treating the permeated water obtained in the first separation step by a nanofiltration membrane.

6. The method for recovering a rare metal salt according to claim 1, wherein the separation step comprises at least the first separation step of obtaining permeated water and non-permeated water by a nanofiltration membrane and a 2b-th separation step of obtaining permeated water and non-permeated water by further treating the non-permeated water obtained in the first separation step by a nanofiltration membrane.

7. The method for recovering a rare metal salt according to claim 1, wherein permeated water having a lithium ion concentration (mg/L) of 1000 times or more as high as a polyvalent metal ion concentration (mg/L) is obtained in the separation step.

8. The method for recovering a rare metal salt according to claim 1, wherein an operating pressure in the separation step is equal to or lower than an osmotic pressure of the rare metal-containing acidic aqueous solution supplied to the nanofiltration membrane.

9. The method for recovering a rare metal salt according to claim 1, further comprising, between the acid treatment step and the separation step, a pretreatment step of treating the rare metal-containing acidic aqueous solution with a microfiltration membrane having an average surface pore diameter of 0.05 μm to 10 μm.

10. The method for recovering a rare metal salt according to claim 1, further comprising, between the acid treatment step and the separation step, a pretreatment step of treating the rare metal-containing acidic aqueous solution with an ultrafiltration membrane having an average surface pore diameter of 3 nm to 16 nm.

11. The method for recovering a rare metal salt according to claim 9, wherein in the pretreatment step, a temperature of the rare metal-containing acidic aqueous solution to be treated is 0° C. to 100° C.

12. The method for recovering a rare metal salt according to claim 1, wherein
the concentration step comprises a concentration step of obtaining non-permeated water having a higher concentration of the monovalent rare metal than that of the permeated water in the separation step and permeated water having a lower concentration of the monovalent rare metal than that of the permeated water in the separation step, by using a reverse osmosis membrane satisfying the following condition (2),
condition (2):
a removal ratio of isopropyl alcohol is 95% or more and a removal ratio of boron ions is 75% or more when the reverse osmosis membrane is immersed in a sulfuric acid aqueous solution having a pH of 1 and a temperature of 25° C. for 24 hours, and then an aqueous solution having a pH of 6.5 and a temperature of 25° C. and comprising 30 mg/L boric acid, 100 mg/L isopropyl alcohol, and 30000 mg/L lithium chloride is allowed to pass through the reverse osmosis membrane under an operating pressure of 5.5 MPa.

13. The method for recovering a rare metal salt according to claim 1, wherein the concentration step comprises at least first and second concentration steps which use the reverse osmosis membrane, and non-permeated water obtained in the first concentration step is treated in the second concentration step.

14. The method for recovering a rare metal salt according to claim 1, further comprising a mixing step of mixing the permeated water produced in the concentration step with the rare metal-containing acidic aqueous solution obtained in the acid treatment step,
wherein, in the separation step, the permeated water and the non-permeated water are obtained from a mixed water obtained in the mixing step.

15. The method for recovering a rare metal salt according to claim 1, wherein a nanofiltration membrane having a positive value of surface zeta potential at pH 3 is used as the nanofiltration membrane.

16. The method for recovering a rare metal salt according to claim 1, wherein
the nanofiltration membrane comprises a base material, a porous support layer on the base material, and a separation function layer on the porous support layer,
the separation function layer comprises a crosslinked polyamide, and
a total proportion of halogen in elements measured in X-ray photoelectron spectroscopy measurement of a surface on a separation function layer side is less than 0.1%.

17. The method for recovering a rare metal salt according to claim 1, wherein
the nanofiltration membrane comprises a base material, a porous support layer on the base material, and a separation function layer on the porous support layer, and
there is only one peak having a maximum in a range of 1600 cm$^{-1}$ to 1700 cm$^{-1}$ when a surface on the separation function layer side is measured by a total reflection infrared absorption spectrum method, and when the peak is defined as a peak A, a peak intensity ratio ($I_A/I_{1242}$) measured after immersing the nanofiltration membrane in a 1 M sulfuric acid aqueous solution at 40° C. for 21 days is 0.40 or more and 1.0 or less as compared with a peak intensity ratio ($I_A/I_{1242}$) measured before the immersion,
provided that $I_A$ and $I_{1242}$ are the following absorption peak values, respectively,
$I_A$: absorption peak value corresponding to the separation function layer present in the range of 1600 cm$^{-1}$ to 1700 cm$^{-1}$
$I_{1242}$: absorption peak value corresponding to the porous support layer at 1242 cm$^{-1}$.

18. The method for recovering a rare metal salt according to claim 1, wherein
the nanofiltration membrane comprises a base material, a porous support layer on the base material, and a separation function layer on the porous support layer, and
the separation functional layer comprises a crosslinked polyamide having a structure derived from a polyfunctional aliphatic amine represented by the following general formula (1),

[Chem. 1]

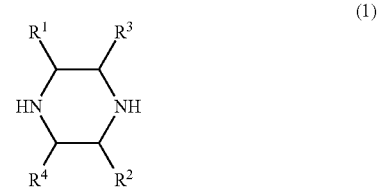

(1)

provided that $R^1$ and $R^2$ each independently means an alkyl group having 1 to 6 carbon atoms, a phenyl group, a benzyl group, COOR$^5$, CONHR$^5$, CON(R$^5$)$_2$, or OR$^5$, and R$^5$ means a hydrogen atom, an alkyl group having 1 to 6 carbon atoms, a phenyl group, or a benzyl group; and $R^3$ and $R^4$ each independently means hydrogen, an alkyl group having 1 to 6 carbon atoms, a phenyl group, a benzyl group, COOR$^6$, CONHR$^6$, CON(R$^6$)$_2$ or OR$^6$, and $R^6$ means a hydrogen atom, an alkyl group having 1 to 6 carbon atoms, a phenyl group or a benzyl group.

19. The method for recovering a rare metal salt according to claim 1, wherein
the nanofiltration membrane comprises a base material, a porous support layer on the base material, and a separation function layer on the porous support layer, and
the separation function layer comprises a crosslinked aromatic polyamide, and the crosslinked aromatic polyamide has a structure represented by the following general formula (2),

[Chem. 2]

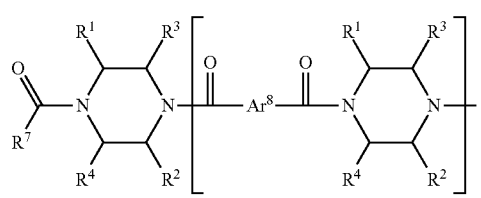

(2)

provided that $R^1$ to $R^4$ have the same meanings as $R^1$ to $R^4$ in the general formula (1), and $R^7$ is an aliphatic chain or an aliphatic ring comprising only a carbon atom and a hydrogen atom as a constituent element, and $Ar^8$ is an aromatic ring having 6 to 14 carbon atoms which may have a substituent.

20. The method for recovering a rare metal salt according to claim 12, wherein a reverse osmosis membrane having a negative value of surface zeta potential at pH 3 is used as the reverse osmosis membrane used in the concentration step.

21. The method for recovering a rare metal salt according to claim 12, wherein
the reverse osmosis membrane used in the concentration step comprises a base material, a porous support layer on the base material, and a separation function layer on the porous support layer, and
the separation function layer comprises a crosslinked aromatic polyamide.

22. The method for recovering a rare metal salt according to claim 12, wherein
the reverse osmosis membrane used in the concentration step comprises a base material, a porous support layer on the base material, and a separation function layer on the porous support layer,
the separation function layer comprises a crosslinked aromatic polyamide, and
a total proportion of halogen in elements measured in X-ray photoelectron spectroscopy measurement of a surface on a separation function layer side is less than 0.1%.

23. The method for recovering a rare metal salt according to claim 12, wherein
the reverse osmosis membrane used in the concentration step comprises a base material, a porous support layer on the base material, and a separation function layer on the porous support layer,
the separation function layer has a fold structure in which convex portions and concave portions are repeated, the convex portion and the concave portion being formed of a thin membrane of a crosslinked aromatic polyamide, and
a convex portion having a deformation amount of 2.5 nm or less when the convex portion is pressed in pure water with a force of 5 nN occupies 40% or more.

24. The method for recovering a rare metal salt according to claim 12, wherein
the reverse osmosis membrane used in the concentration step comprises a base material, a porous support layer on the base material, and a separation function layer on the porous support layer,
the separation function layer has a fold structure in which convex portions and concave portions are repeated, the convex portion and the concave portion being formed of a thin membrane of a crosslinked aromatic polyamide, and
a reverse osmosis membrane in which, among the convex portions, a proportion of a convex portion having a deformation amount of 2.5 nm or less when the convex portion is pressed in a sulfuric acid aqueous solution having a pH of 1 with a force of 5 nN is 0.50 times or more as large as a proportion of a convex portion having a deformation amount of 2.5 nm or less when the convex portion is pressed in pure water with a force of 5 nN is used.

25. The method for recovering a rare metal salt according to claim 12, wherein
the reverse osmosis membrane used in the concentration step comprises a base material, a porous support layer on the base material, and a separation function layer on the porous support layer, and
the separation function layer comprises a crosslinked aromatic polyamide, and the crosslinked aromatic polyamide has at least one of structures represented by the following general formula (3) or (4),

[Chem. 3]

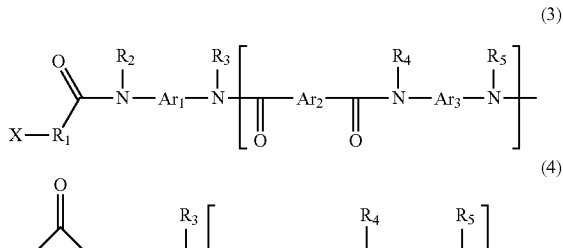

provided that $Ar_1$ to $Ar_3$ are each independently an aromatic ring having 5 to 14 carbon atoms which may have a substituent, $R^1$ is an atomic group having neither an aromatic ring nor a heteroatom, X is a hydrogen atom or a carboxy group, and $R^2$ to $R^5$ are each independently a hydrogen atom or an aliphatic chain having 1 to 10 carbon atoms.

26. The method for recovering a rare metal salt according to claim 1, wherein, in the acid treatment step, the rare metal-containing acidic aqueous solution comprises a monovalent anion, and the acid treatment step comprises a step of, when a ratio of a molar concentration of the monovalent anion with respect to a molar concentration of a whole anion is less than 0.1, adding a monovalent ion to adjust the ratio to 0.1 or more.

27. The method for recovering a rare metal salt according to claim 1, wherein the acid treatment step comprises a step of adjusting a pH of the rare metal-containing acidic aqueous solution to 0.5 or more and 7.0 or less.

28. The method for recovering a rare metal salt according to claim 1, wherein the monovalent anion is a fluoride ion, a chloride ion, a bromide ion, an iodide ion, a nitrate ion, or an acetate ion.

* * * * *